United States Patent
Maaref et al.

(10) Patent No.: US 11,310,822 B2
(45) Date of Patent: Apr. 19, 2022

(54) METHODS AND APPARATUS FOR SIDELINK COMMUNICATIONS AND RESOURCE ALLOCATION

(71) Applicant: Huawei Technologies Co., Ltd., Shenzhen (CN)

(72) Inventors: Amine Maaref, Ottawa (CA); Yu Cao, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/669,715

(22) Filed: Oct. 31, 2019

(65) Prior Publication Data

US 2020/0146044 A1  May 7, 2020

Related U.S. Application Data

(60) Provisional application No. 62/755,392, filed on Nov. 2, 2018.

(51) Int. Cl.
*H04W 72/12* (2009.01)
*H04W 72/14* (2009.01)
*H04W 4/40* (2018.01)

(52) U.S. Cl.
CPC ....... *H04W 72/1289* (2013.01); *H04W 72/14* (2013.01); *H04W 4/40* (2018.02)

(58) Field of Classification Search
CPC .... H04W 72/1289; H04W 72/14; H04W 4/40
See application file for complete search history.

(56) References Cited

U.S. PATENT DOCUMENTS

| | | | |
|---|---|---|---|
| RE48,374 E * | 12/2020 | Vandenameele | H04W 72/082 |
| 2014/0177564 A1 * | 6/2014 | Ma | H04W 72/1289 370/329 |
| 2015/0382324 A1 | 12/2015 | Sheng et al. | |
| 2016/0037512 A1 * | 2/2016 | Lei | H04W 72/04 370/336 |

(Continued)

FOREIGN PATENT DOCUMENTS

| | | |
|---|---|---|
| CN | 106162900 A | 11/2016 |
| CN | 107211430 A | 9/2017 |

(Continued)

OTHER PUBLICATIONS

3GPP TSG-RAN WG2 #92, R2-156699:"Multiple concurrent destination within a scheduling period",InterDigital Communications, Anaheim, California, USA, Nov. 15-22, 2015,total 3 pages.

(Continued)

*Primary Examiner* — Jael M Ulysse
(74) *Attorney, Agent, or Firm* — Slater Matsil, LLP

(57) ABSTRACT

Methods and systems are provided in which a UE transmits sidelink (SL) control information comprising a scheduling assignment (SA) indicating an SL transmission resource for a SL data transmission to a target UE. The SL transmission resource is based on one or more occupied SL resources identified by the UE and the SL transmission resource includes resources for an initial transmission and one or more retransmissions. The UE then transmits the SL data transmission using the SL transmission resource according to the transmitted SL control information. This is done without receiving, in a downlink control information (DCI), a grant of communication resources.

34 Claims, 34 Drawing Sheets

(56) References Cited

U.S. PATENT DOCUMENTS

| | | | |
|---|---|---|---|
| 2016/0112996 A1* | 4/2016 | Ou | H04W 72/082 370/329 |
| 2016/0183276 A1* | 6/2016 | Marinier | H04W 72/12 370/329 |
| 2016/0338094 A1* | 11/2016 | Faurie | H04W 72/085 |
| 2016/0338095 A1* | 11/2016 | Faurie | H04W 28/0278 |
| 2017/0019910 A1* | 1/2017 | Seo | H04W 76/10 |
| 2017/0041971 A1* | 2/2017 | Kim | H04W 72/12 |
| 2017/0188391 A1* | 6/2017 | Rajagopal | H04W 28/0284 |
| 2017/0245313 A1 | 8/2017 | Kim et al. | |
| 2017/0359835 A1 | 12/2017 | Seo et al. | |
| 2018/0062809 A1 | 3/2018 | Baghel et al. | |
| 2018/0098322 A1 | 4/2018 | Yoon | |
| 2018/0139724 A1* | 5/2018 | Loehr | H04W 72/02 |
| 2018/0213549 A1* | 7/2018 | Kim | H04L 1/00 |
| 2018/0220481 A1* | 8/2018 | Seo | H04W 72/1278 |
| 2018/0234998 A1* | 8/2018 | You | H04W 72/042 |
| 2018/0270796 A1* | 9/2018 | Chae | H04W 72/02 |
| 2019/0069200 A1 | 2/2019 | Zhang et al. | |
| 2019/0090250 A1* | 3/2019 | Lee | H04W 72/02 |
| 2019/0159174 A1 | 5/2019 | Seo | |
| 2019/0174530 A1* | 6/2019 | Kim | H04L 1/0025 |
| 2019/0342910 A1 | 11/2019 | Cao et al. | |
| 2020/0029318 A1 | 1/2020 | Guo | |
| 2020/0045674 A1 | 2/2020 | Tseng et al. | |
| 2020/0053835 A1 | 2/2020 | Ye et al. | |
| 2020/0107236 A1 | 4/2020 | Tseng et al. | |
| 2020/0229145 A1 | 7/2020 | Kang et al. | |

FOREIGN PATENT DOCUMENTS

| | | |
|---|---|---|
| CN | 107277922 A | 10/2017 |
| CN | 107710705 A | 2/2018 |
| CN | 107852727 A | 3/2018 |
| CN | 109156037 A | 1/2019 |
| WO | 2017176088 A1 | 10/2017 |
| WO | 2018004323 A1 | 1/2018 |

OTHER PUBLICATIONS

3GPP TSG RAN WG1 Meeting #90,R1-1712135:"Discussion on sidelink resource allocation and configuration", Huawei, HiSilicon,Prague, Czech Republic, Aug. 21-25, 2017,total 6 pages.

Huawei, HiSilicon, Discussion on V2V resource pool configuration. 3GPP TSG-RAN WG4 Meeting #82 Athens, Greece, Feb. 13 -17, 2017, R4-1701116, 3 pages.

Huawei et al., "Sidelink resource allocation mechanism for NR V2X", 3GPP TSG RAN WG1 Meeting #94bis, R1-1811904, Oct. 8-12, 2018, 13 Pages, Chengdu, China.

LG Electronics Inc., "Support for V2V set-vices based on LTE sidelink", 3GPP TSG-RAN WG2 Meeting #95. R2-165839, Aug. 22-26, 2016, 20 Pages.

MCC Support, "Final Report of 3GPP TSG RAN WG1 #95 v1.0.0 (Spokane, USA, Nov. 12-16, 2018)", 3GPP TSG RAN WG1 Meeting #96, R1-1901482, Feb. 25-Mar. 1, 2019, 172 Pages, Athens, Greece.

LG Electronics, "Discussion on sidelink resource allocation mechanism"; 3GPP TSG RAN WG1, Meeting #94bis, R1-1810283, Oct. 8-12, 2018, 7 pages, Chengdu, China.

Ericsson, "On Mode 2 Resource Allocation for NR Sidelink", 3GPP TSG-RAN WG1, Meeting #94-Bis, Tdoc R1-1811594, Oct. 8-12, 2018, 10 pages, Chengdu, China.

Fraunhofer HHI, et al., "Designs for NR V2X Mode 2 Resource Allocation", 3GPP TSG RAN WG1, Meeting #95, R1-1812399, Nov. 12-16, 2018, 10 pages, Spokane, USA.

Ericsson, "Contents of PSCCH for V2V over PC5", 3GPP TSG RAN WG1 Meeting #86, R1-167011, Aug. 22-26, 2016, 4 Pages, Gothenburg, Sweden.

Huawei et al., "UE autonomous sidelink allocation for NR V2X", 3GPP TSG RAN WG1 Meeting #94, R1-1808939, Aug. 20-24, 2018, 6 Pages, Gothenburg, Sweden.

Intel Corporation, "Summary for NR-V2X AI—7.2.4.1.4 Resource Allocation Mechanism", 3GPP TSG RAN WG1 Meeting #95, R1-1814260, Nov. 12-16, 2018, 14 Pages, Spokane, USA.

Intel Corporation, "Summary for NR-V2X AI—7.2.4.1.4 Resource Allocation Mechanism", 3GPP TSG RAN WG1 Meeting #95, R1-1813908, Nov. 12-16, 2018, 13 Pages, Spokane, USA.

Intel Corporation, "Summary for NR-V2X AI—7.2.4.1.4 Resource Allocation Mechanism", 3GPP TSG RAN WG1 Meeting #95, R1-1813908, Nov. 12-16, 2018, 12 Pages, Spokane, USA.

Intel Corporation, "On UL grant free transmissions", 3GPP TSG RAN WG1 Meeting #89, R1-1707407, May 15-19, 2017, 7 Pages, Hangzhou, P.R. China.

NEC, "On network resources and UE transmission configurations for grant-free access", 3GPP TSG RAN WG1 NR Ad-Hoc Meeting #02, R1-1710963, Jun. 27-30, 2017, 4 Pages, Qingdao, China.

* cited by examiner

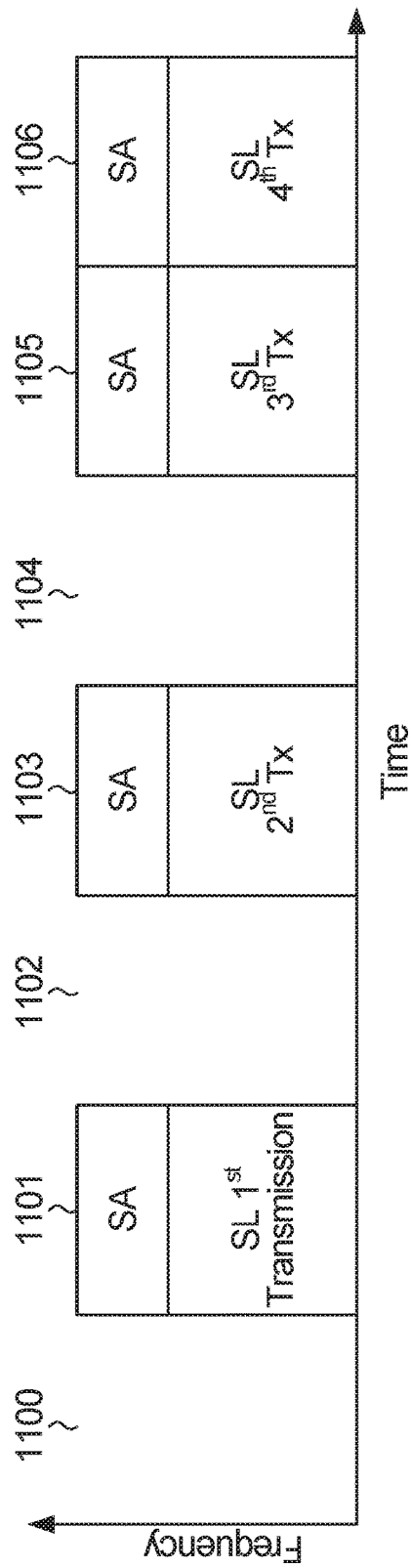
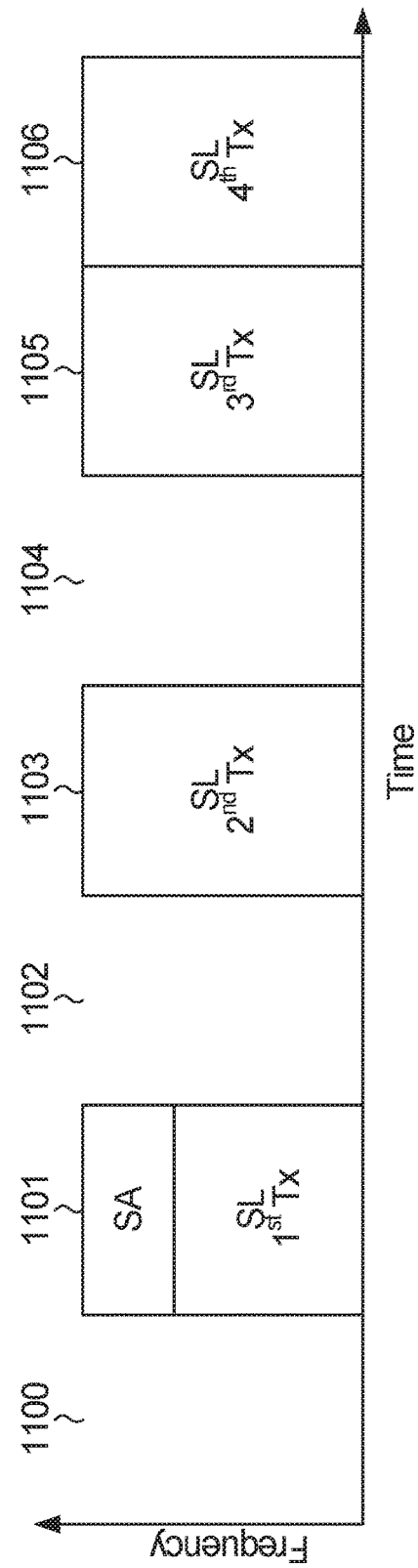
FIG. 11A
FIG. 11B

FIG. 18C

METHODS AND APPARATUS FOR SIDELINK COMMUNICATIONS AND RESOURCE ALLOCATION

RELATED APPLICATION

This application claims the benefit of U.S. provisional application No. 62/755,392 filed Nov. 2, 2018, and hereby incorporated by reference in its entirety. This application is related to U.S. provisional application No. 62/665,286 filed May 1, 2018, and hereby incorporated by reference in its entirety.

FIELD

The application relates generally to wireless sidelink (SL) communications, and in particular embodiments, to resource allocation thereof.

BACKGROUND

One possible application of sidelink (SL) communications is vehicle to everything/anything (V2X) communication, for example, which is an increasingly important new category of communication that may become widespread in next generation wireless communication networks, such as 5G New Radio (NR) systems. V2X refers to a category of communication scenarios, including communication from a vehicle to another vehicle (V2V), vehicle to infrastructure (V2I), and vehicle to pedestrian (V2P), for example. In general, a vehicle communicating in a network is considered user equipment (UE).

The communication in V2X systems may be performed using links between the network and the UE, such as an uplink (UL) and a downlink (DL). The UL is a wireless communication from a UE to a base station (BS), and the DL is a wireless communication from a BS to a UE. In V2V communication using the UL and DL, data is transmitted from a transmitting UE to a BS, and then transmitted from the BS to a receiving UE.

Alternatively, some of the V2X communication scenarios may be D2D communications, in which case the transmission in V2X systems may be performed between the transmitting UE and receiving UE using a sidelink. The SL allows data to be transmitted directly from the transmitting UE to the receiving UE, without forwarding the data via the BS.

Communication resources are required for UL, DL and SL communications. For example, a UE could wirelessly transmit data to or receive data from another UE using a particular frequency resource(s), and during a particular time duration (e.g. slot, mini-slot, etc). The combination of frequency and time slot define a communication resource in this example.

Challenges in V2X communications, and more generally SL communications, include efficient communication resource allocation and usage by UEs.

Furthermore, the SL also enables UE cooperation, which may be used to enhance the reliability, throughput, and capacity of communications. For example, data from a BS intended for a target UE (TUE) may be first transmitted to a cooperating UE (CUE), and then forwarded to the TUE. Similarly, data from the TUE intended for the BS may be forwarded via the CUE.

In general, the SL and UE cooperation may enhance the reliability, throughput, and capacity of any wireless communications. However, successful UE cooperation requires proper management of the SL between CUEs and TUEs in order to reduce interference and improve UE cooperation benefits.

The present disclosure relates to a new mode of SL communication, which may be particularly suitable for V2X scenarios, but could be used in other applications. In particular, the new mode of SL communication may enable SL transmissions that do not necessitate a corresponding dynamic scheduling of physical communication resources. In other words, the new mode of SL communication may enable UEs to perform communications in an autonomous manner, without necessitating dynamic control from a base station, yet also without the common drawbacks associated with conventional autonomous SL communications.

SUMMARY

According to one aspect of the present disclosure, there is provided a method performed by a user equipment (UE), the method comprising: transmitting sidelink (SL) control information comprising a scheduling assignment (SA) indicating an SL transmission resource for a SL data transmission to a target UE, the SL transmission resource based on one or more occupied SL resources identified by the UE, and the SL transmission resource including resources for an initial transmission and one or more retransmissions; and transmitting the SL data transmission using the SL transmission resource according to the transmitted SL control information, wherein the SL control information and the SL data communication are transmitted by the UE without receiving, in a downlink control information (DCI), a grant of communication resources.

Optionally, the method further comprises sensing a SL transmission involving another UE to identify the one or more occupied SL resources.

Optionally, sensing the SL transmission involving the another UE comprises decoding a sidelink control channel transmitted by the another UE to identify a transmission resource scheduled for the another UE.

Optionally, decoding the SL control channel transmitted by the another UE comprises decoding one or a combination of: a scheduling assignment; a side link control information (SCI); and a physical sidelink control channel (PSCCH).

Optionally, the method further comprises selecting the SL transmission resource by avoiding selecting the transmission resource scheduled for the another UE.

Optionally, the same resources are selected for the initial transmission and the one or more retransmissions.

Optionally, the SL transmission resource comprises a SL transmission pattern, the transmission resource scheduled for the another UE comprises a transmission pattern scheduled for the another UE, and avoiding selecting the transmission resource scheduled for the another UE comprises avoiding the transmission pattern scheduled for the another UE.

Optionally, sensing the SL transmission involving the another UE comprises measuring SL transmission resources.

Optionally, measuring SL transmission resources comprises measuring physical sidelink shared channel (PSSCH) resources indicated or reserved for transmission by a sidelink control information transmitted by the another UE.

Optionally, the initial transmission and the one or more retransmissions correspond to a same transport block or different transport blocks.

According to another aspect of the present invention, there is provided a user equipment comprising: a processor; and a non-transitory computer readable storage medium storing programming for execution by the processor, the programming including instructions for: transmitting sidelink (SL) control information comprising a scheduling assignment (SA) indicating an SL transmission resource for a SL data transmission to a target UE, the SL transmission resource based on one or more occupied SL resources identified by the UE, and the SL transmission resource including resources for an initial transmission and one or more retransmissions; and transmitting the SL data transmission using the SL transmission resource according to the transmitted SL control information, wherein the SL control information and the SL data communication are transmitted by the UE without receiving, in a downlink control information (DCI), a grant of communication resources.

Optionally, the programming further includes instructions for sensing a SL transmission involving another UE to identify the one or more occupied SL resources.

Optionally, sensing the SL transmission involving the another UE comprises decoding a sidelink control channel transmitted by the another UE to identify a transmission resource scheduled for the another UE.

Optionally, decoding the SL control channel transmitted by the another UE comprises decoding one or a combination of: a scheduling assignment; a side link control information (SCI); and a physical sidelink control channel (PSCCH).

Optionally, the programming further includes instructions for selecting the SL transmission resource by avoiding selecting the transmission resource scheduled for the another UE.

Optionally, the same resources are selected for the initial transmission and the one or more retransmissions.

Optionally, the SL transmission resource comprises a SL transmission pattern, the transmission resource scheduled for the another UE comprises a transmission pattern scheduled for the another UE, and avoiding selecting the transmission resource scheduled for the another UE comprises avoiding the transmission pattern scheduled for the another UE.

Optionally, the SL transmission involving the another UE comprises measuring SL transmission resources.

Optionally, measuring SL transmission resources comprises measuring physical sidelink shared channel (PSSCH) resources indicated or reserved for transmission by a sidelink control information transmitted by the another UE.

Optionally, the initial transmission and the one or more retransmissions correspond to a same transport block or different transport blocks.

According to one aspect of the present disclosure, there is provided a method performed by a user equipment (UE), the method comprising: decoding a sidelink (SL) control channel transmitted by another UE to ascertain SL control information transmitted by the another UE; selecting a SL transmission resource for use in making a SL transmission to a target UE taking into account the ascertained SL control information; transmitting, by the UE, SL control information comprising a scheduling assignment (SA) indicating the selected transmission resource; and transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, decoding a SL control channel transmitted by another UE comprises decoding one or a combination of: scheduling assignment; side link control information (SCI); a physical sidelink control channel (PSCCH); to determine transmission resources being scheduled by the another UE.

Optionally, selecting a SL transmission resource for use in making a SL transmission to a target UE taking into account the ascertained SL control information comprises avoiding selecting a transmission resource already scheduled by another UE.

Optionally, each transmission resources comprises a transmission pattern, and avoiding selecting the transmission resource already scheduled by another UE comprises avoiding a transmission pattern already scheduled by another UE.

According to another aspect of the present disclosure, there is provided a method performed by a user equipment (UE), the method comprising: measuring sidelink (SL) transmission resources; selecting a SL transmission resource for use in making a SL transmission to a target UE taking into account the measurements; transmitting, by the UE, SL control information comprising a scheduling assignment (SA) indicating the selected SL transmission resource; and transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, the method further comprises: measuring SL transmission resources at different time instances; and averaging the different SL transmission resource measurements.

Optionally, the method further comprises: determining a metric in respect of each SL transmission resource based on the measurements over a window of time prior to data transmission; wherein selecting the SL transmission resource comprises disqualifying at least one SL transmission resource from selection based on the determined metrics.

Optionally, the method further comprises: determining a metric in respect of each SL transmission resource based on the measurements over a window of time prior to data transmission; wherein selecting the SL transmission resource comprises ordering the transmission resources based on the metric.

Optionally, performing measurements on SL transmission resources on a long-term basis prior to a sidelink transmission comprises measuring at least one of: reference signal receive power (RSRP); and reference signal receive quality (RSRQ).

Optionally, measuring the SL transmission resources comprises measuring energy levels across one or more frequency bands at a first time instance.

Optionally, the method further comprises: performing a clear channel assessment (CCA) by comparing the measured energy levels to a specified threshold.

Optionally, performing measurements on SL transmission resources at a first time instance comprises: performing a measurement for a first SL transmission resource; when the measurement indicates the first SL transmission resource is being used, selecting a different SL transmission resource as the selected SL transmission resource; and when the short-term measurement indicates the first SL transmission resource is not being used, selecting the first SL transmission resource as the selected SL transmission resource.

Optionally, performing measurements on SL transmission resources at a first time instance prior to a sidelink transmission comprises performing the measurement for a plurality of SL transmission resources and determining which of the plurality of SL transmission resources are not being used for a current transmission period; and selecting a SL transmission resource for use in making a SL transmission to a target UE taking into account the measurements comprises selecting between the SL transmission resources that are determined not being used for the current transmission period.

According to another aspect of the present disclosure, there is provided a method comprising: decoding a sidelink (SL) control channel transmitted by another UE to ascertain SL control information transmitted by the another UE and/or performing measurements on sidelink (SL) transmission resources; adaptively adjusting a SL transmission resource for SL transmission based on the decoding of the SL control channel and/or measurements on SL transmission resources; transmitting, by the UE, SL control information indicating the adaptively adjusted SL transmission resource; and transmitting, by the UE, an SL data communication using the adaptively adjusted SL transmission resource, wherein the SL control information and the SL data communication are transmitted by the UE without receiving, in a downlink control information (DCI), a grant of communication resources.

Optionally, adaptively adjusting a transmission SL resource comprises adjusting one or a combination of: a number of repetitions; a size of a transmission pattern; and a location of a transmission pattern.

According to another aspect of the present disclosure, there is provided a method comprising: adaptively selecting between at least two sidelink (SL) communication resource configurations to be used by the UE for SL transmissions; selecting a SL transmission resource for use in making a SL transmission to a target UE based on the selected SL communication resource configuration; transmitting, by the UE, SL control information according to the SL communication resource configuration; and transmitting, by the UE, an SL data communication according to the SL communication resource configuration, wherein the SL control information and the SL data communication are transmitted by the UE without receiving, in a downlink control information (DCI), a grant of communication resources.

Optionally, adaptively selecting between at least two sidelink (SL) communication resource configurations to be used by the UE for SL transmissions is based on one or a combination of two or more of: traffic type, packet size, reliability target, latency target.

Optionally, sidelink control information comprises a resource allocation and power level for a sidelink transmission.

According to another aspect of the present disclosure, there is provided a user equipment (UE) comprising: a processor; and a non-transitory computer readable storage medium storing programming for execution by the processor, the programming including instructions for: decoding a sidelink (SL) control channel transmitted by another UE to ascertain SL control information transmitted by the another UE; selecting a SL transmission resource for use in making a SL transmission to a target UE taking into account the ascertained SL control information; transmitting, by the UE, SL control information comprising a scheduling assignment (SA) indicating the selected transmission resource; and transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, decoding a SL control channel transmitted by another UE comprises decoding one or a combination of: scheduling assignment; side link control information (SCI); physical sidelink control channel (PSCCH); to determine transmission resources being scheduled by the another UE.

Optionally, selecting a SL transmission resource for use in making a SL transmission to a target UE taking into account the ascertained SL control information comprises avoiding selecting a transmission resource already scheduled by another UE.

Optionally, each transmission resources comprises a transmission pattern, and avoiding selecting the transmission resource already scheduled by another UE comprises avoiding a transmission pattern already scheduled by another UE.

According to another aspect of the present disclosure, there is provided a user equipment (UE) comprising: a processor; and a non-transitory computer readable storage medium storing programming for execution by the processor, the programming including instructions for: measuring sidelink (SL) transmission resources; selecting a SL transmission resource for use in making a SL transmission to a target UE taking into account the measurements; transmitting, by the UE, SL control information comprising a scheduling assignment (SA) indicating the selected SL transmission resource; and transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, the programming further including instructions for: measuring SL transmission resources at different time instances; and averaging the different SL transmission resource measurements.

Optionally, the programming further including instructions for: determining a metric in respect of each SL transmission resource based on the measurements over a window of time prior to data transmission; wherein selecting the SL transmission resource comprises disqualifying at least one SL transmission resource from selection based on the determined metrics.

Optionally, the programming further including instructions for: determining a metric in respect of each SL transmission resource based on the measurements over a window of time prior to data transmission; wherein selecting the SL transmission resource comprises ordering the transmission resources based on the metric.

Optionally, performing measurements on SL transmission resources on a long-term basis prior to a sidelink transmission comprises measuring at least one of: reference signal receive power (RSRP); and reference signal receive quality (RSRQ).

Optionally, measuring the SL transmission resources comprises measuring energy levels across one or more frequency bands at a first time instance.

Optionally, the programming further including instructions for: performing a clear channel assessment (CCA) by comparing the measured energy levels to a specified threshold.

Optionally, performing measurements on SL transmission resources at a first time instance comprises: performing a measurement for a first SL transmission resource; when the measurement indicates the first SL transmission resource is being used, selecting a different SL transmission resource as the selected SL transmission resource; and when the short-term measurement indicates the first SL transmission resource is not being used, selecting the first SL transmission resource as the selected SL transmission resource.

Optionally, performing measurements on SL transmission resources at a first time instance prior to a sidelink transmission comprises performing the measurement for a plurality of SL transmission resources and determining which of the plurality of SL transmission resources are not being used for a current transmission period; and selecting a SL transmission resource for use in making a SL transmission to a target UE taking into account the measurements comprises selecting between the SL transmission resources that are determined not being used for the current transmission period.

According to another aspect of the present disclosure, there is provided a user equipment (UE) comprising: a processor; and a non-transitory computer readable storage medium storing programming for execution by the processor, the programming including instructions for: decoding a sidelink (SL) control channel transmitted by another UE to ascertain SL control information transmitted by the another UE and/or performing measurements on sidelink (SL) transmission resources; adaptively adjusting a SL transmission resource for SL transmission based on the decoding of the SL control channel and/or measurements on SL transmission resources; transmitting, by the UE, SL control information indicating the adaptively adjusted SL transmission resource; and transmitting, by the UE, an SL data communication using the adaptively adjusted SL transmission resource, wherein the SL control information and the SL data communication are transmitted by the UE without receiving, in a downlink control information (DCI), a grant of communication resources.

Optionally, adaptively adjusting a transmission SL resource comprises adjusting one or a combination of: a number of repetitions; a size of a transmission pattern; and a location of a transmission pattern.

According to another aspect of the present disclosure, there is provided a method comprising: adaptively selecting between at least two sidelink (SL) communication resource configurations to be used by the UE for SL transmissions; selecting a SL transmission resource for use in making a SL transmission to a target UE based on the selected SL communication resource configuration; transmitting, by the UE, SL control information according to the SL communication resource configuration; and transmitting, by the UE, an SL data communication according to the SL communication resource configuration, wherein the SL control information and the SL data communication are transmitted by the UE without receiving, in a downlink control information (DCI), a grant of communication resources.

Optionally, the adaptively selecting between at least two sidelink (SL) communication resource configurations to be used by the UE for SL transmissions is based on one or a combination of two or more of: traffic type, packet size, reliability target, latency target.

Optionally, sidelink control information comprises a resource allocation and power level for a sidelink transmission.

According to another aspect of the present disclosure, there is provided a UE configured to perform one of the methods summarized above or described herein.

A computer program product could include a non-transitory computer readable storage medium storing programming, the programming including instructions to perform any one or a combination of methods as disclosed herein.

BRIEF DESCRIPTION OF THE DRAWINGS

For a more complete understanding of the present disclosure, and the advantages thereof, reference is now made to the following description taken in conjunction with the accompanying drawings, in which:

FIG. 11A is a plot illustrating an example of a configuration of an SA.

FIG. 11B is another plot illustrating an example of a configuration of an SA.

FIGS. 18A to 18D are examples of resource patterns

FIG. 20 is an example of multiple SL transmission resource configurations that are selected between;

DETAILED DESCRIPTION

Figure 1A:
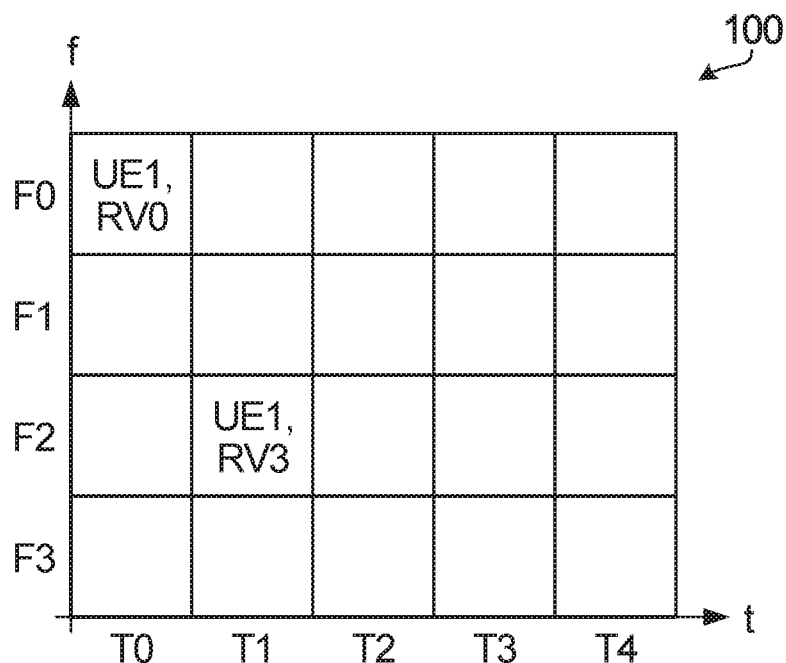
FIG. 1A is a block diagram illustrating an example of a two-dimensional resource configuration for grant-free SL transmission.

For illustrative purposes, specific example embodiments will be explained in greater detail below in conjunction with the figures. It should be appreciated, however, that the present disclosure provides many applicable concepts that can be embodied in a wide variety of specific contexts. The specific embodiments discussed are merely illustrative and do not limit the scope of the present disclosure.

A conventional long-term evolution (LTE) SL transmission scheme relies on the concept of a resource pool (RP) defining a pool of communication resources that are available for SL communication. The SL is used for both transmit (Tx) and receive (Rx) functions, and a UE may not be able to both transmit and receive communications at the same time, i.e., it can either transmit or receive sidelink communications at one time. This is because UEs are typically half duplex devices.

The conventional LTE SL transmission scheme includes two transmission modes, known as "mode 3" and "mode 4".

In mode 3, a BS transmits to a UE control information using a "downlink control information" (DCI), which schedules time-domain and frequency-domain communication resources (from an RP) for SL transmission. This scheduling may be performed dynamically or semi-persistently using a DCI. However, scheduling of the SL transmission resources by the BS results in latency. Before the UE can transmit on the SL, it must wait for the DCI from the BS. Furthermore, the dynamic nature of the resource scheduling increases the signaling overhead associated with an SL transmission.

In mode 4, the UE autonomously selects resources within the RP, which avoids the latency issue associated with mode 3. However, the RP in mode 4 is not designed to prevent two UEs from selecting the same resource for SL communication. Since there is no direct control, by the network or the BS, of the resources used for SL communication within the RP, two UEs can cause a message collision by independently selecting the same resource. When this happens, the collision may cause reliability issues for the message, which may not be successfully decoded by the intended receivers.

Aspects of this disclosure provide a new SL transmission mode for communications in a wireless network. In this disclosure, the new SL transmission mode may be referred to as a "grant-free transmission mode" or as a mode for data transmissions that are performed without communicating dynamic scheduling.

In conventional UL transmissions, whether they be grant-based or "grant-free," the BS knows the parameters and resources used for the UL transmission because those parameters and resources are configured by the BS. This greatly reduces the complexity of the UL transmission, and particularly it does not require uplink control signaling to be associated with the UL transmission to indicate the transmission resources and parameters used for the UL transmission. In a grant-based UL transmission, for example, the required transmission parameters are typically communicated to a UE via a Physical Downlink Control Channel (PDCCH). The base station is aware of the identity of the UE sending the UL transmission using the granted UL resources, because the BS specifically granted those UL resources to that UE in a scheduling grant sent in PDCCH.

In a conventional UL grant-free transmission from a UE to a BS, for example, different UEs could send UL transmissions using UL communication resources configured semi-statically in UE-specific RRC signaling, without specifically requesting use of the resources in a dynamic manner, and without receiving a dynamic scheduling grant of the resources sent in a DCI by the BS. The grant-free transmission typically achieves low latency and reduced scheduling overhead as compared to the grant-based UL transmission. The BS receiving the grant-free UL transmission knows the communication parameters of the UL transmission because the BS has previously configured the UE performing the grant-free UL transmission semi-statically. Although, the BS may not have complete information about which UE, if any, is sending a grant-free UL transmission at a particular moment of time if multiple UEs are configured to be able to access the same resources, the BS is able to detect the grant-free transmissions and determine the UE based on the configuration parameters (e.g. using DMRS parameters and time and frequency resources).

While it is also desirable to achieve the advantages of grant-free transmission for SL communications between UEs, the nature of SL communications creates particular challenges for implementing grant-free transmissions. In contrast to UL grant-free transmissions where the receiver is a BS with high awareness, both the transmitter and receiver are UEs in SL grant-free transmissions. Therefore, the receiving UE is not aware of the transmitting UE's configuration parameters, such as which UE is transmitting, the ultimate target of the data (e.g., another UE), the time-domain and frequency-domain communication resources used for the transmission, and other control information.

The present disclosure presents a new grant-free transmission mode for SL transmission, which includes an SL control channel, also known as scheduling assignment (SA), or sidelink control information (SCI) to mitigate the challenges associated with implementing grant-free transmissions in SL communications. The SL control channel may include control or configuration information such as information indicating which UE is transmitting, the target UE or BS for the data, the time-domain and frequency-domain communication resources used for the transmission, and/or other configuration information. A receiving UE may decode the SL control channel first to obtain this information before decoding the data transmission.

Grant-free transmissions are sometimes called "grant-less", "schedule free", or "schedule-less" transmissions. Grant-free SL transmission can also be referred to as SL "transmission without grant", "transmission without dynamic grant", "transmission without dynamic scheduling", or "transmission using configured grant", for example.

In various embodiments, the transmitting UE indicates its specific SL transmission pattern to a destination UE or multiple destination UEs in the SL control channel. The SL transmission pattern is configured by the BS, to enable grant-free SL communications. The specific SL transmission pattern allows a grant-free SL communication from one UE to avoid colliding with a grant-free SL communication of another UE.

The term collision as used herein refers to a situation in which multiple UEs are transmitting signals using the same communication resource or overlapping communication resources, such that the multiple UEs' transmission signals may interfere with each other, making it more difficult for the respective receivers to decode the transmitted signals.

For example, a collision occurs when UEs that are transmitting in the same time-frequency resource in the same time slot.

Collision represents an example of a scenario in which an SL transmission by a UE might not be received by another UE. Half duplex devices, as noted above, can either transmit or receive sidelink communications at any time. A half duplex UE cannot receive an SL transmission while it is also transmitting. SL transmission patterns could also or instead be used to mitigate the problem of missing signals from one or more other UEs due to transmitting at the same time.

An SL transmission pattern represents a sparse set of communication resources. More specifically, the SL transmission pattern defines how communication resources are to be used by UEs for SL transmissions, and can be designed to enable all UEs in a cooperation group to communicate with each other even if some transmissions are transmitted in a grant-free manner (i.e., without dynamic scheduling). This could be especially useful in applications such as V2X and UE cooperation, and/or other applications as well.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block (TB), i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern. This can be done by checking whether there is an SA transmitted from other UEs, and if an SA is detected, the UE may further check whether the associated data transmission is destined to the UE, and if so, the UE may use the information from the SA to further decode the data transmission that is destined to this UE. Alternatively, a UE may listen to other UEs or check other UE's SL control information as long as it is not transmitting in the same slot.

The present disclosure also provides signaling mechanisms for the proposed grant-free SL communications. As described above, SL control channels may be used to accommodate SL data transmission. Some embodiments described herein outline signaling mechanisms that could be used to for grant-free SL communications using transmission patterns.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool, as well as the communication resources for SL data and control. Transmission pattern pool may also be signaled by broadcast signaling (e.g. in SIB).

In an embodiment referred to as mode 1, an example of distributed grant-free communication is provided. In this embodiment, RRC signaling configures a transmission pattern for a specific UE.

In an embodiment referred to as mode 2, another example of distributed grant-free communication is provided. RRC and system information block (SIB) signaling configure or pre-define a transmission pattern pool, and a UE randomly selects a transmission pattern from within the transmission pattern pool. A common transmission pattern pool can be defined for RRC_idle and RRC_inactive UEs, for example.

The above embodiments are distinct from conventional SL transmission modes. Compared to mode 3, in which the resource is dynamically scheduled by a DCI, the resource is semi-statically configured in the above mode without a dynamic grant. Furthermore, the scheduling in these embodiments may be accomplished by RRC signaling, rather than DCI signaling in mode 3. Compared to mode 4, the UE in these embodiments does not perform autonomous resource selection, as the UE transmits according to the configured transmission pattern. In embodiments, the RRC signaling may configure the transmission pattern to mitigate potential collisions or reduce the impact of the half duplex constraint between the SL transmissions of the UE and SL transmissions of other UEs. Furthermore, in LTE V2X, the UE may be configured with a receive RP similar to a transmitter RP, where a UE should listen to all channels within the received RP. In grant-free SL transmission modes described herein, there is no need to configure a transmit and receive RP.

Embodiments disclosed herein also differ from NR's configured grant or grant-free UL transmission in several aspects. First, some of the embodiments disclosed herein relate to grant-free SL transmissions, and therefore the resource configuration for these transmissions is for different channels than in UL transmission. For example, in the SL, the PSSCH (physical sidelink shared channel) and PSCCH (physical sidelink control channel) may be configured, as opposed to the PUSCH (physical uplink shared channel) in the UL. Second, in UL transmissions, the receiver (a BS, for example) knows the resource configuration of the UL, as described above. In contrast, in the SL, resource configuration is not known by the receiver (a UE, for example). Third, in configured grant UL transmission, only a repetition number can be configured, not a transmission pattern. In NR's configured grant UL transmission, the repetitions according to the repetition number, if configured, are performed in the slot immediately following initial transmission. This is because NR UL does not have the issue of half duplex constraint as all UEs only transmit in the UL and do not need to listen in the UL.

In distributed grant-free mode for SL transmission as disclosed herein, a UE could use a transmission pattern to transmit and retransmit a data block with a fixed repetition number according to the transmission pattern, without any HARQ feedback. In this type of application, a transmission pattern could be considered a repetition pattern.

In further embodiments, a transmission pattern pool can be applied to UE groups for UE cooperation. A UE may select a transmission pattern from the transmission pattern pool according to its UE index or the UE may randomly select a transmission pattern from the transmission pattern pool, for example.

In some embodiments, the SL transmission may use cyclic-prefix (CP) orthogonal frequency division multiplex (OFDM), similar to the waveform used for LTE downlink transmission. In some embodiments, the sidelink transmission may use single carrier frequency division multiple access (SC-FDMA), similar to the waveform used for LTE uplink transmission. In some embodiments, the sidelink transmissions may use non-orthogonal multiple access (NOMA), such as: sparse code multiple access (SCMA), interleave-grid multiple access (IGMA), multi-user shared access (MUSA), low code rate spreading, frequency domain spreading, non-orthogonal coded multiple access (NCMA), pattern division multiple access (PDMA), resource spread multiple access (RSMA), low density spreading with signature vector extension (LDS-SVE), low code rate and signature based shared access (LSSA), non-orthogonal coded access (NOCA), interleave division multiple access (IDMA), repetition division multiple access (RDMA), or group orthogonal coded access (GOCA).

Illustrative embodiments will now be described in more detail below.

FIG. 1A is a block diagram illustrating an example of a two-dimensional resource configuration for grant-free SL transmission. FIG. 1 illustrates a resource grid 100, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 100 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 100 could indicate only the time-domain signature or time-domain transmission pattern, and other dimensions (e.g. the frequency-domain dimension) may be derived from it.

Figure 1B:
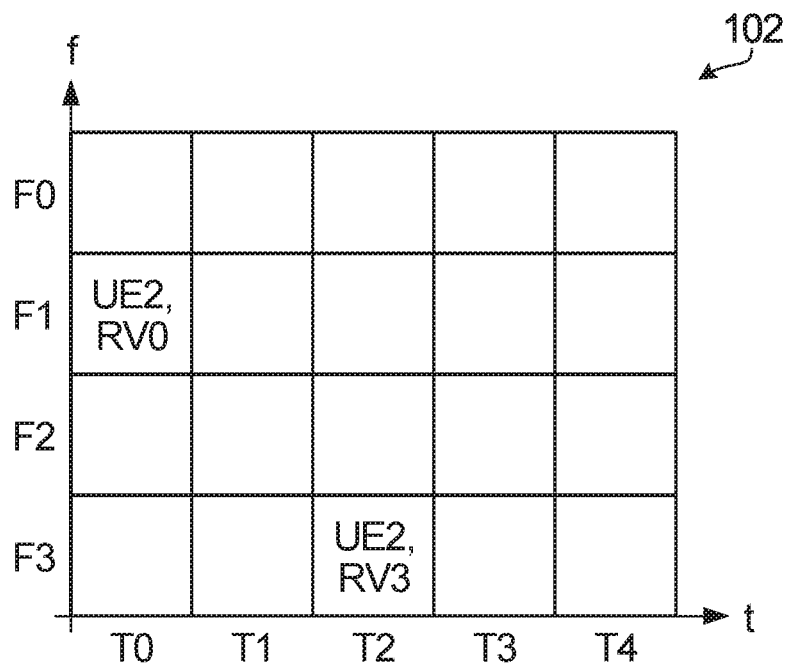
FIGS. 1B-1K are block diagrams illustrating other examples of two-dimensional resource configurations for grant-free SL transmission.
Figure 1C:
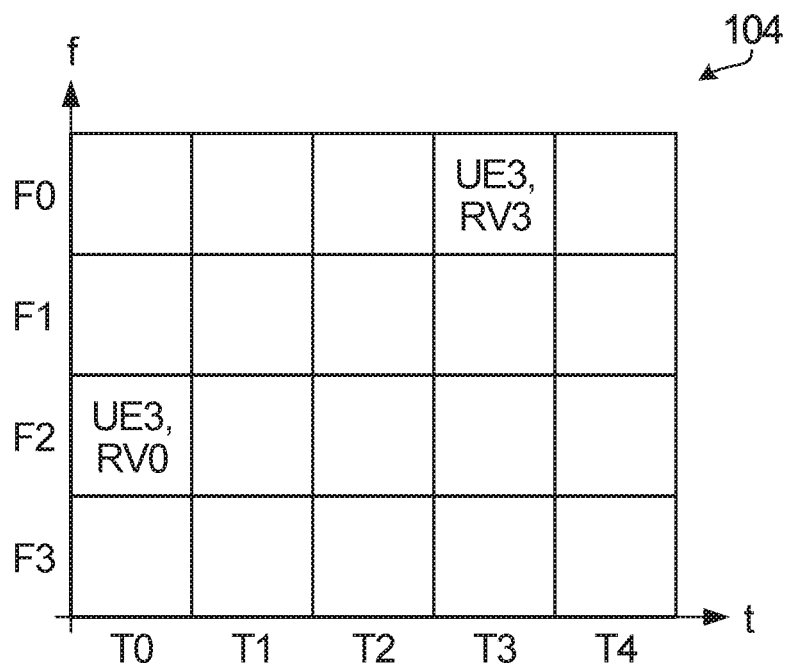
Figure 1D:
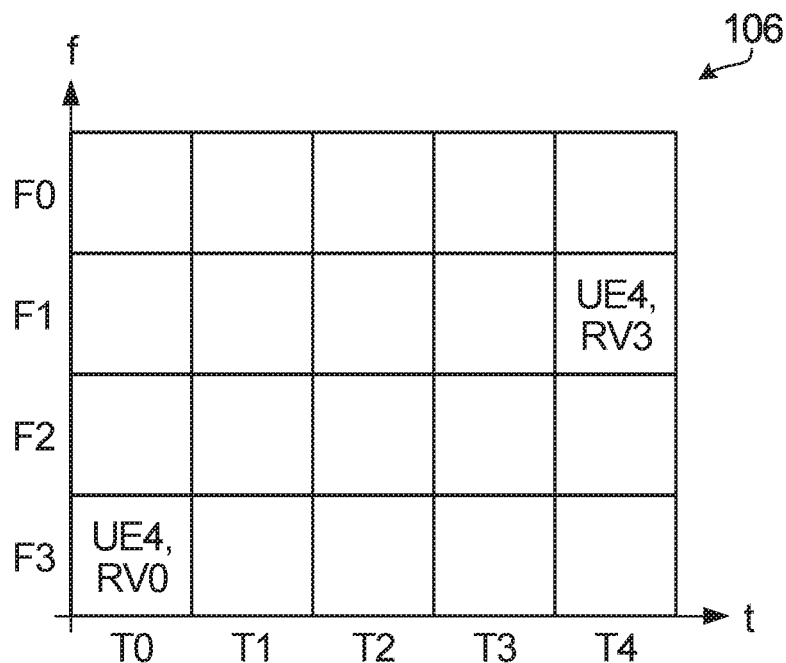
Figure 1E:
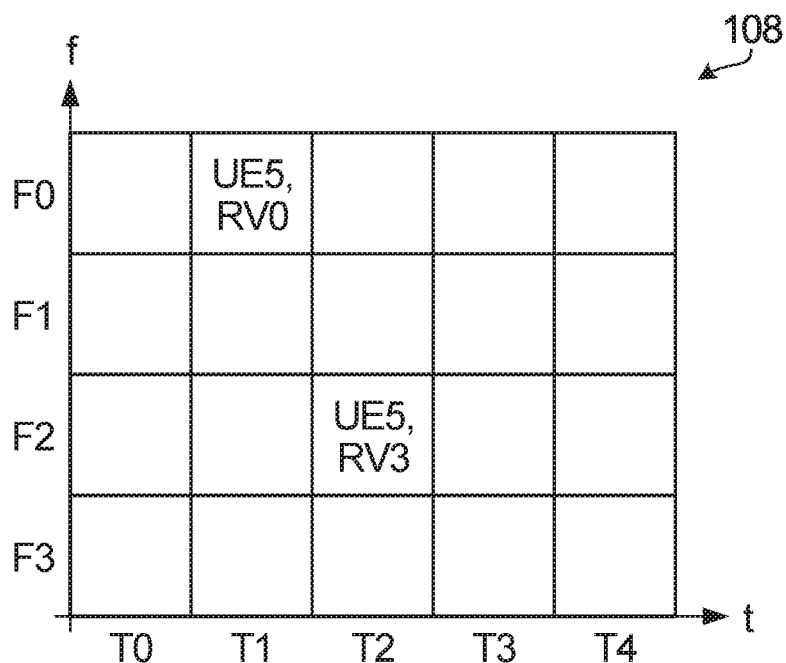
Figure 1F:
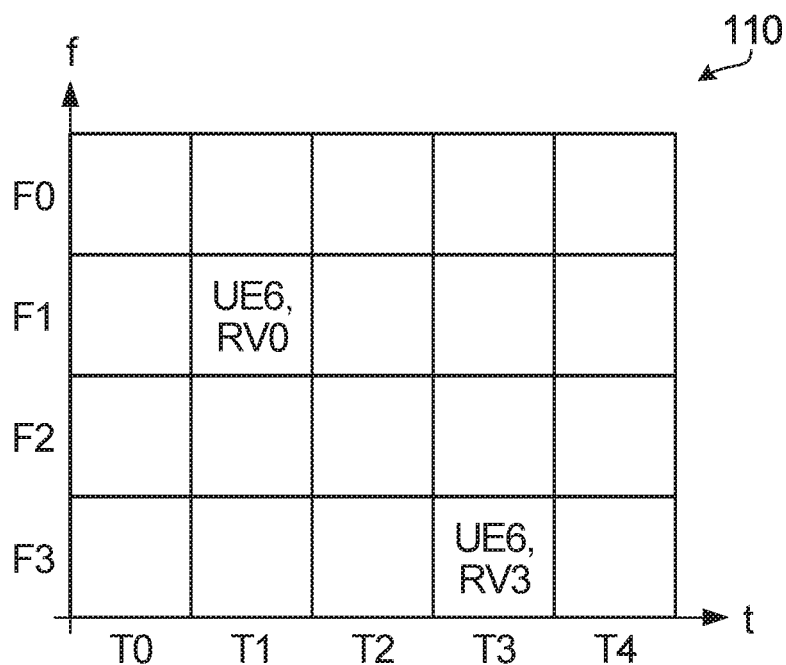
Figure 1G:
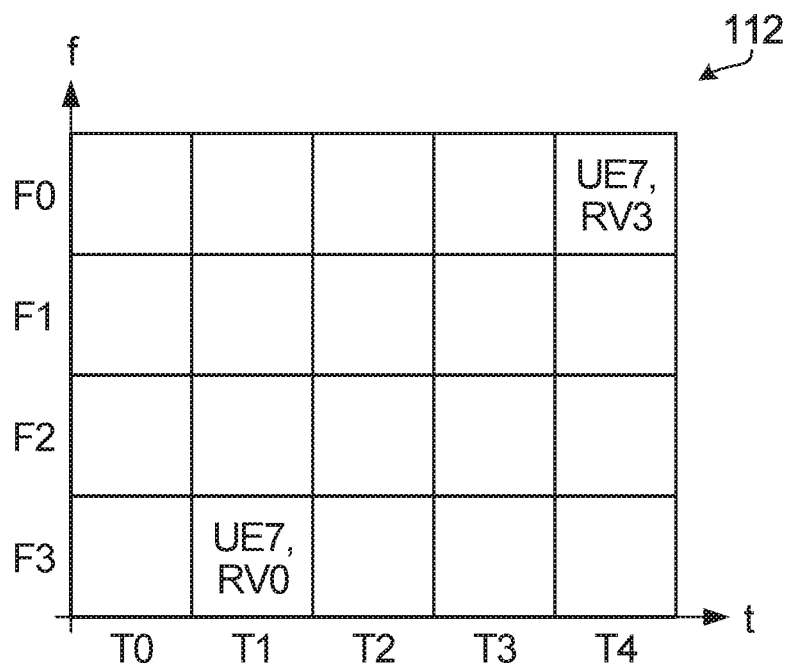
Figure 1H:
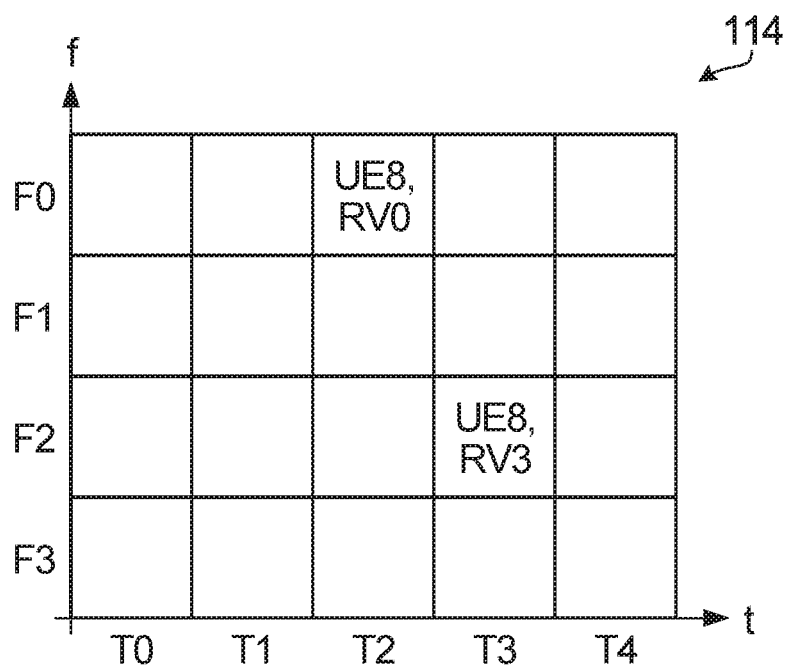
Figure 1I:
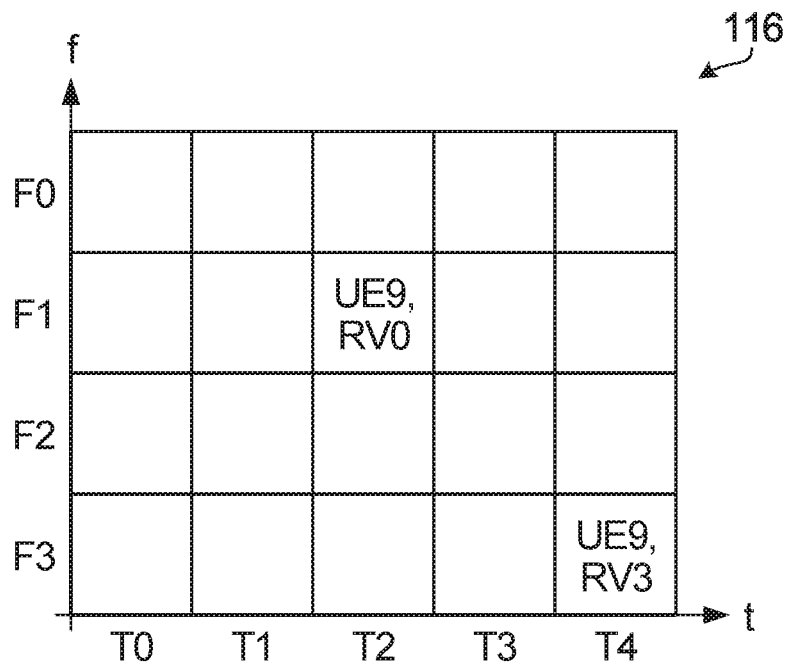
Figure 1J:
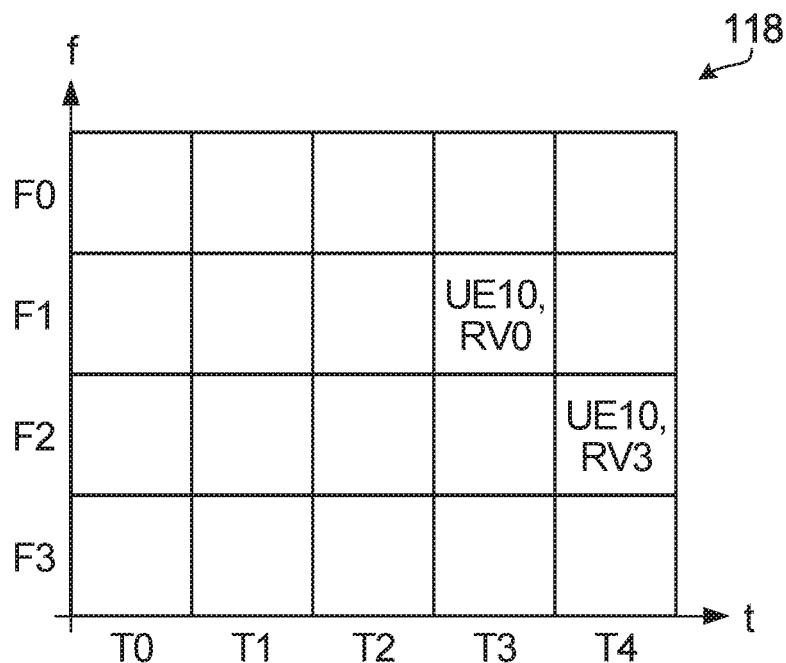

FIG. 1B is another block diagram illustrating an example of a two-dimensional resource configuration for grant-free SL transmission. FIG. 1B illustrates a resource grid 102. Resource grid 102 includes the same frequency-domain resources F0, F1, F2 and F3, and time-domain resources T0, T1, T2, T3 and T4 as resource grid 100 in FIG. 1A. FIG. 1B also illustrates a transmission pattern for UE2.

Resource grid 102 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 102 for UE2 are different from the time-frequency communication resources indicated in resource grid 100 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 104, 106, 108, 110, 112, 114, 116 and 118, respectively, each resource grid including the same frequency-domain resources F0, F1, F2 and F3, and time-domain resources T0, T1, T2, T3 and T4 as resource grid 100 in FIG. 1A. Resource grids 104, 106, 108, 110, 112, 114, 116 and 118 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 100, 102, 104, 106, 108, 110, 112, 114, 116 and 118 are unique.

Figure 1K:
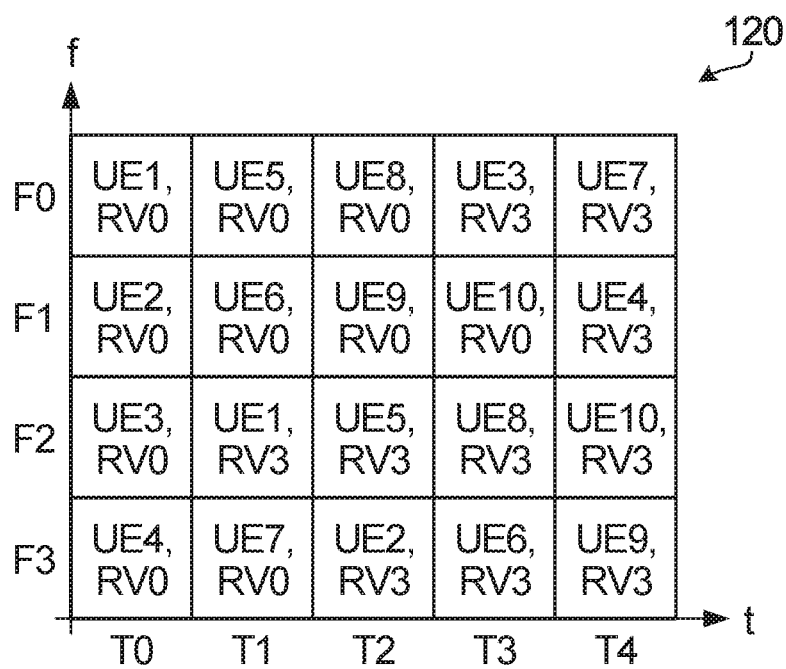

FIG. 1K is yet another block diagram illustrating a two-dimensional resource configuration for grant-free SL transmission. FIG. 1K illustrates resource grid 120, which also includes the same frequency-domain resources F0, F1, F2 and F3, and time-domain resources T0, T1, T2, T3 and T4 as resource grid 100 in FIG. 1A. Resource grid 120 is a superposition of resource grids 100, 102, 104, 106, 108, 110, 112, 114, 116 and 118. Therefore, resource grid 120 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. There may be control information (SA) associated with the TB to be transmitted on separate resources in PSCCH channel.

In FIG. 1K, according to their respective transmission patterns, each UE transmits a TB twice over the length of the configured transmission pattern, therefore the repetition number of each transmission pattern is 2. As explained below, this allows each UE receive at least one transmission of the TB by the other UEs.

UE1 cannot receive in T0 and T1 because of the half duplex constraint. As such, UE1 cannot receive the first transmission of UE2, UE3 and UE4. However, by virtue of the configuration of the transmission pattern pool or UE specific transmission pattern, UE1 is able to receive the second transmissions of UE2, UE3 and UE4 in at least one time slot over the length of the transmission pattern, which is five time slots in this example.

Regarding reception, UEs could resolve transmissions from different transmitting UEs in any of various ways. In the example shown in FIG. 1K, UE5 to UE10 could differentiate the transmissions received from UE1 to UE4 using the frequency-domain dimension. Another example is that UE1 to UE4 may have overlaps in time and frequency domain resources for their first transmission, but they may use different codebook/spreading codes or layers to resolve the collision using orthogonal codes or non-orthogonal multiple access (NOMA) transmission schemes.

In general, the repetitions of each UE transmission over the length of a transmission pattern transmit the same TB. However, the RVs associated with the repetitions may be configured differently. In the example shown in FIG. 1K, different RV sequences are used in each repetition. Thus, repetitions of a TB might not necessarily be exactly the same. Repetitions could use different coding parameters such as different RV sequences, for example, to increase the likelihood that a subsequent repetition can be correctly decoded by a receiving UE after failure of a previous transmission of the same data block or transport block. Each repetition may also be associated with a RV that can be the same or different for different repetitions of the TB, which can be predefined or preconfigured (e.g. configured using a UE specific RV sequence indicating the associated RV to each repetition)

At a receiving UE, each transmission from a transmitting UE may be independently decoded. Alternatively, transmissions from multiple UEs in the case of UE cooperation during the multicast phase and the cooperation phases may be jointly decoded by the receiving UE.

In some embodiments, low density spreading (LDS) may be applied in the time-domain to transmissions. More generally, any other type of symbol level or bit level spreading used in multiple access scheme can be applied to time domain defined by the transmission pattern instead of frequency domain for such transmissions. For example, the transmission symbol may be multiplied by a spreading sequence and the output symbol is spread at different time slot of the transmission pattern.

In some embodiments, the transmission resources in the "on" slot of the transmission pattern may be combined together to transmit a bigger transport block.

In some embodiments, each transmission resource in the "on" slot of the transmission pattern may be used to transmit independent packets. It should be understood that FIGS. 1A-1K provide possible examples of a transmission pattern configuration and transmission pattern pool. Other transmission pattern pools using different numbers of time-domain resources, frequency-domain resources, and/or other communication resources are possible. In addition, other configurations of transmission patterns included in the transmission pattern pool are possible. For example, for a two-dimensional transmission pattern pool with a repetition number (K) of 2, a length of time-domain resources of (M), and a length of frequency-domain resources of (N=M+1), the number of transmission patterns the transmission pattern pool can support and allow for each UE to receive a transmission by each other UE in at least one transmission/reception slot could be defined as:

$$\text{number of repetition patterns} = \frac{M*N}{K}. \quad (1)$$

Figure 2:
FIG. 2 is a block diagram illustrating another example of another two-dimensional resource configuration for SL transmission.

FIG. 2 is a block diagram illustrating another example of another two-dimensional resource configuration for SL transmission. FIG. 2 illustrates resource grid 200. FIG. 2 also illustrates a UE index (identified as UE1, UE2 . . . or UE 10) and an RV sequence (which is {0 0 0 0} indicating that every transmission uses RV0) assigned to each communication resource.

In FIG. 2, as in FIG. 1K, each UE index (UE1 to UE10) is configured with a transmission pattern, which defines the transmission repetition number as well at the communication resources for the repetitions. A single UE index is used to indicate both communication resource domains (time and frequency domain or time and code domain, for example). The communication resources assigned to UE1 are part of the transmission pattern for UE1. Similarly, the communication resources assigned to UE2 to UE10 are part of the transmission patterns for these UE indexes. The collection of these transmission patterns forms a transmission pattern pool.

A UE may be configured with a transmission pattern pool and randomly select a transmission pattern from the transmission pattern pool. In one embodiment of configuring the transmission pattern pool, a repetition number (K) and a length of the transmission pattern are indicated. In one embodiment, all transmission patterns that satisfy the K and length parameters and a given range and partition of time granularity (e.g. slot T0 to T4 in FIG. 1K) and frequency sub-channels (e.g. F0-F3 in FIG. 1K) that are included in the transmission pattern pool are considered to be the candidate transmission patterns among the pattern pool. The range and partition the frequency sub-channels (F0-F3 in FIG. 1K) may also be indicated for the transmission pattern pool. In another embodiment, not every possible transmission pattern that satisfies the K and length parameters are necessarily included in the transmission pattern pool. Only a subset of all of the possible transmission patterns could be selected for the pool. An example of such subset of possible transmission patterns among the pattern pool are the transmission patterns corresponding to UE1 to UE10 as indicated in FIG. 1K. A UE may also be configured with starting time location of the transmission pattern for the transmission pattern pool configuration.

In order for a UE to transmit without dynamic grant on the SL according to a transmission pattern, the transmission pattern or transmission pattern pool must somehow be determined by the UE, and could be signaled to the UE. The signaling of transmission patterns and/or transmission pattern pools could be done through, for example, system information blocks (SIB), cell specific RRC signaling, UE specific RRC signaling and/or DCI signaling.

The different dimensions of the resource configuration could be configured separately using UE specific RRC signaling. Alternatively, a combination of two or more of time-domain, frequency-domain, code-domain, DMRS and other resources could be configured together using a single UE index. The signaling of the UE index can be UE specific RRC signaling or any of the signaling methods described above. The mapping between the UE index and communication resources in a transmission pattern may be performed by a UE, or may be predefined and/or signaled to the UE by RRC signaling. The mapping may be in a form of a mapping table or a rule or equation that defines the resources in different dimensions for a given UE index. The mapping table or rule, if predefined, should be such that each UE is able to receive at least one transmission from each of the other UEs. As in the example shown in FIGS. 1A, 1B, and 1K, the transmission of two different UEs (e.g. UE1 and UE2) in the same slot may be mapped to different frequency subchannels. In addition, if two UEs (or UE indices) have a first transmission of a TB at the same time slot, then their second transmission should be mapped to a different time slot to overcome the half duplex constraint. For example, for K=2, a one to one mapping of M (M=4 in FIG. 1A-1K) frequency-domain resources can be created with an M+1 length time-domain pattern, to support M*(M+1)/2 time-frequency channels to be allocated to M*(M+1)/2 different UEs.

In some embodiments, a transmission pattern can be defined on resources that are included in a configured RP, or without explicitly configuring a RP.

Figure 3A:
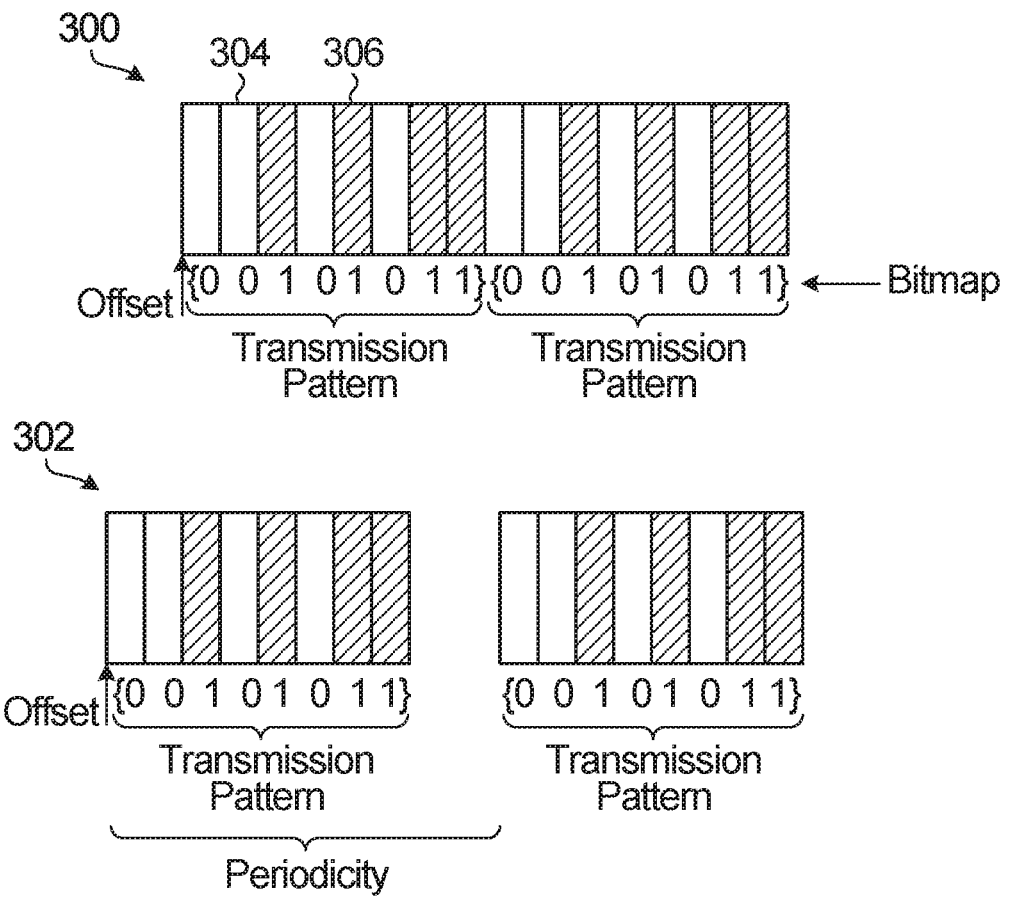
FIG. 3A is a block diagram illustrating an example of two different ways of configuring a transmission pattern for a time-domain resource configuration.

FIG. 3A is a block diagram illustrating an example of two different ways of configuring a transmission pattern for a time-domain resource configuration. FIG. 3A includes transmission patterns 300, 302, which include "off" slots (one of which is labeled as 304) in which a UE does not transmit, and "on" slots (one of which is labeled as 306) in which a UE may perform SL transmissions. SL transmissions may include, for example, V2X transmissions. In general, slots 304 and slots 306 define the transmission patterns. Although referred to primarily as slots, each slot 404, 406 could be, for example, a subframe, a mini-slot, an OFDM symbol, a number of OFDM symbols or any other time unit.

The transmission patterns 300, 302 of FIG. 3A also include an offset, which indicates the starting location of the transmission patterns, and could be a slot index or identifier or an offset from a particular slot or the start of a frame for example. The transmission pattern 302 also includes a periodicity, which defines a time gap between starting locations of two adjacent transmission patterns where the transmission patterns may periodically occur over time.

Each transmission pattern may be represented using a bitmap, as shown. In the bitmap {00101011} in FIG. 3, a "1" represents a time unit (e.g. a slot 306) that is available for SL transmission and a "0" represents a time unit (e.g. a slot 304) in which an SL transmission is not performed by a UE that is using the patterns 400, 402. The bitmap may repeat itself without a gap between adjacent repetitions as shown at 300, or with a gap as shown at 302.

The number of slots 306 within one transmission pattern, four in the examples shown in FIG. 3A, represents the repetitions number (K) for a repetition pattern, or more generally the communication resources that may be used for SL transmissions. As described earlier, the transmission pattern may define the resources used for a number of transmissions of a TB. The transmissions may include the initial transmission and retransmissions of the same TB. The initial transmission and retransmission of the TB may some-times also be referred to as repetitions. In some embodiments, each transmission pattern may represent transmissions of one transport block (TB), i.e., a UE should start initial transmission of a TB at the first "on" slot 406 in the transmission pattern, and continue repetition of the TB on all the "on" slots 406 using an RV corresponding to the configured or predefined RV sequence until the end of the time defined by the transmission pattern. Thus, in some embodiments, the transmission pattern indicates the repetition number (K). In some embodiments, a UE may also listen to other UE's transmissions in the "off" slots defined by the transmission pattern or any slot that is not defined as an "on" slot in the transmission pattern. This can be done by checking whether there is an SA transmitted from other UEs, and if an SA is detected, the UE may further check whether the associated data transmission is destined to the UE, and if so, the UE may use the information from the SA to further decode the data transmission that is destined to this UE. Alternatively, a UE may listen to other UEs or check other UE's SL control information as long as it is not transmitting in the same slot.

Control signaling to configure transmission patterns could include a bitmap as shown in FIG. 3A. Signaling could also indicate the offset/starting point of the transmission pattern.

As illustrated by the transmission pattern 300, the offset or starting time location defines a starting time location of one transmission pattern, and the transmission pattern could repeat among all available slots, such as all slots in a larger frame. For example, the transmission pattern could repeat within a larger time frame, e.g. 10240 subframes, excluding DL only or DL dominant slots. The larger time frame can be the length defined by the maximum allowable system frame number (SFN). For example, in LTE or NR, the maximum SFN is 1024 and each system frame consist of 10 subframes, thus the larger time frame is equal to 10240 subframe or 10240 ms with each subframe equal to 1 ms. In some embodiments, at the end of the larger time frame (10240 subframes for example), there might not be enough additional subframes for another complete repetition of the transmission pattern. Instead of having a transmission pattern "split" across a time frame boundary, with a partial transmission pattern after 10240 subframes and continuing in the next 10240 subframes, the transmission patterns could have the same relative location within each set of 10240 subframes. In other words, the transmission pattern may be defined within a larger time frame, where the starting location and periodicity are defined as the location within the larger time frame, and different larger time frame have the same relative location of transmission patterns.

As shown at 302, the periodicity could be defined the time domain gap between starting locations of two adjacent transmission patterns, such as when there are otherwise allocated resources or some other gap between two adjacent transmission patterns. The resources for the transmission pattern may occur periodically, and that is defined by the offset and periodicity in some embodiments, where offset indicates the starting time location of a transmission pattern and the transmission pattern appears periodically with the gap between two transmission patterns as periodicity. In some cases, a BS may signal the periodicity using RRC signaling.

Figure 3B:
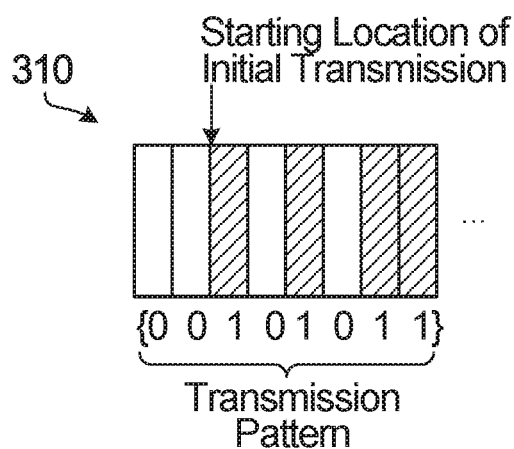
FIG. 3B is a block diagram illustrating another example of how a transmission pattern could be configured.

In some embodiments, instead of indicating the starting time location of the transmission pattern, a BS may instead indicate the starting time location of the initial transmission of the TB. An example of such indication of the starting time location is shown in FIG. 3B, which is a block diagram illustrating another example of how a transmission pattern 310 could be configured.

In other embodiments, the bitmap that indicates the transmission pattern always start with '1', in which case, the starting time location (offset) of the transmission pattern is the same as the starting time location of the initial transmission of a TB. A transmission pattern as shown at 310 could then be configured with a bitmap {101011}, a starting location of the initial transmission, and a periodicity. Another possible configuration, if transmission patterns repeat without a gap as in FIG. 3A, could use a bitmap {10101100} and a starting location of the initial transmission, with the trailing zeros at the end of the bitmap instead of leading zeros for non-transmission slots.

Figure 4:
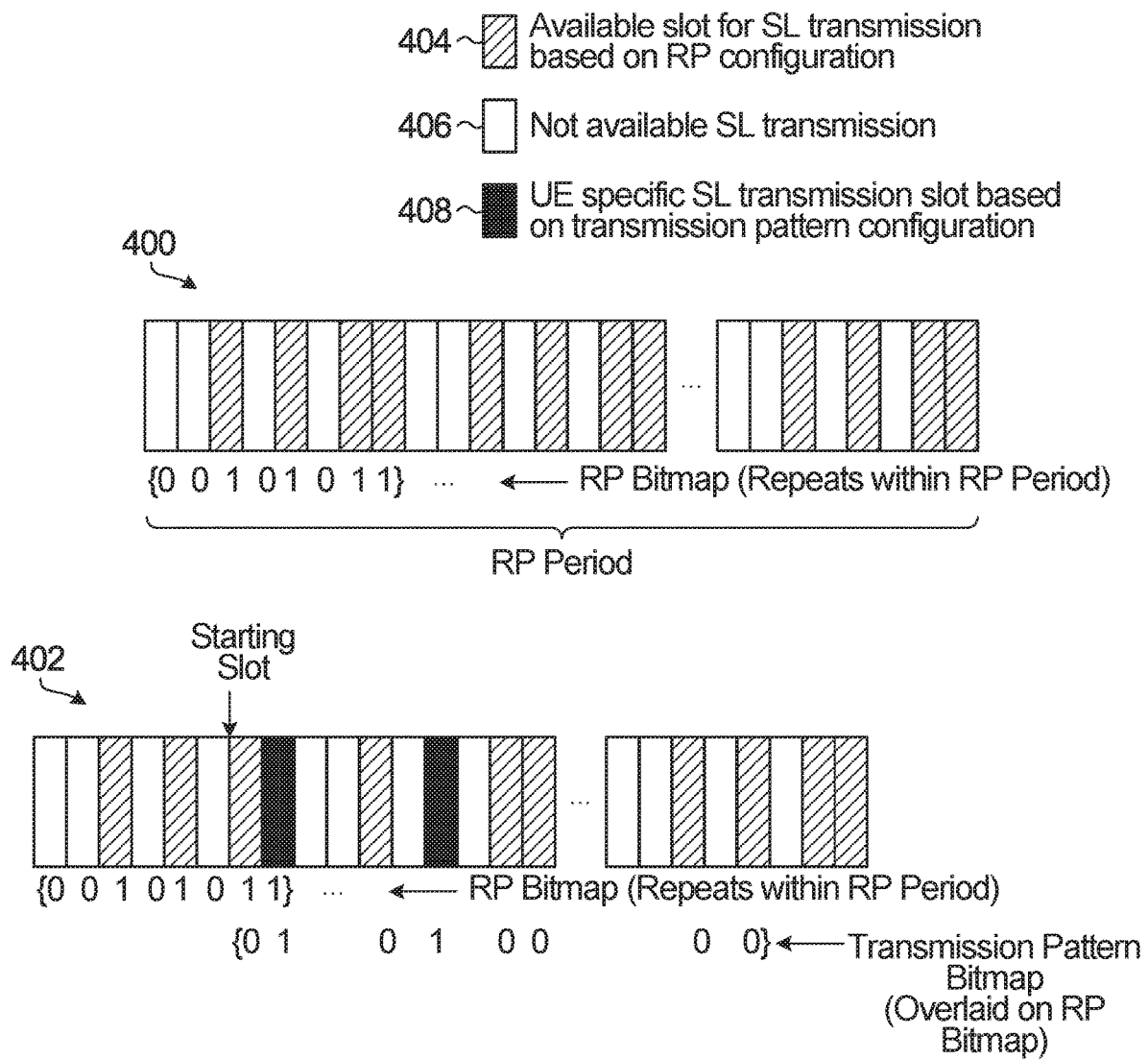
FIG. 4 is a block diagram illustrating an example of a transmission pattern that is defined within a configured RP.

FIG. 4 is a block diagram illustrating an example of a transmission pattern that is defined within a configured RP. This is an example of including a transmission pattern in an RP, or transmission pattern configuration on top of (or overlaid on) RP configuration. FIG. 4 includes RPs 400, 402. The RPs 400, 402 include slots, which as noted above with reference to FIG. 3A could be other types of time units. FIG. 4 also illustrates an RP period and a starting slot.

Two types of slots are shown in the RP 400. Slots 404 are available for SL transmissions, and slots 406 are not available for SL transmissions. The configuration of the RP can be cell specific or UE specific, e.g. in UE specific or cell specific RRC signaling or system information.

The RP 402 is overlaid with a transmission pattern. Slots 408 in the RP 402 represent particular ones of the available slots 304 that are transmission slots or "on" slots in a transmission pattern configuration for a particular UE. In other words, slots 408 may correspond to transmission slots included in the transmission pattern for a UE. Other SL-available slots in 402 do not correspond to transmission slots in the transmission pattern, and therefore a UE that is using the example transmission pattern shown in FIG. 4 could use these slots to listen for transmissions from other UEs.

The RP period is the length of time over which the RPs 400, 402 repeat. In some embodiments, the RP period is 10240 ms, corresponding to 1024 frames defined using system frame number (SFN), where each frame is 10 ms and contains 10 subframes of 1 ms each.

The RPs 400, 402 may be represented using a resource bitmap{00101011}, where a "1" represents a time unit (e.g. a slot) that is available for SL transmission and a "0" represents a time unit that is not available. The time unit can be a slot, a subframe, a mini-slot, an OFDM symbol, a number of OFDM symbols or any other time unit. The resource bitmap may repeat within the RP period as shown in FIG. 4.

A starting time unit (e.g. slot) for the transmission pattern may also be indicated, as shown by way of example in RP 402. In this example, the repetition number, which is the number of repetitions (including initial transmission) or transmissions to be performed by the UE for a TB in some embodiments, could be explicitly signaled as a value K=2 or implicitly indicated through the "on" slots in the transmission pattern. Further, the transmission pattern that is overlaid on RP 402 may also be presented in a time-domain transmission pattern bitmap beginning at the starting slot, and in this example the bitmap is {01010000}. The starting slot, or in general, the starting time location, may be indicated as an offset, which defines the actual time location of the beginning of the transmission pattern. The offset can indicate an absolute time location or a time location with respect to SFN=0, i.e. the location within the duration defined by the maximum system frame number. The offset may be defined as a slot number, a symbol number or any other granularity of time unit. For example, with a maximum SFN of 1024 as in LTE or NR, the offset may define a slot number within 1024 frames or 10240 subframes. In a time-domain transmission pattern bitmap, a "1" corresponds to an "on" transmission slot (or in general a transmission time unit) in the transmission pattern for a specific UE, and a "0" corresponds to an "off", non-transmission slot in the transmission pattern for a specific UE. As shown in FIG. 4, the transmission pattern bitmap is defined only on the available slots 404 within the RP 400. The length of the transmission pattern is the time domain duration of the pattern. In the example where the time domain transmission bitmap is {01010000}, the length of the pattern is 8 time units. The time-domain transmission pattern bitmap, like the RP bitmap, may also repeat within the RP period. In some embodiments, a UE may also listen to other UE's transmissions in the "off" slots defined by the transmission pattern or any slot that is not defined as an "on" slot in the transmission pattern. Alternatively, a UE may listen to other UEs or check other UE's SL control information as long as it is not transmitting in the same slot. In some embodiments, a UE only listens to other UE's transmission within the slot defined in RP as long as it is not transmitting at the same time.

In some embodiments, the time domain resource configuration may define or directly indicate the time location of an initial transmission of a TB and/or a time gap between the initial transmission of the TB and a repetition of the TB. In some embodiments, the time domain configurations could include time domain resource configuration of physical sidelink shared channel (PSSCH) and/or physical sidelink control channel (PSCCH), frequency domain resource configuration of PSSCH and PSCCH, the transmission pattern, repetition related parameters (e.g. repetition number K, length of the transmission pattern, RV sequence for repetition), code domain resource configuration, waveform configuration, resource configuration for DMRS etc. The transmission pattern can be part of time-domain and frequency domain resource configuration. Each signaling term may be optional. The time-domain resource configuration may also include mini-slot related information, such as the starting symbol and length, in terms of number of symbols of one transmission, and PSSCH/DMRS mapping type.

The time domain resource configuration may include optionally an RP period, optionally an offset (also referred to as starting slot), transmission pattern bitmap, repetition number (K), RV sequence for repetition, and optionally length of the transmission pattern. If an RP is already configured, the transmission pattern bitmap can be defined on top of (or overlaid on) RP configuration, as shown in FIG. 4. The configuration can also be done without an RP configuration, as shown in FIGS. 3A and 3B. The meaning of a repetition bitmap with and without a RP configuration should be clear from FIG. 4 (with RP configuration) and FIGS. 3A-3B (without RP configuration), respectively.

The frequency domain resource configuration may include, for example, the active Bandwidth part (BWP) used for SL transmission and subchannels/Resource block group (RBG) of the BWP. There may be two different types used to indicate the frequency domain subchannels. Type 0 may indicate continuous RBs for the resource allocation, which indicates the starting RB (or RBG) location and number of resource blocks (RBs) or number of RBGs. In some embodiment, the starting RB indicated is the starting virtual RB (VRB), for which the actual physical location of RB, known as physical RB (PRB) is derived from VRB and hopping configuration parameters if frequency hopping is configured. Type 1 may indicate which RBGs or subchannels among all the available RBGs or subchannels are active. The number of RBs in each RBG or frequency subchannel and starting RBs of the first RBG/frequency subchannel may be also configured by RRC or system information. Type 1 can be indicated using a RBG or subchannel bitmap, where each bit of the RBG or frequency subchannel bitmap indicates whether the corresponding RBG or frequency subchannel is used or not. There may be an additional flag to indicate whether the frequency resource indication is using type 0, type 1 or is dynamically switching between type 0 and type 1.

In some embodiments, the frequency domain configuration may first indicate the starting RB of the first frequency sub-channel (RB_{start}), number of RBs per frequency subchannel (N_{RB_in_subchannel}), and the total number of frequency sub-channels (n_{subchannel}) available for the SL transmission. The above parameters can be used to determine the range and partition of frequency subchannels. For example, in a resource grid as shown in in FIG. 1A, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. UE may then determine its frequency allocation corresponds to the RB that starts at RB index RB_{start}+m*N_{RB_in_subchannel} and with n_{subchannel} number of continuous RBs to be use. In the case, a transmission pattern bitmap is determined in time domain and different subchannels may be used in frequency domain for different repetitions of the TB, the frequency domain configuration may further indicates the frequency index for each transmission/repetition of the TB. For example, in case of the example shown in FIG. 1A, F0 to F4 may corresponds index m as 0, 1, 2, 3, respectively, and the frequency domain resource configuration may indicate a frequency channel index sequence corresponding to each transmission of the TB, which is {0, 2}, corresponding to F0 and F2 for first and second transmission of the TB.

The time and frequency domain resource configuration for the SL control channel PSCCH (or SA) may share the same above configuration for SL data channel or have their own separate configuration. In some embodiments, the resource configuration for an SA shares the parameters above with the data channel configuration, but has the following additional configurations, which may include starting symbol and length of a SA in terms of number of symbols, a time gap between SA and the corresponding data transmissions if SA and data transmission are in different slots (see, for example, FIGS. 11A and 11B described below), and the frequency-domain resource configuration of SA. For example, the frequency domain resource configuration of SA may include a starting frequency domain communication resource and a size of a SA in the frequency domain (e.g. in terms of resource blocks, the starting RB and the size of SA in number of RBs). There may be a parameter used to indicate whether the SA and data is in frequency division duplex (FDD) mode or time division duplex (TDD) mode and/or whether the SA and data are in different slots.

In some embodiments, SA and the corresponding SL data transmission may be FDDed as in FIGS. 11A and 11B. The starting RB for the SA may share the starting RB configuration for the SL data, which can be derived for example as RB_{start}+m*N_{RB_in_subchannel}. The number of RBs for SA s_{RB_in_SA} may be UE specifically configured (e.g. in RRC), cell specifically configured (e.g. in system information block) or predefined (e.g. a fixed number 2). The resources for the SL data transmission may need to exclude the resources used for SA transmission. For example, the SL data transmission in the case of FDD may be starting at RB_{start}+m*N_{RB_in_subchannel}+s_{RB_in_SA} instead of RB_{start}+m*N_{RB_in_subchannel}. In some embodiment, when UE listen to transmission from other UEs, UE may assume SA may be potentially transmitted by other UEs in the same frequency location at each frequency sub-channel.

Although some embodiments described herein relate to time-domain and frequency domain resource configuration, in general communication resources could be configured in other domains or with other parameters. The following is a non-limiting list of examples of parameters that may be signaled in resources configured in other communication resource domains.

Code domain
Layer index, Signature index or codebook index indicating which layers/signatures/codebooks to be used for orthogonal or non-orthogonal multiple access Waveform
Discrete Fourier transform spread orthogonal frequency division multiplexing (DFT-S-OFDMA);
Cyclic prefix OFDMA (CP-OFDMA) or whether transformed coding is enabled.

Frequency hopping for PSSCH
Frequency hopping offset (if frequency hopping is enabled). Frequency hopping offset may indicate the number of RBs or RBGs that are hopped from one slot to its adjacent slot and/or from the first half of a slot to the second half of a slot within the available bandwidth in a BWP.

Reference signal (RS)
PSSCH/DMRS mapping type. Type A may indicate the DMRS location is at fixed symbols among the slot. Type B may indicate the DMRS symbol location depends on the starting and ending symbol configuration of the data resource.
DMRS location and symbols. Which may indicate how many DMRS symbols are used and location of DMRS symbols.
DMRS sequence initialization;
Antenna port;
number of layers;

Note that different transmissions of the TB defined in a transmission pattern may share the same parameters configured in domains other than time domain or different transmissions of the TB may use different resources for the other domains as well. In the first scenario, only one set of resources in the respective domains would be configured. In the latter scenario, a corresponding transmission pattern in each respective domain may be configured for each transmission of the TB. For example, to signal a transmission pattern in FIG. 1A to FIG. 1K, the BS may signal to the UE the frequency location of the transmission pattern for each UE at each transmission of a TB. For example, a BS may signal the partition (e.g. available bandwidth and number of RBs for each RBG or frequency subchannels) of the frequency sub-channels (F0-F3)) and index of the frequency sub channels used for each transmission/repetition of the TB (only 2 repetitions in FIG. 1A to FIG. 1K). In some other embodiments, the same set of parameters may be used for all the transmissions of the TB in other domains. For example, the set of frequency domain location configuration parameters may be used to determine all the frequency domain locations of the transmissions of the same TB (with the possible exception of frequency hopping, which could define a frequency location change at different time locations).

Figure 5:
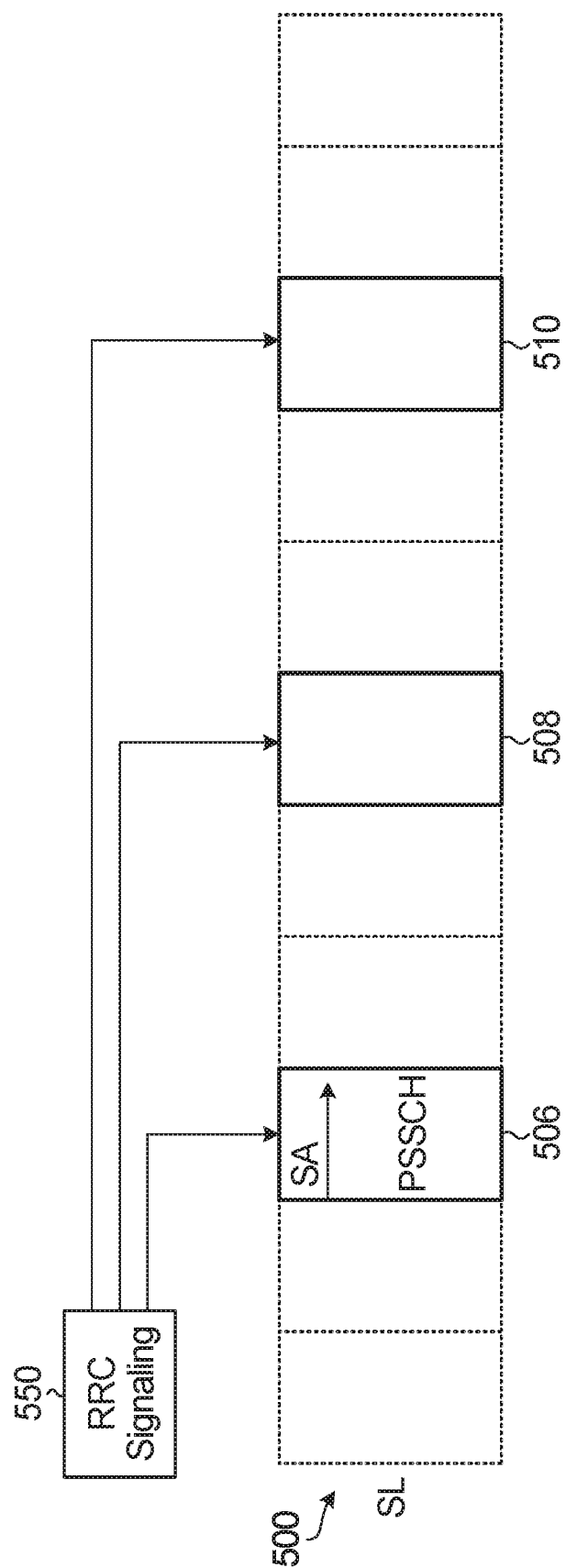
FIG. 5 is a block diagram illustrating an example of an RRC signaled transmission pattern for an SL transmission scheme.

FIG. 5 is a block diagram illustrating an example of an RRC signaled transmission pattern for an SL transmission scheme. FIG. 5 includes an SL channel 500, RRC signaling 502, and communication resources 506, 508, 510.

In FIG. 5, the RRC signaling 502 signals a transmission pattern and/or locations of the communication resources 506, 508, 510. The communication resources 506, 508, 510 may include the resources used for SL control channel (a PSCCH or an SA) and the resources used for SL data transmission (PSSCH).

In embodiments described herein, a BS may broadcast system information to all the UEs in a cell. The system information (e.g. SIB) may optionally contain some parameters of the resource configuration for SL transmission that is common for all the UEs in the cell. A UE may detect the corresponding SIB to obtain the common resource configuration parameters before the initial access process or before SL transmission takes place. Such configuration by broadcast signaling is not shown in the flow diagrams below. In addition, all the configuration described in this disclosure for RRC signaling may be instead or in addition to be configured in a medium access control (MAC) channel element (CE).

Figure 6A:
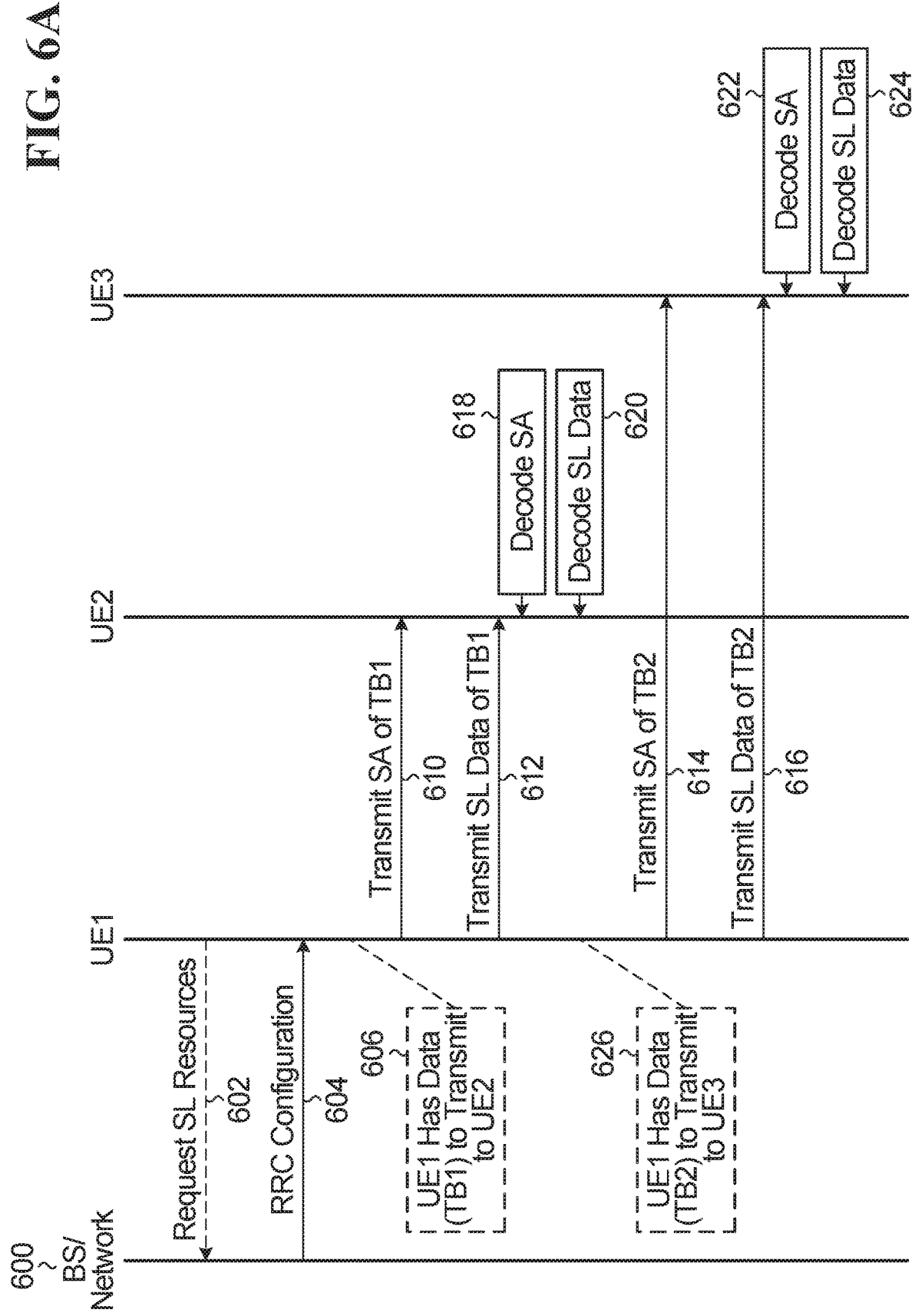
FIG. 6A is a flow diagram illustrating an example of a distributed grant-free transmission mode for SL communications.

FIG. 6A is a flow diagram illustrating an example of a distributed grant-free transmission mode for SL communications. The embodiment shown in FIG. 6A involves RRC signaling, as generally shown in FIG. 5.

FIG. 6A illustrates a BS or network 600, and three UEs (UE1, UE2 and UE3). The BS or network 600 may be any network entity capable of resource configuration for SL communication, such as a transmit and receive point. The BS or network 600 is in communication with UE1, and could also be in communication with UE2 and UE3, UE2 and UE3 could be in range of BS or network 600 or out of range of BS or network 600. UE1, UE2, UE3 in FIG. 6A each represent one or more UEs. Any of the UEs UE1, UE2, UE3 could be a group of UEs. For example, if UE2 represents multiple UEs, then the transmission step in 612 is a multicast transmission with multiple destination UEs instead of a unicast transmission with one destination UE. In addition, UE2 and UE3 could be the same or different UE(s).

FIG. 6A includes several transmissions, including an optional request 602 for SL transmission resource configuration, an RRC configuration 604 of resources used for transmissions, transmission 610 of an SA of TB1, transmission 612 of SL data of TB1, transmission 614 of an SA of TB2, and transmission 616 of SL data of TB2.

The optional transmission at 602 is indicated using a dashed arrow in FIG. 6A. UE1 does not always request SL resources at 602 every time it has data to transmit. There are also various sources of data to be transmitted by UE1, and therefore "data to transmit" blocks 606, 626 are also shown in dashed lines in FIG. 6A. For example, data for transmission could be, but need not always be, received by UE1 from the BS or network 600. Data for transmission could arrive at UE1 or be generated internally by UE1.

FIG. 6A illustrates several operations, including SA decoding operations 618 and 622, as well as SL data decoding operations 620 and 624.

In FIG. 6A, an initial request for SL resources may be transmitted from UE1 to the BS or network 600 using request 602. This request may be for new SL resources, or for an update to previously configured SL resources. The request 602 can be part of the initial access process for UE1.

Transmission 604 from the BS or network 600 to UE1, whether in response to a request at 602 or otherwise, could include any of the examples of resource configuration signaling that have been described herein. The RRC signaling at 604 could include transmission pattern parameters such as a transmission pattern bitmap and offset or starting time location, and optionally periodicity of the transmission pattern. It may also include resource configuration in frequency domain and other domains in some embodiments. The transmission pattern may also define the time location of performing initial transmission and repetitions of a TB. Optionally, a transmission pattern may also be included in the configuration of SL control resources. This control transmission pattern may be the same as or different from the transmission pattern configured for SL data communication resources. After receiving the RRC configuration at 604, UE1 has obtained all the resource configuration information that it needs to start SL transmissions, without receiving a dynamic grant sent in DCI by the BS or network 600 before each SL transmission. In some embodiments, RRC configuration in 628 might not indicate the configuration of SL control resources or the SL control resource might not be implicit. SL control resources may also be derived from SL data resources. For example, if the SA resource is FDDed with the SL data resource as in FIG. 11A and FIG. 11B and the number of RBs for the SA resource is predefined, then the SA resource may be derived from the configuration of the SL data transmission resources.

As an example of RRC configuration signaling in 604, if a UE is to be configured with a transmission pattern shown in FIG. 1B for UE2. The RRC configuration may include the time domain transmission pattern bit map {1 0 1 0 0}, optionally the length of the transmission pattern, which is 5 slots, the repetition number K, which is 2, a RV sequence associate with repetitions of the TB, which is {0 3 0 3} or {0 3} indicating the first transmission use RV0 and second transmission use RV3, a starting time location of the transmission pattern or initial transmission, which is the starting time location of T0, a periodicity of the transmission pattern. The RRC configuration may further include the starting RB of the first frequency subchannel, which is the starting RB of F0, the number of frequency subchannels, which is 4, the number of RBs for each frequency subchannel, which is the frequency size or number of RBs in F0, F1, F2 or F3. The above parameters for defining the range and partition of frequency subchannels may be instead configured in broadcasting signaling (e.g. in SIB). The RRC signaling then may further indicate frequency index of each transmission, which is {1, 3}, indicating F1 and F3 frequency subchannels used for first and second transmission of the TB.

In transmission 610 from UE1 to UE2, after UE1 has data (TB1) to transmit to UE2 at 606, an SA of a TB1 is transmitted using the RRC configured SL control resources. The SA indicates the resources and parameters used for data transmission. If a transmission pattern is configured for the SL control resources, then the SA of TB1 is transmitted at 610 according to this transmission pattern. UE1 should indicate the transmission parameters and resources used for data transmission in step 612 in the SA at 610, for which the transmission parameters and resources used for SL data transmission in step 612 should be chosen according to the data communication resources configured in RRC configuration in 604. The SA of TB1 may indicate the transmission pattern for UE1, which is determined according to the transmission pattern in the configuration of SL data communication resources for UE1. The SA of TB1 may include other parameters for the SL transmission in step 612, which may also be derived from the configuration of SL data communication resources for UE1. For example, a time of the initial transmission and the next retransmission in a repetition pattern for SL data transmissions of TB1 could be specified, and then the SL transmissions are performed using the transmission pattern for UE1 defined by the RRC configured SL data communication resources. In another example, the SA may include a time gap between the time location of the SA transmission and the time location of the corresponding transmission of the TB or the initial transmission of the TB, or the start of the transmission pattern. If the SA is associated with one transmission of the TB, the SA may also indicate which transmission of the TB it is associated with, and the RV associated with that transmission. Examples of transmissions according to transmission patterns are described above with reference to FIGS. 1A to 4. The SA may also include the transmitting UE ID and destination UE ID.

At 618, the SA of TB1 is decoded by UE2, so that UE2 can determine where to find the information with regards to the resources and parameters used for the data transmission at 612, and the SL data of TB1 is then decoded at 620 based on the decoded SA.

FIG. 6 also represents at 626 that UE1 has data (TB2) to send to UE3. The transmission 614 from UE1 to UE3, which could be performed before SA and/or data decoding at 618, 620 is complete, illustrates transmission of an SA associated with TB2, performed using the RRC configured SL control resources after UE1 has data to transmit to UE3. This is similar to transmission 610 to UE2. Here TB2 may differ from TB1, and is transmitted in a different period of the transmission pattern that is defined for UE1 by the RRC configured SL data communication resources.

In transmission 616 from UE1 to UE3, an SL data transmission of TB2 is performed using the transmission pattern for UE1 defined by the RRC configured SL data communication resources. This is similar to transmission 612 to UE2. At 622, the SA of TB2 is decoded by UE3, and the SL data of TB2 is decoded at 624 based on the decoded SA.

The data shown at 606 and/or 626 could have been received from the BS or network 600 or another source, or generated by UE1. In the case that data is received by UE1 and intended for UE2 or UE3, transmissions 612, 616 may be a retransmission of that data. As noted above, data for transmission might not necessarily be received by UE1 from another component. The BS or network 600 is only one example source of data that may be transmitted between UEs over a sidelink. Regardless of the data source, SA and SL data transmissions as shown in FIG. 6A are performed when UE1 determines that it has data to send to UE2 and/or UE3.

Figure 6B:
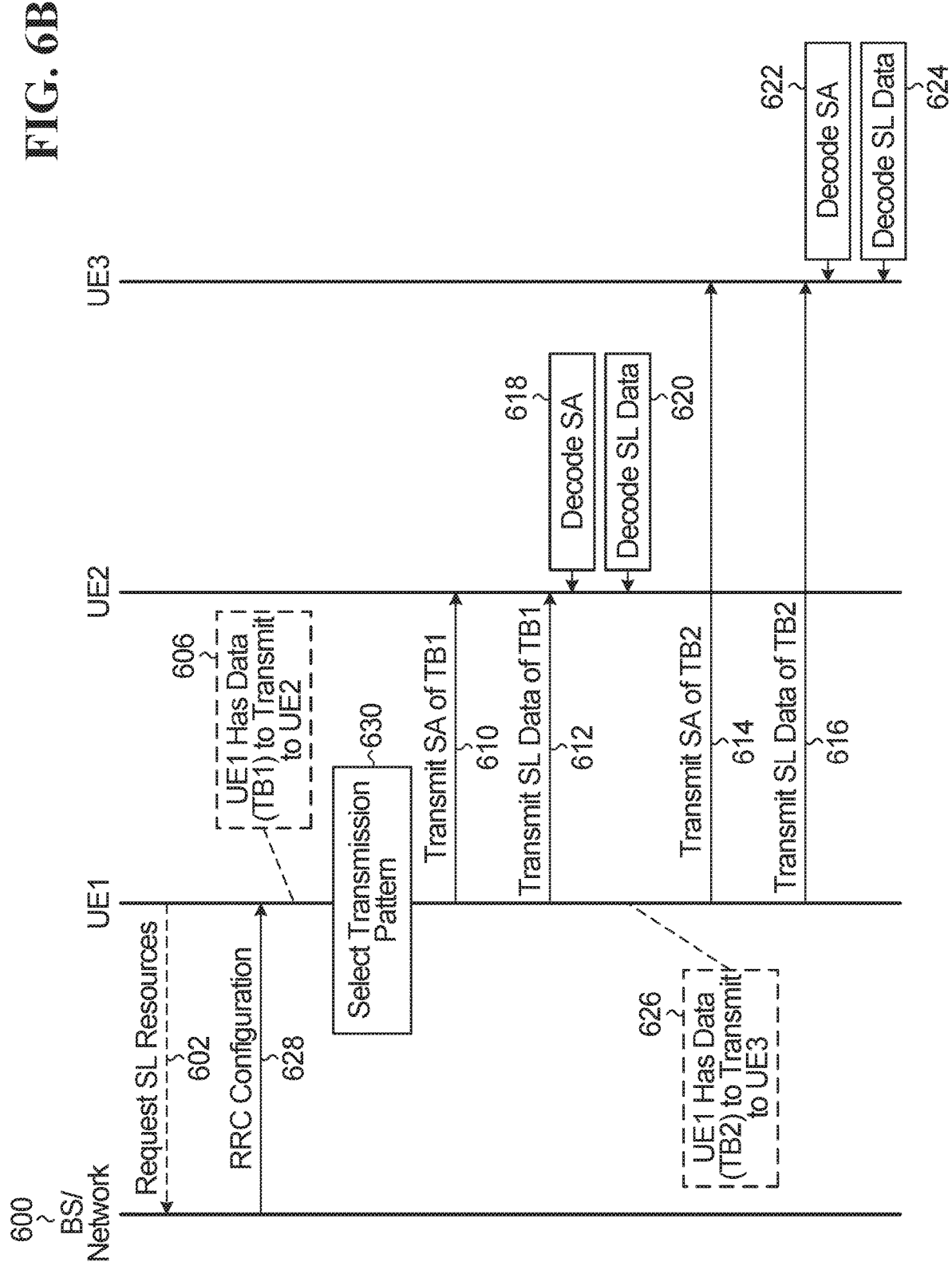
FIG. 6B is another signal flow diagram illustrating an example of a distributed grant-free transmission mode for SL communications

FIG. 6B is another signal flow diagram illustrating an example of a distributed grant-free transmission mode for SL communications, in an example system with a BS or network 600 and UE1 to UE3. In FIG. 6B, at 630 UE1 selects a transmission pattern from a transmission pattern pool. Transmissions 602, 610, 612, 614, 616 correspond to similarly labeled transmissions in FIG. 6A. Similarly, decoding operations 618, 620, 622 and 624 correspond to similarly labeled decoding operations in FIG. 6A. FIG. 6B also includes RRC configuration transmission 628.

In transmission 628 from the BS or network 600 to UE1, RRC signaling configures SL data communication resources and SL control resources. A transmission pattern pool is included in the configuration of SL data communication resources in this example. This is different from transmission 604 of FIG. 6A, where a transmission pattern is optionally included in the configuration of SL data communication resources. In RRC configuration 628, UE1 may also be optionally configured with a starting time location and optionally a periodicity for the transmission patterns for the transmission pattern pool. As also described herein, an example of configuration of a transmission pattern pool in the time domain can include an indication of repetition number and length of the transmission patterns in the transmission pattern pool. The transmission pattern pool may also include information indicating the range and partition of frequency domain subchannels. Optionally, a transmission pattern pool may also be included in the configuration of SL control resources. In some embodiments, SL control resources may also be derived from SL data resources. This transmission pattern pool may be the same as or different from the transmission pattern configured for SL data communication resources. In some other embodiments, transmission pattern pool may be indicated in broadcast signaling (e.g. in system information block (SIB)).

As an example of RRC configuration signaling for transmission pool in 604, consider a UE that is to be configured with a transmission pattern pool shown in FIG. 1K. The RRC configuration may include optionally the length of the transmission pattern, which is 5 slots, a repetition number K, which is 2, an RV sequence associate with repetitions of the TB, which is {0 3 0 3} or {0 3} indicating the first transmission use RV0 and second transmission use RV3, a starting time location of the transmission pattern or initial transmission, which is the starting time location of T0, and a periodicity of the transmission pattern. The RRC configuration may further include the starting RB of the first frequency subchannel, which is the starting RB of F0, the number of frequency subchannels, which is 4, and the number of RBs for each frequency subchannel, which is the frequency size or number of RBs in F0, F1, F2 or F3. In one embodiment, any time domain transmission pattern with 2 transmissions at two different slots within the 5 slots of T0 to T4 in combination with any frequency subchannel among F0, F1, F2 and F3 for each transmission can be a valid transmission pattern to be selected among the transmission pattern pool. In another embodiment, only the transmission pattern corresponding to the resources mapped to UE1 to UE10 as in FIG. 1K are consider a valid transmission pattern to be selected among the transmission pattern pool.

At 630, UE1 selects a transmission pattern for SL data transmission from the transmission pattern pool included in transmission 628. The transmission pattern may be selected autonomously by UE1. In some embodiments, the selection of the transmission pattern among the transmission pattern pool may not be completely random. The selection in 630 may be further based on one or more of the combination of the following factors: 1) location, velocity, and direction of the transmitter, distance between vehicles, 2) avoiding occupied resources and avoiding resource collision by selection of a transmission pattern and/or resources by reading other UE's SA resources (to avoid using similar resources) and sensing energy level of transmission that happened earlier, 3) based on measurement results such as measurement of reference signal received power (RSRP) of PSSCH, measurement of channel busy ratio (CBR) (such that it does not over a certain limit), etc. Alternatively, UE1 may select the transmission pattern according to a UE index previously assigned to the UE. The transmission pattern selected by UE1 is used in transmissions 612, 616. In some embodiments, UE1 could select a transmission pattern for SL SA transmissions 610, 614. This selection may be made from the same transmission pattern pool used for SL data transmissions, or a different transmission pattern pool. The transmission pattern selected for SL control could be the same as or different from the transmission pattern that is selected for SL data transmissions.

Figure 7:
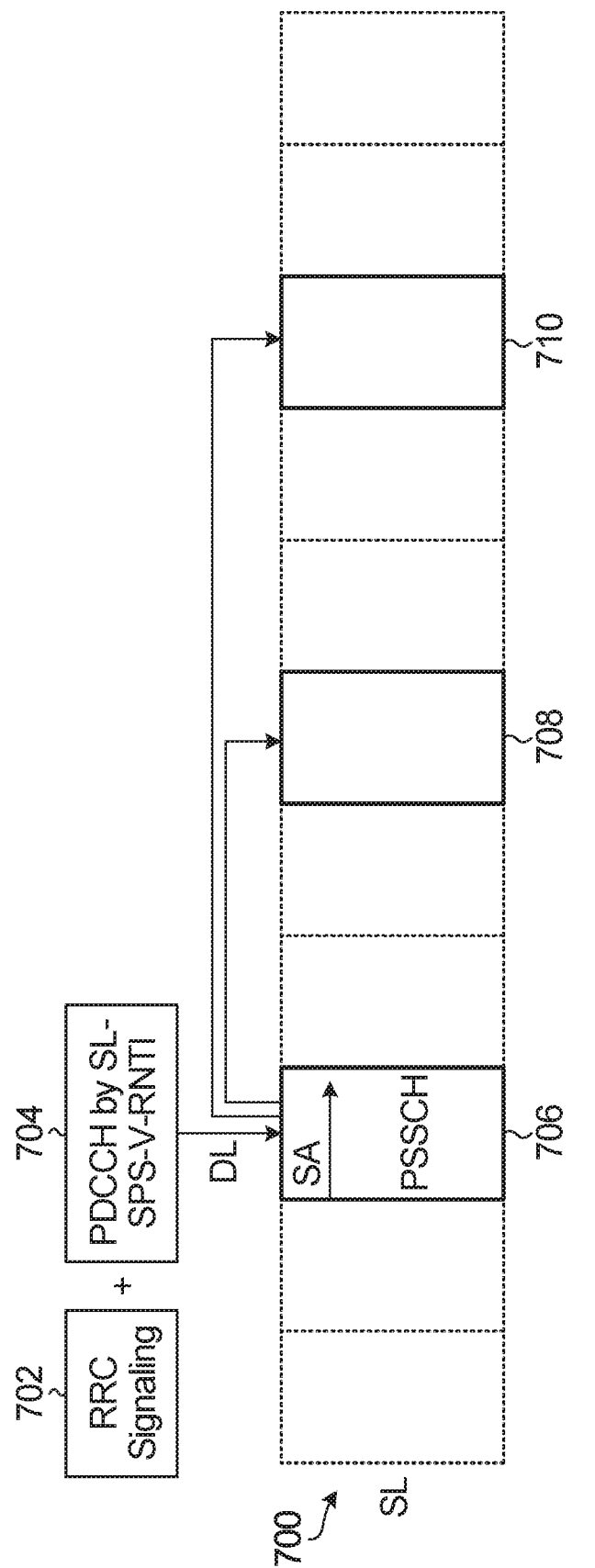
FIG. 7 is a block diagram illustrating an example of a semi-persistent scheduling (SPS) signaled transmission pattern for an SL transmission scheme.

FIG. 7 is a block diagram illustrating an example of an semi-persistent scheduling (SPS) signaled transmission pattern for an SL transmission scheme. FIG. 7 includes an SL channel 700, RRC signaling 702, physical downlink control channel (PDCCH) by an SL UE ID, e.g. SL semi-persistent (SPS) vehicle radio network temporary identifier (V-RNTI) (i.e., a DCI sent with CRC scrambled by SPS-V-RNTI) 704, and communication resources 706, 708, 710, which include resources for SA and PSSCH. In FIG. 7, SA and PSSCH are multiplexed (frequency division multiplexed for example) at the same time unit, but they can be located in different time units.

In FIG. 7, the communication resources 706, 708, 710 belonging to the SL channel 700 are signaled by RRC signaling 702 and PDCCH by SL-SPS-V-RNTI 704 through the DL. DCI signaling can be sent to the UE by a BS on PDCCH, with its CRC scrambled by SL-SPS-V-RNTI as shown at 704. In general, the RRC signaling indicates periodicity between adjacent time resources or transmission patterns and the DCI signaling indicates the transmission pattern and/or communication resources for one transmission or multiple transmissions of a TB. The communication resources 706, 708, 710 may be used for an SA (or a PSCCH) and a physical SL shared channel (PSSCH).

Figure 8:
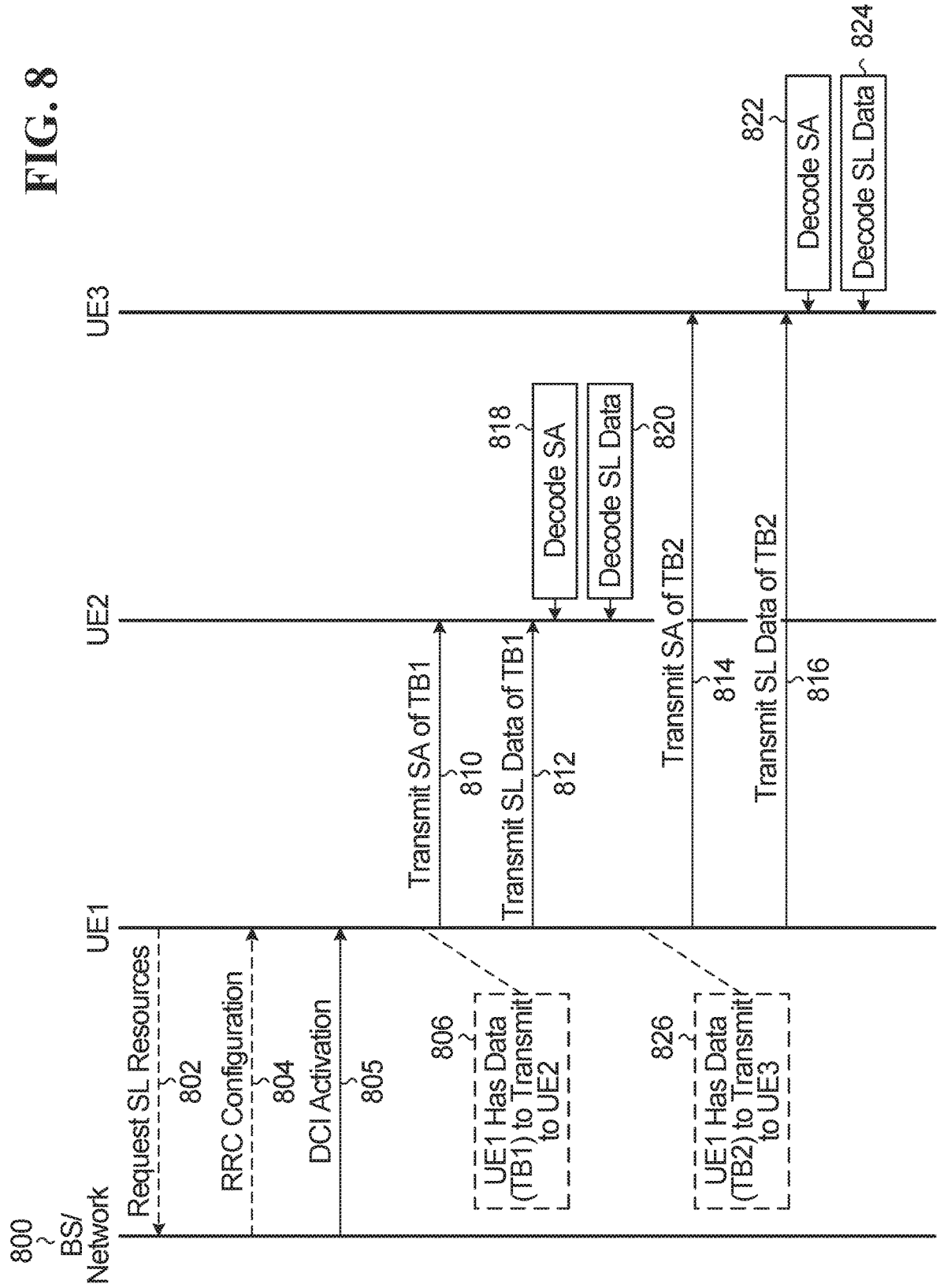
FIG. 8 is a signal flow diagram illustrating an example of SL transmission mode using SPS.

FIG. 8 is a signal flow diagram illustrating an example of SL transmission mode using SPS. FIG. 8, like FIG. 7, involves SPS and DCI signaling. In FIG. 8, scheduling of the transmission pattern for UE1 is semi-persistent. FIG. 8 includes BS or network 800 and UE1 to UE3. Transmissions 802, 810, 812, 814 and 816 correspond to similar transmissions 602, 610, 612, 614 and 616, respectively, in FIG. 6A. Similarly, decoding operations 818, 820, 822, 824 correspond to similar decoding operations 618, 620, 622, 624, respectively, in FIG. 6A. Operations 806 and 826 are similar to operations 606 and 626, respectively, in FIG. 6A. FIG. 8 also illustrates optional RRC configuration transmission 804, DCI activation transmission 805.

In optional transmission 804 from the BS or network 800 to UE1, RRC signaling may optionally configure an RP for SL communication. The RRC signaling may also configure part of the resources used for the transmission patterns, e.g., a periodicity of transmission patterns.

In transmission 805 from the BS or network 800 to UE1, DCI signaling activates a transmission pattern in UE1. This activation could indicate a transmission pattern for UE1. The location of DCI may determine the starting time location of the transmission pattern. The activation DCI may also include transmission parameters and resources used for the transmission of SL data and control in 812 and 810. The transmission pattern may be also defined without RP or in the RP defined through RRC signaling. After the DCI activation, the transmission pattern is assumed to repeat itself periodically with periodicity between two adjacent transmission patterns configured in RRC signaling in 804. In this respect, FIG. 8 may be considered to be a form of SL SPS. After determining the transmission pattern and peri-odicity, UE1 transmits using transmissions 810, 812, 814, 816 in the same manner as described above in reference to FIG. 6A.

Figure 9:
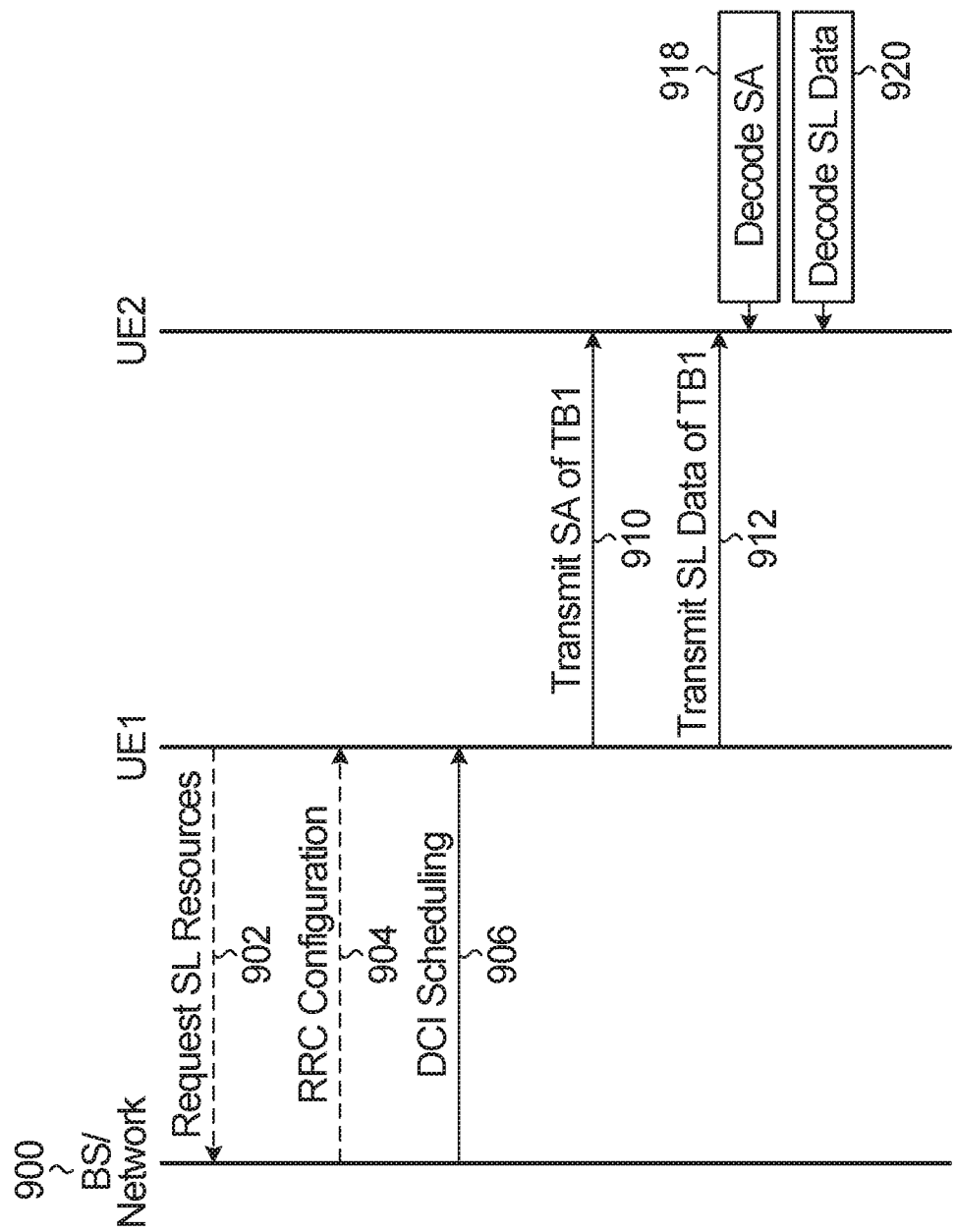
FIG. 9 is signal flow diagram illustrating an example of an SL scheduled transmission scheme.

Other embodiments could also involve DCI. FIG. 9 is signal flow diagram illustrating an example of an SL scheduled transmission scheme. In FIG. 9, scheduling of the transmission pattern for UE1 is dynamic. FIG. 9 includes BS or network 900, UE1 and UE2. Transmissions 902, 910 and 912 correspond to similar transmissions 602, 610 and 612, respectively, in FIG. 6A. Similarly, decoding operations 918, 920 correspond to similar decoding operations 618 and 620, respectively, in FIG. 6A. FIG. 9 also includes optional RRC configuration transmission 904, which corresponds to a similar transmission described above with reference to FIG. 8. Transmission 904 may optionally include resource configuration of an RP. Transmission 904 may or may not include a periodicity as illustrated in FIG. 8. Additionally, transmission 906 for DCI scheduling is illustrated.

In transmission 906 from the BS or network 900 to UE1, the DCI schedules a dynamic SL transmission pattern for UE1. In the case that RRC configuration has configured an RP for SL communication using transmission 904, the DCI determines a transmission pattern for UE1 from that RP. Alternatively, the DCI includes a transmission pattern without an RP being configured. A repetition pattern or other transmission pattern could be assigned to UE1 for each TB used in transmissions 910 and 912. In this sense, the scheduling is dynamic. The starting location of the transmission pattern may be determined by the time the DCI is received in 906.

Figure 10:
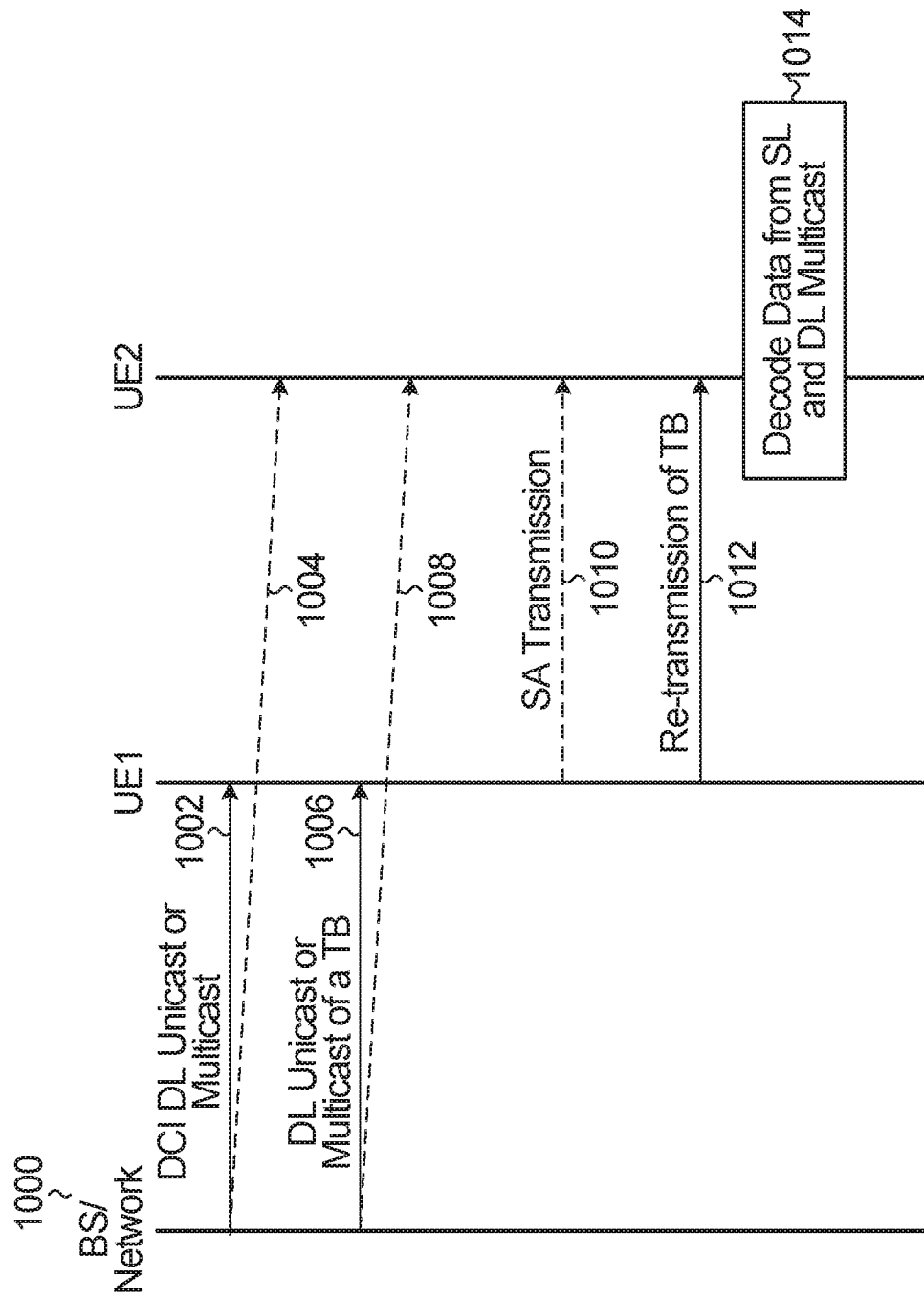
FIG. 10 is a signal flow diagram illustrating an example of a UE cooperation using SL transmission.

FIG. 10 is a signal flow diagram illustrating an example of a UE cooperation using SL transmission. In FIG. 10, BS or network 1000 and UE1, UE2 are illustrated. FIG. 10 includes several transmissions, including DCI signaling 1002/1004 that is used to schedule the DL unicast or multicast data transmission 1006/1008, optional SA transmission 1010, and retransmission of the TB from 1006, at 1012. FIG. 5F also includes decoding at 1014.

In transmission 1002/1004 a DCI used for scheduling DL unicast or multicast transmission is transmitted from the BS or network 1000 to UE1 and UE2. The DCI used for DL unicast or multicast transmission may further include information for SL retransmission resources for UE cooperation. As an example, the DCI in 1002 may include a starting location (e.g. a starting slot) of a transmission pattern. The DCI could be a group common (GC)-PDCCH.

In transmission 1006/1008 a TB is transmitted from the BS or network 1000 to UE1 and UE2 in multicast transmission, or just UE1 in the case of unicast transmission.

In optional transmission 1010, an SA is transmitted from UE1 to UE2. In some embodiments, it might not be necessary to transmit an SA from UE1 to UE2 and the transmission at 1010 might not be performed.

In transmission 1012, the TB from 1006 is retransmitted from UE1 to UE2. The retransmission in the SL at 1012 may use SL transmission resources configured by UE specific RRC signaling beforehand, or configured by the DCI signaling in 1002 or a combination of RRC signaling and the DCI signaling sent in 1002. For example, UE may use the resources configured in RRC, which may include a transmission pattern, a starting location (offset) and a periodicity of the transmission pattern. Alternatively, UE may use the transmission pattern configured by the RRC and use the starting location configured in the DCI signaling in 1002 as shown in FIG. 10. In other embodiments, the transmission pattern may also be indicated in the DCI. At 1014, the data is decoded from the SL transmission 1010 and the DL unicast or multicast 1008.

The retransmission in FIG. 10 is an example of UE cooperation, as UE2 might not have been able to properly decode transmission 1008, for example, if UE2 is out of range of the BS or network 1000. However, UE2 could be able to decode the retransmission from UE1 on the SL. Alternatively, UE2 may decode the retransmission 1012 from UE1 and combine the retransmission with the original transmission received from DL transmission 1008. In this sense, UE1 may be considered a CUE, and UE2 may be considered a TUE.

Several embodiments disclosed herein may involve control signaling between UEs. FIGS. 6A, 6B, and 8, for example, illustrate SA transmissions. Different SA configurations are possible.

FIG. 11A is a plot illustrating an example of a configuration of an SA. FIG. 11A illustrates time slots 1100-1106 on a time-frequency resource grid. During four of those time slots 1101, 1103, 1105 and 1106, an SA transmission and an SL data transmission are performed. These transmissions may be performed, for example, in accordance with a transmission pattern.

In FIG. 11A, an SA is associated with each of the four SL transmissions in the time slots 1101, 1103, 1105 and 1106, which correspond to a transmission pattern {0101011} that is used as an example above. Each SA may indicate the transmission pattern and resources used for each SL data transmission of time slots 1101, 1103, 1105 and 1106 (may include both time domain and frequency domain configuration described earlier). An SA may also include the number of transmissions, and the RV sequence associated with the transmissions. Each SA may also indicate the starting location of the transmission pattern or the time location of the transmission associated with this SA (the indication can be actual time location or relative time location to the SA). In the case of an SA and its associated SL transmission being frequency division duplexed (FDDed) as in FIG. 11A or otherwise combined in the same time unit, the time location of the associated SL transmission may be derived from the time location of the SA. Additionally, the SAs may indicate other information associated with the transmissions of SL data such as the RV for each SL transmission and/or the RV for its associated transmission. An SA may also indicate which transmission of the TB and/or RV for this transmission. For example, the SA in slot 1101 may indicate that this is the first transmission of the TB and it may also indicate the RV that is associated with this TB. Alternatively, each SA may only include the transmission pattern and resources used for the SL transmission for the associated transmission. For example, the SA transmission associated with time slot 1101 may only include the parameters used for the SL data transmission in that particular time slot 1101.

FIG. 11B is another plot illustrating an example of a configuration of an SA. FIG. 11B illustrates the same time slots as FIG. 11A. However, an SA transmission is performed only in time slot 1101, and is associated with all transmissions in the transmission pattern. Therefore, the SA transmitted during time slot 1101 in FIG. 11B includes the transmission pattern and resources used for each SL data transmission in time slots 1101, 1103, 1105 and 1106 (may include both time domain and frequency domain configuration described earlier). An SA may also include the number of transmissions for the TB, and the RV sequence associated with the transmissions. The SA may also indicate the starting time location of the transmission pattern or the starting time location of the initial transmission of the TB. In some embodiments, an SA may use its own time location as reference and only include a time gap between the SA and the corresponding data transmission (initial transmission of a TB, the starting location of the transmission pattern or the data transmission associated with the SA) instead. In the case of SA and its associated SL transmission being FDDed as in FIG. 11A or otherwise combined in the same time unit, the time location of the associated SL transmissions may be derived from the time location of the SA.

In FIGS. 11A and 11B, the SA and SL data transmissions are separated using frequency division duplex (FDD). In such a scenario, the time locations of an SA may not need to be explicitly configured by the BS in the example SL transmission modes described herein, as the time location of an SA can be derived from the time location of its associated SL data transmission/transmissions. However, in general, the SA and SL data transmissions may be separated using other configurations, such time division duplex (TDD). In the case of TDD, an SA may include a time gap between the time location of the SA and the time location of its associated SL data transmission (in a configuration of FIG. 11A) or the SA may include a time gap between the time location of SA and the time location of the initial SL data transmission or the transmission pattern of its associated data transmissions of the TB (in a configuration of FIG. 11B). Similarly, in the case of TDD, when configuring the SA resource, the BS may indicate a similar time gap between SA and its associated data transmission such that a UE can derive the time resource used for SA given the time resource configured for the data transmission.

For the SA in the configurations of FIGS. 11A and 11B or an SA in general, the SA may indicate the time and frequency resources used for each SL transmission of the TB.

An SA may indicate the actual frequency location of each transmission. In one embodiment, SA may indicate the starting VRB or PRB and the size of frequency resources. Each transmission of the TB may share the same frequency resource parameters. In the case of configuration based on VRB, the actual PRB may be derived based on frequency hopping configuration for each transmission. In another embodiment, an SA may indicate an index sequence of frequency subchannels used for each transmission, similar to the RRC configuration of frequency domain resources. An SA may further indicate the range and partition of the frequency subchannels similar to the RRC configuration of frequency domain resources, which may include the starting RB of the first frequency subchannel, the number of frequency subchannels, the number of RBs for each frequency subchannel. Alternatively, the range and partition of the frequency subchannels may be configured in system information and common for all UEs. Alternatively, the range and partition of the frequency subchannels may be configured in RRC signaling for the receiving UE, where the same frequency subchannel partition can be applicable to the transmitting UE. Similarly, an SA may indicate the time location of each transmission by sending the time domain transmission pattern bitmap. Alternatively or additionally, an SA may send the time location of an initial transmission and/or a time gap between initial transmission and a repetition of the TB. The time location can be the actual time location or the time location relative to the time location of SA transmission.

Distributed grant-free SL communication as described herein could be applied to group based configurations. Groups may include one or more CUEs and one or more TUEs. The process of group based configuration may be performed as described below.

Before SL transmission, a discovery phase may be used to form the cooperation group. In a discovery phase, all potential CUEs and TUEs in a group may be signaled a group ID, for example, a group RNTI.

In a broadcast/multicast phase, a BS may schedule a DL multicast using a group common (GC)-PDCCH (i.e. a GC-DCI) with cyclic redundancy check (CRC) scrambled by the group RNTI. The GC-PDCCH may also indicate the starting time unit (e.g. slot) for a cooperation phase. Alternatively, if the transmission is to start from a leader UE (LUE), then the LUE may send a scheduling assignment (SA) along with an SL data transmission in the SL unicast or multicast phase. The SA may indicate the starting time unit (e.g. slot) for a cooperation phase.

In a cooperation phase, the CUEs retransmit the data that is received in the DL/SL broadcast/multicast and send to the TUE. The CUEs use the starting time location (e.g. a starting slot) of the initial transmission or the transmission pattern, a transmission pattern and other resource configuration parameters associated with the UE for the SL transmission in the cooperation phase. The UE specific transmission pattern and other resource configuration parameters may be configured in RRC signaling as described in this disclosure or associated with a UE index among the group as described in the next paragraph. Alternatively and/or additionally, the SL transmission resource for SL data transmission in the cooperation phase may also be configured or partially configured by the DCI sent by the BS or SA sent by the LUE in the multicast/broadcast phase. For example, a CUE can use the starting time location indicated in the multicast/broadcast phase along with its transmission pattern configured by RRC to determine its transmission resources for the cooperation phase. The CUE may also send an SA along with the data transmission to indicate the transmission resource for the transmission in the cooperation phase. The SA can be associated with or contain the information of the group RNTI.

Alternatively, the UE may be provided with a UE index among the group, which is associated with communication resources (for example, time domain transmission pattern, RV sequence, frequency-domain resources, DMRS resources). The UE index may be configured by RRC signaling along with the group-RNTI. The UE index may be assigned in the discovery phase of forming the UE cooperation group. A UE may be configured with a transmission pattern pool. The transmission pattern pool may be configured or predefined to be common for all the UEs in the same cooperation group. Alternatively, the transmission pattern pool can be UE specifically configured. The transmission pattern pool may be configured beforehand for the group, e.g. in the discovery phase. Alternatively, the transmission pattern pool may be indicated during the broadcast/multicast phase in the DCI or SL control channel. For example, a BS or network could indicate a repetition number and length of transmission pattern in the GC-PDCCH used in the broadcast phase, which defines the transmission pattern pool as described earlier in this disclosure. The transmission pattern can also be predefined without signaling. During the cooperation phase, the UE maps the UE index to a transmission pattern pool to determine its transmission pattern.

FIGS. 1K and 2 provide examples of a transmission pattern pool, as well as mapping of UE indices to transmission patterns within the transmission pattern pool.

In some embodiments, in the cooperation phase, every CUE may be forwarding the same packets to all other UEs. If different UEs are sending the same packets over the same frequency-domain resources, a receiving UE can combine the different signals to decode the packets together. The UEs may also use the whole bandwidth for joint transmission using the same RV (e.g. as shown in FIG. 2, where each vertical partition is assumed to occupy the whole bandwidth while only the time domain pattern is shown in FIG. 2) or orthogonal resources for different RVs.

Figure 12:
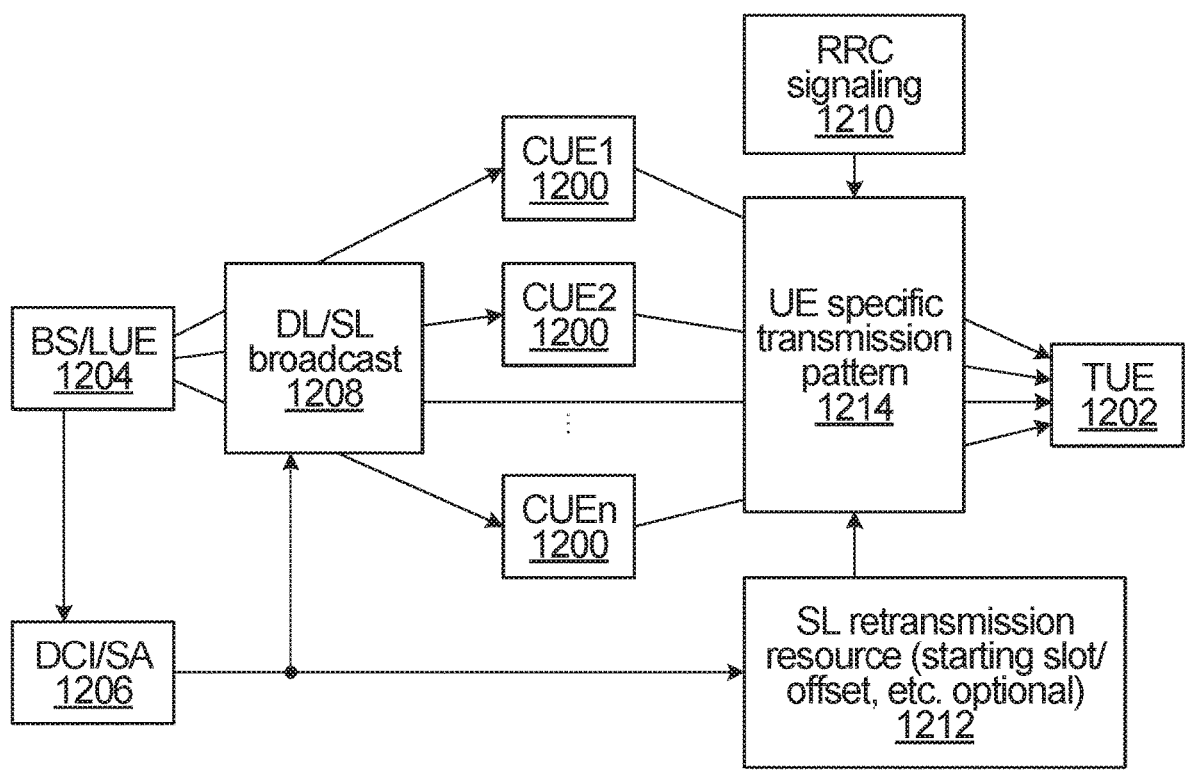
FIG. 12 is a block diagram illustrating an example of a group based configuration for distributed grant-free SL transmission in a network.

FIG. 12 is a block diagram illustrating an example of a group based configuration for distributed grant-free SL transmission in a network. FIG. 12 includes multiple CUEs 1200, identified as CUE1 to CUEn, and one TUE 1202. FIG. 12 also includes a BS or leader UE (LUE) 1204. In the case that the transmission starts with the BS 1204, a DCI 1206 and a DL broadcast 1208 are transmitted. In the case that the transmission starts with the LUE 1204, an SA 1206 and an SL broadcast 1208 are transmitted. FIG. 12 further illustrates RRC signaling 1210, a SL retransmission resource 1212, and a UE specific transmission pattern 1214.

If the transmission starts at a BS at 1204, then the BS sends the DCI 1206, which is used for scheduling a DL broadcast transmitted from the BS 1204 to CUEs 1200. The BS then transmits a DL broadcast 1208 of a data block to CUEs 1200.

Alternatively, if the transmission starts at an LUE at 1204, the LUE sends an SA 1206, which is used for scheduling a SL broadcast transmitted from the LUE 1204 to CUEs 1200. The LUE then transmits a SL broadcast 1208 of a data block.

The RRC signaling 1210 configures the UE specific transmission pattern 1214 to each of the CUEs 1200. The CUE may optionally indicate its transmission pattern in the cooperation phase to the TUE in an SA transmission.

As described in FIG. 12, the DCI 1206 may indicate SL retransmission resources for UE cooperation. As an example, the DCI in 1206 may include a starting location (e.g. a starting slot) of the transmission pattern 1214.

After receiving the UE specific transmission pattern 1214, and possibly the SL retransmission resource 1212, the CUEs may optionally inform the TUE of the transmission pattern 1214 using an SA. The CUEs 1200 may then retransmit the received data block from the DL/SL broadcast 1208 to the TUEs 1202 using the communication resource slots included in the transmission pattern and possibly the SL retransmission resource 1212. For example, the CUE may use the starting time location or starting slot indicated in the DCI/SA in 1206 together with the transmission pattern configured in RRC signaling to determine the resources used to retransmit the data block received from the BS/LUE in the DL/SL multicast. Alternatively, the CUE may use the transmission pattern and starting time slot that are configured in RRC signaling for the SL retransmission of the data block.

In other embodiments, RRC (UE specific or cell specific) or SIB signaling configures or predefines a transmission pattern pool, and a UE randomly selects a transmission pattern from within the transmission pattern pool. A common transmission pattern pool can be defined for RRC_idle and RRC_inactive UEs.

In some embodiments, the RRC or SIB signaling configures the length of the transmission pattern and the repetition number (K) of the pattern. The UE randomly selects one of the transmission patterns among all the possible patterns of the transmission pattern pool.

For some configurations, the UE could randomly select a frequency subchannel among all predefined frequency subchannels. UE could further randomly select a signature, codebook or layer among all codebooks for NOMA transmission.

For some other configurations, the UE could randomly select a transmission pattern among a transmission pattern pool which includes a combination of resources in different dimensions. As described above, a combination of two or more of time-domain, frequency-domain, DMRS, layer and other resources could be configured together using a single UE index.

In the case of group based configuration, if there is a mapping between the UE index and a combination of communication resources as described above, UE may be able to randomly select a UE index which maps to one of the communication resource combinations.

Various features of distributed GF SL communications are described above. Method embodiments will now be described in more detail.

Figure 13:
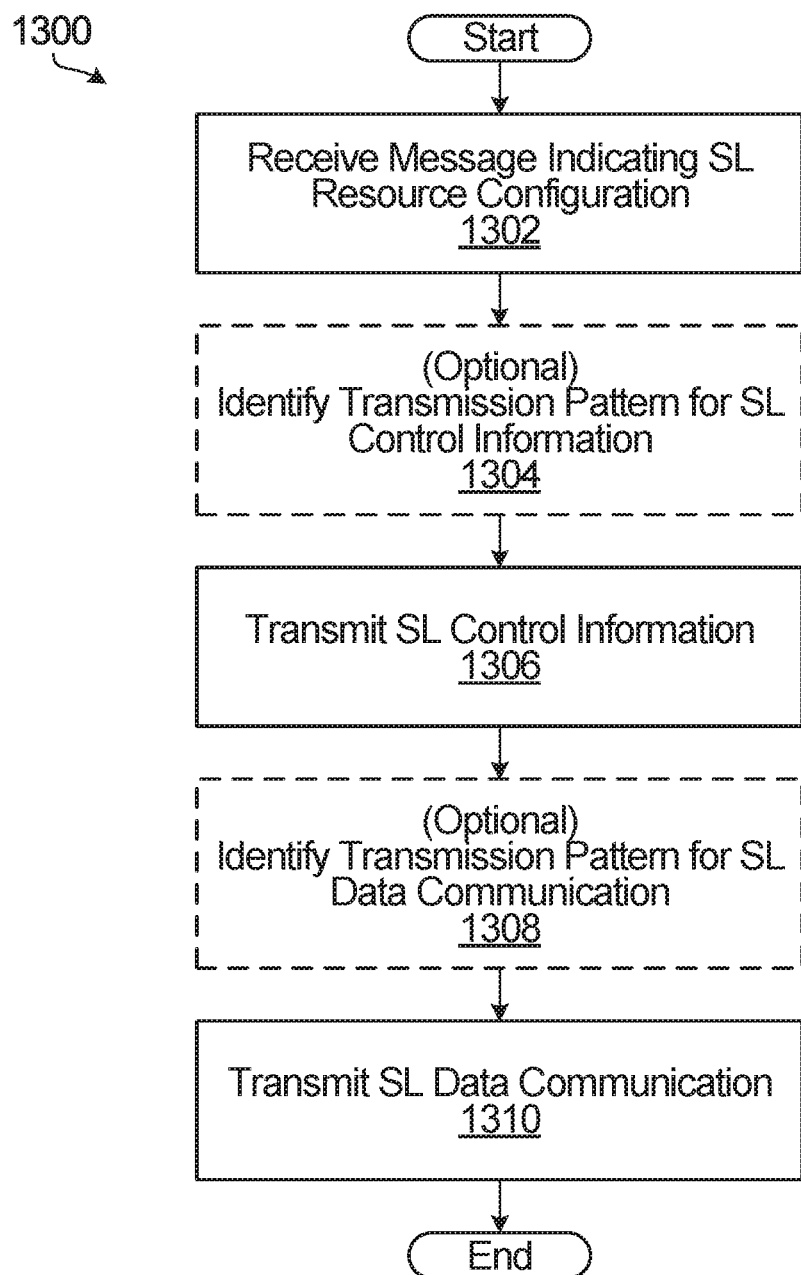
FIG. 13 is a flow diagram illustrating an example of a method for sidelink communications.

FIG. 13 is a flow diagram illustrating an example of a method 1300 for sidelink communications. The example method 1300 is illustrative of a method performed by a user equipment (UE), and involves receiving at 1302, by the UE, a message indicating a sidelink (SL) communication resource configuration. The configuration indicated in the message is to be used by the UE for SL control information and SL data communications between the UE and another UE. The SL data communications could be between the UE and multiple other UEs.

In some embodiments, the configuration includes one or more transmission patterns. For example, the SL communication resource configuration could define a transmission pattern pool that includes multiple transmission patterns. The transmission patterns could define how communication resources are to be used for SL control, SL data transmissions, or both.

The SL communication resource configuration could define a transmission pattern for transmitting SL control information. Optionally, a method could include identifying, at 1304, a transmission pattern for SL control information from a transmission pattern pool. This could involve the UE selecting the transmission pattern from the pool. The transmission pattern and/or pool for transmitting the SL control information could be the same as or different from a transmission pattern and/or pool for transmitting the SL data communication.

The example method 1300 also involves transmitting at 1306, by the UE, SL control information according to the SL communication resource configuration. This SL control information could be transmitted to one UE or to multiple UEs. The SL control information may indicate the repetition pattern defined by the SL communication resource configuration. The transmitting at 1306 could also be performed in accordance with a transmission pattern for the SL control information, if configured. In some embodiments, transmitting the SL control information includes transmitting, by the UE, a scheduling assignment (SA) to another UE using a communication resource defined in the SL communication resource configuration, and the SA indicates communication resources used for transmitting the SL data communication. In further embodiments, the transmitting at 1306 also includes transmitting one instance of the SL control information for both the initial transmission of the data block and the repetition of the data block. For example, as illustrated in FIG. 11B, a single SA could be transmitted for the initial transmission of the data block and the repetition of the data block. The transmitting at 1306 could also include transmitting a separate instance of the SL control information for each of the initial transmission of the data block and the repetition of the data block. This is illustrated in FIG. 11A, for example.

As noted above, in some embodiments the SL communication resource configuration includes a transmission pattern that defines a pattern for transmitting the SL data communication. The transmission pattern could define an initial transmission of a data block and a repetition of the data block. The transmission pattern could further define time resources used for the initial transmission of the data block and the repetition of the data block. The SL communication resource configuration could further include a starting time of the transmission pattern, and the transmission pattern further defines a time gap from the initial transmission of the data block to the repetition of the data block.

The communication resource configuration could include a transmission pattern pool that includes multiple transmission patterns. As shown at 1308, a method 1300 could include identifying the transmission pattern for SL data communication, from such a transmission pattern pool.

For example, the UE could belong to a UE group and the transmission pattern pool could include a transmission pattern pool configured for the UE group. In these embodiments, the UE could identify a transmission pattern from among the transmission patterns of the transmission pattern pool for the UE group. Identifying the transmission pattern could include identifying the transmission pattern based on a UE index of the UE, and a method could then involve receiving additional signaling assigning the UE index to the UE for example. Such additional signaling could include downlink control information (DCI) signaling.

Identifying the transmission pattern at 1308 could involve the UE selecting the transmission pattern. The transmission pattern selection by the UE could be random by UE. Other selection embodiments are also disclosed herein.

FIG. 13 illustrates optional transmission pattern identifications at 1304, 1308. In some embodiments, one or more other UEs use different transmission patterns.

The example method 1300 also involves transmitting at 1310, by the UE, an SL data communication according to the SL communication resource configuration. This SL data communication could be transmitted to one UE or to multiple UEs. In some embodiments, the SL data communication includes a retransmission of a data communication.

In the example method 1300, the SL control information and the SL data communication are transmitted by the UE, at 1304 and 1308, respectively, without receiving, in a downlink control information (DCI), a grant of communication resources.

The example illustrated in FIG. 13 is represents one possible embodiment. However, other embodiments are also possible which could include additional features, fewer features, and/or different features than those illustrated in FIG. 13.

For example, FIG. 13 illustrates transmitting an SL data communication at 1310. In some embodiments, a UE listens for SL transmissions by other UEs during segments of a transmission pattern during which it is not performing SL transmissions.

In further embodiments, the SL communication resource configuration defines communication resources used for transmitting the SL control information or the SL data communication. The communication resources could include at least one of time-domain resources, frequency-domain resources and code-domain resources.

The present disclosure also provides various options for performing the illustrated operations. The message received at 1302, indicating the SL communication resource configuration, could be a radio resource control (RRC) message. Another possible option would be a Medium Access Control layer Control Element (MAC CE) message.

Embodiments are not in any way restricted to methods. System and device embodiments are also contemplated.

Figure 14:
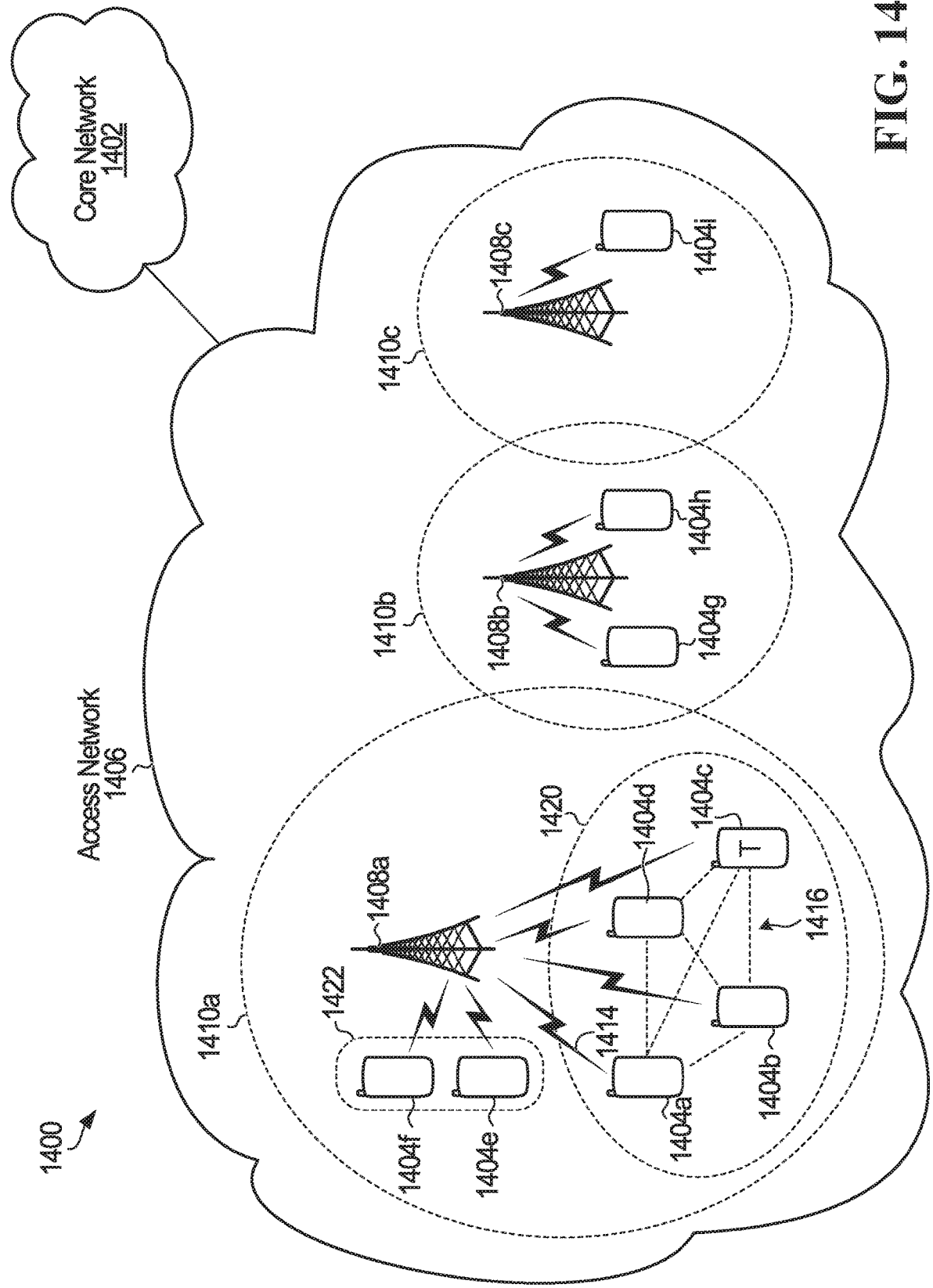
FIG. 14 is a block diagram illustrating an example of a telecommunications network according to one embodiment.

FIG. 14 is a block diagram illustrating an example of a telecommunications network 1400 according to one embodiment. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 14, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 14 form another UE group 1422.

Figure 15:
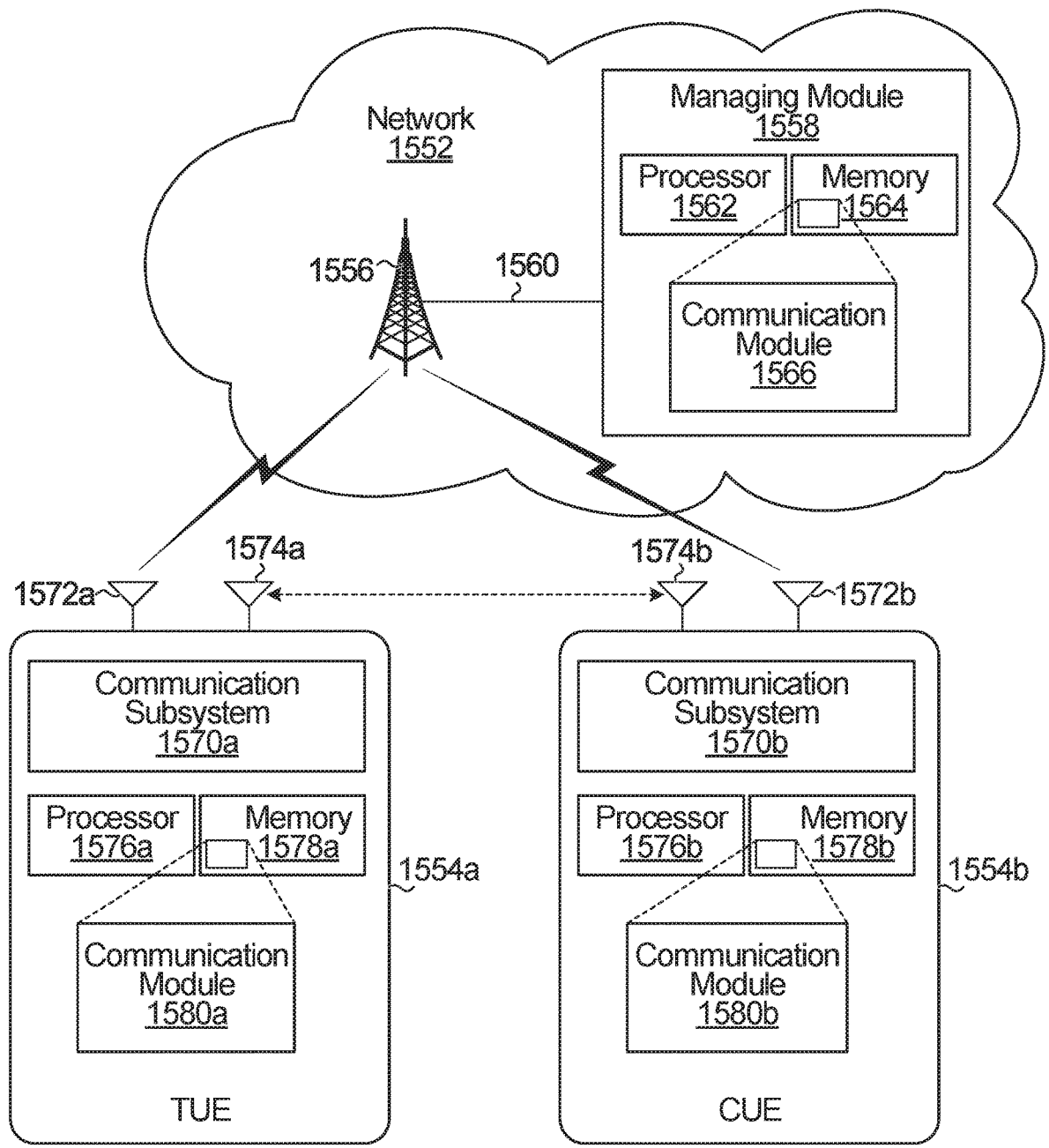
FIG. 15 is a block diagram illustrating an example of a network serving two UEs.

FIG. 15 is a block diagram illustrating an example of a network 1552 serving two UEs 1554a and 1554b, according to one embodiment. The network 1552 may be the access network 1406 from FIG. 14, and the two UEs 1554a and 1554b may be two of the four UEs 1404a-d in FIG. 14, or the UEs 1554a and 1554b may be UEs 1404e and 1404f in FIG. 14. However, more generally this need not be the case, which is why different reference numerals are used in FIG. 15.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 14 and 15 illustrate systems in which embodiments could be implemented. In some embodiments, a UE includes a processor, such as 1576a, 1576b in FIG. 15, and a non-transitory computer readable storage medium, such as 1578a, 1578b in FIG. 15, storing programming for execution by the processor. A non-transitory computer readable storage medium could also or instead be provided separately, as a computer program product.

In such embodiments, programming could include instructions to: receive, by the UE, a message indicating a sidelink (SL) communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without receiving, in a downlink control information (DCI), a grant of communication resources.

The instructions to transmit the SL control information could include instructions to transmit, by the UE, a scheduling assignment (SA) to the other UE using a communication resource defined in the SL communication resource configuration, the SA indicating communication resources used for transmitting the SL data communication.

The SL communication resource configuration could include a transmission pattern that defines a pattern for transmitting the SL data communication.

The transmission pattern could define an initial transmission of a data block and a repetition of the data block, and could also define time resources used for the initial transmission of the data block and the repetition of the data block.

An SL communication resource configuration could include a starting time of the transmission pattern, and the transmission pattern could further define a time gap from the initial transmission of the data block to the repetition of the data block.

Instructions to transmit the SL control information could include instructions to transmit one instance of the SL control information for both the initial transmission of the data block and the repetition of the data block.

In some embodiments, the instructions to transmit the SL control information include instructions to transmit a separate instance of the SL control information for each of the initial transmission of the data block and the repetition of the data block.

The programming could also include instructions to listen for SL transmissions by other UEs during segments of the transmission pattern other than the SL transmissions.

One or more other UEs may use a different transmission pattern.

The SL communication resource configuration could define a transmission pattern pool that includes multiple transmission patterns, as disclosed herein. The programming could then include instructions to identify the transmission pattern among the transmission patterns of the transmission pattern pool.

For example, the UE could belong to a UE group and the transmission pattern pool could include a transmission pattern pool configured for the UE group. The instructions to identify the transmission pattern could then include instructions to identify the transmission pattern based on a UE index of the UE. The programming could also include instructions to receive additional signaling assigning the UE index to the UE. The additional signaling could be downlink control information (DCI) signaling, for example.

The instructions to identify the transmission pattern could include instructions to select the transmission pattern. The selection of the transmission pattern is random in some embodiments, but other selection options are possible.

The SL communication resource configuration could define a transmission pattern for transmitting the SL control information. The transmission pattern for transmitting the SL control information could be the same or different from the transmission pattern for transmitting the SL data communication.

The SL communication resource configuration could define communication resources used for transmitting the SL control information or the SL data communication, and the communication resources could include at least one of time-domain resources, frequency-domain resources and code-domain resources.

The received message indicating the SL communication resource configuration could be a radio resource control (RRC) message as disclosed by way of example herein, or another type of message such as a Medium Access Control layer Control Element (MAC CE) message.

Embodiments disclosed herein could be useful in mitigating effects of the SL half duplex constraint. Embodiments could also improve the latency and reliability of SL transmissions using a UE specific transmission pattern, and a distributed transmission mode that can be designed to enable all UEs in a cooperation group to communicate with each other even if some transmissions are affected by collisions or the half duplex constraint, for example.

The grant-free transmission modes described herein may be used in NR other than in SL and V2X communication. For example, the grant-free transmission modes may be applicable in unlicensed transmission.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention.

Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

It should also be appreciated that features disclosed herein could be applied to components other than those specifically referenced by way of example, such as V2X infrastructure components including RSUs (i.e., not just eNBs and UEs). A roadside unit (RSU) is a stationary transportation infrastructure entity (e.g., an entity which can transmit speed notifications) supporting V2X applications that can exchange messages with other entities supporting V2X applications. An RSU is a logical entity which in addition to supporting V2X applications can also provide the functionalities of a network entity (e.g., eNB, gNB, base station), in which case it may be referred to as an e/gNB-type RSU, or a UE, in which case it may be referred to as a UE-type RSU. Network features therefore may apply to e/gNB-type RSUs and UE features may apply to UE-type RSUs.

Multiple Configurations for Sidelink Grant-Free Transmission

Multiple configured/preconfigured grant-free SL transmission configurations with different configuration parameters are beneficial in order to address message characteristics of V2X services and support different types of service and traffic. As such, a UE can be transmitting sidelink packets from different traffic classes (QCIs) with different latency and/or bit rate requirements for which a single resource configuration/pre-configuration may not be enough.

In some of the embodiments described, a UE is configured with multiple grant-free SL transmission configurations and the UE can select between the multiple configurations for sidelink transmission. The multiple configurations can be configured by higher layer signalling, such as RRC signalling, or can be pre-configured.

For example, the multiple configurations correspond to multiple sets of transmission resources, such as multiple sets of transmission patterns. Then, the UE selects between which configuration to use. This can be done based on various selection criteria. These might include traffic type, packet size, reliability target, latency target to name a few examples. Based on these criteria, the UE selects which configuration to use. In a simplest case, there can be a table lookup which maps criteria to configuration. These configurations can be signalled or pre-configured as before. In some embodiments, once the configuration is selected, the UE makes a selection of a SL transmission resource using one of the methods described herein, which may rely upon sensing resource occupancy or sidelink control information and/or short/long-term measurement. Thus, the UE can independently and dynamically select between different grant-free SL configurations.

In some embodiments, the UE makes a selection of which configuration to use only when the UE is out of network coverage, and at other times, the network informs the UE of which configuration to use. Alternatively, the UE makes a selection of which configuration to use at any time irrespective of whether the UE is in or out of network coverage.

Figure 20:
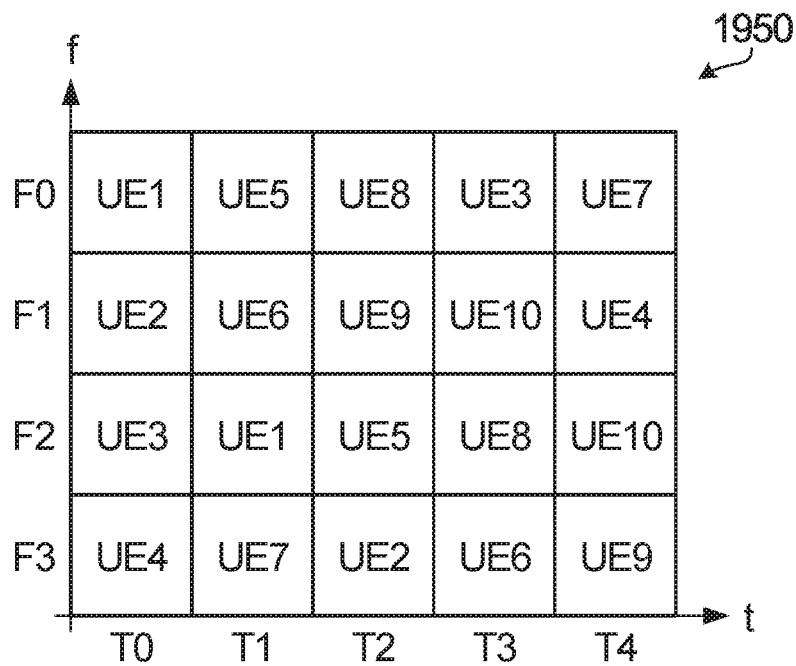
Figure 20:
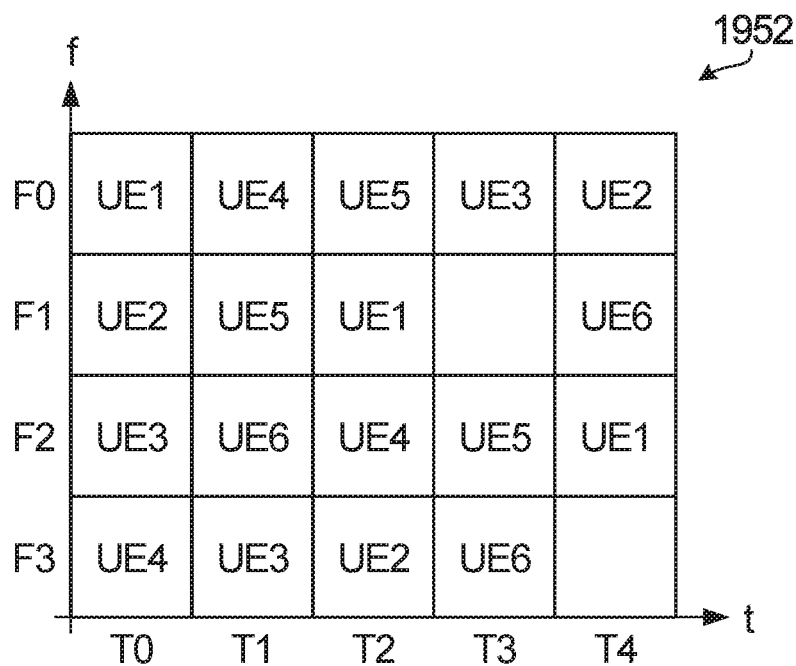

An example is shown in FIG. 20. Shown is a first configuration that consists of a first pool of transmission patterns 1950 that have 2 repetitions. Shown is a second configuration that consists of a second pool of transmission patterns 1952 that have 3 repetitions. The UE can select between the two configurations. In some embodiments, an indication of which configuration is being used by the transmitting UE is included in the SA.

Figure 21:
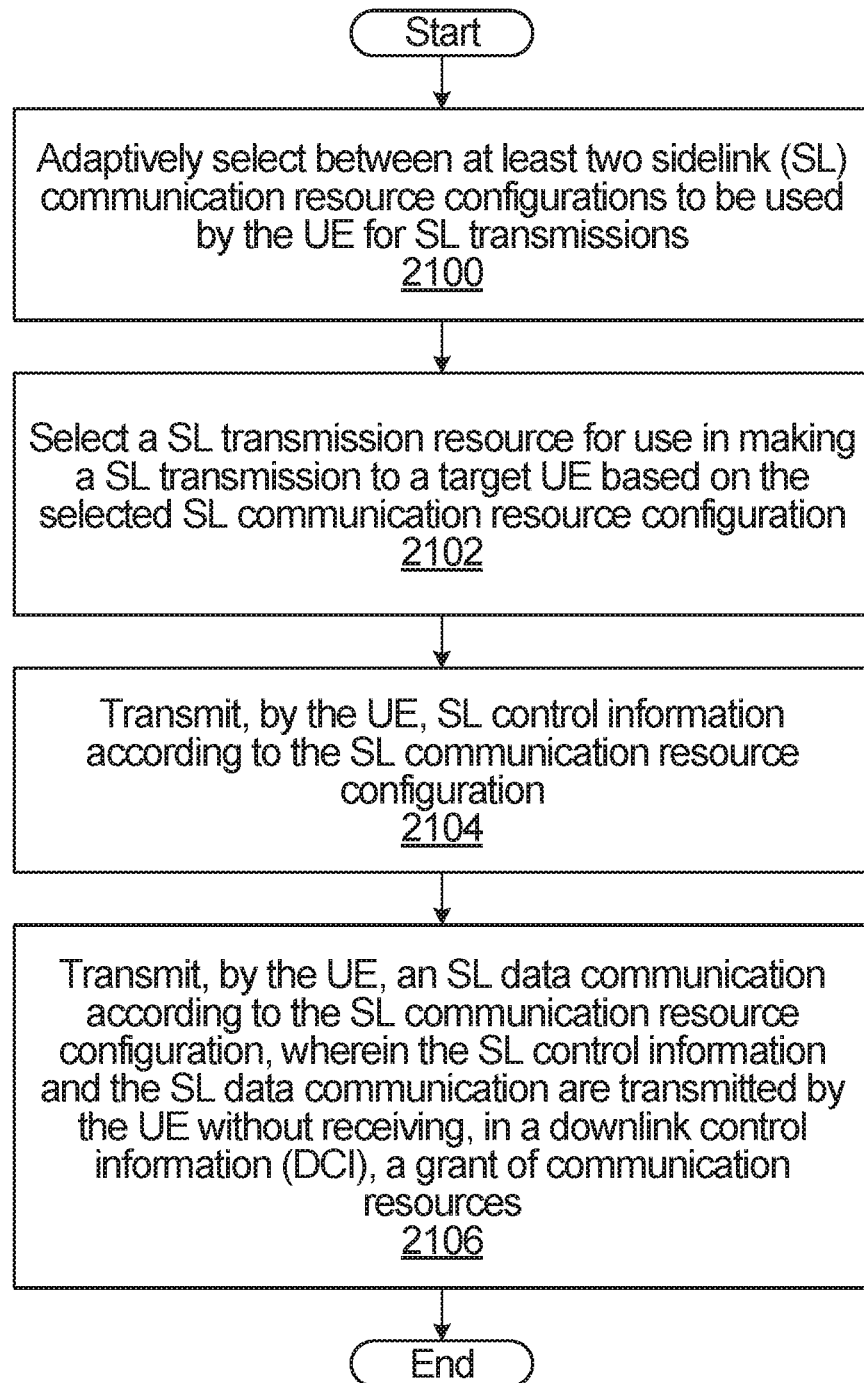
FIG. 21 is a flowchart of a method of SL transmission in which the UE adaptively selects between two SL communication resource configurations.

FIG. 21 is a flowchart of a method provided by an embodiment of the disclosure. The method is performed by a UE, and begins in block 2100 adaptively selecting between at least two sidelink (SL) communication resource configurations to be used by the UE for SL transmissions. The method continues in block 2102 with selecting a SL transmission resource for use in making a SL transmission to a target UE based on the selected SL communication resource configuration. The method continues in block 2104 with transmitting, by the UE, SL control information according to the SL communication resource configuration. The method continues in block 2106 with transmitting, by the UE, an SL data communication according to the SL communication resource configuration, wherein the SL control information and the SL data communication are transmitted by the UE without receiving, in a downlink control information (DCI), a grant of communication resources.

In embodiments of the present disclosure, one or more of the multiple configurations are preconfigured or signaled to the UE via RRC signaling. Each configuration/pre-configuration may include or indicate values for one or more of the following parameters: periodicity, offset, SL transmission resource pattern, SL transmission resource pattern pool, time/frequency location of the pattern or pattern pool, and time/frequency size of sub-channel.

Selection of Grant-Free Transmission Resource Based on Decoding of Sidelink Control Channel In some of the embodiments described herein, for the purpose of a UE to UE sidelink transmission, the transmitting UE selects a transmission pattern to use for the transmission.

For example, in the embodiment of FIG. 6B, UE1 makes such a selection at 630. In the embodiment of FIG. 6B, the pool of possible patterns is configured via RRC configuration.

More generally, the transmitting UE1 is aware of the pool of possible patterns before making the selection. For example, the pool could be pre-configured. More generally still, the transmitting UE may be aware of transmission resources or a pool of SL transmission resources that can be selected for the purpose of sidelink transmission, referred to hereinafter as SL transmission resources. The pool of transmission patterns is one specific example of SL transmission resources.

In some embodiments, the resources that the UE can select between are configured based on a SL communication resource configuration. The SL communication resource configuration can be a pattern (one-dimensional, two-dimensional, also known as time-frequency repetition pattern, etc.), a pool of patterns, a repetition number. For example, the SL communication resource configuration could be pre-configured. The configured/pre-configured SL communication resource configuration may be provided by a device manufacturer or a network operator (e.g., via a subscriber identity module). The SL communication resource configuration may be also provided by the network operator when a UE is in coverage of a base station so that the SL communication resource configuration is available wherever the UE may be, such as when the UE moves out of the network coverage.

In an embodiment of the invention, a transmitting UE makes a selection of a SL transmission resource for the purpose of a sidelink transmission based on additional information obtained from decoding sidelink control channels. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will inform the receiving UE of resources it is using for the sidelink transmission via sidelink control channel (SCI). This can be, for example via previously described SCI, SA, using PSCCH, or some other mechanism. So, for every sidelink transmission, there is a corresponding resource indication on a corresponding sidelink control channel. Note that another UE may transmit an SCI some of the time even when it does not have SL data to transmit. This can also be decoded by the transmitting UE and used to assist in making the selection of the SL transmission resource.

With this embodiment, a given transmitting UE monitors the sidelink control channels of other UEs, and through such monitoring learns of the resources that are being used for sidelink transmissions of other UEs. For example, a UE that is part of a group of UEs may only monitor the SCI resources of other UEs in the group. Alternatively, a UE may monitor all SCI resources configured/pre-configured for the UE. Based on this information, the transmitting UE can make a more intelligent selection of resources for its own sidelink transmission. In some embodiments, the resources for the sidelink control channels are known to the UE. This necessitates that the control information be transmitted in a manner that allows UEs other than the receiver UE to decode it. For example, the control information can be transmitted in an open manner (readable by all UEs), or may be scrambled using a common ID known to a group of UEs.

The sidelink control information may indicate resources being used for a current sidelink transmission, and/or future sidelink transmissions. By monitoring the sidelink control information transmitted by other UEs, a transmitting UE can learn which resources are being used for a current sidelink transmission (based on current sidelink control information that indicates resources being used for a current sidelink transmission), and/or the UE can learn which resources are being used for a current sidelink transmission based on previous sidelink control information that indicated resources being used for a future sidelink transmission that is aligned with the current transmission and/or the UE can learn which resources are being used for a current sidelink transmission based on previous sidelink control information that indicated resources being used for a future sidelink transmission that is not aligned with the current transmission.

Where the sidelink control information for another sidelink transmission indicates a pattern from a pool of patterns, or a resource from a pool of resources, the transmitting UE for a sidelink transmission can avoid selection of that particular pattern/resource. With this approach, collisions can be avoided, and performance can be improved.

Figure 16:
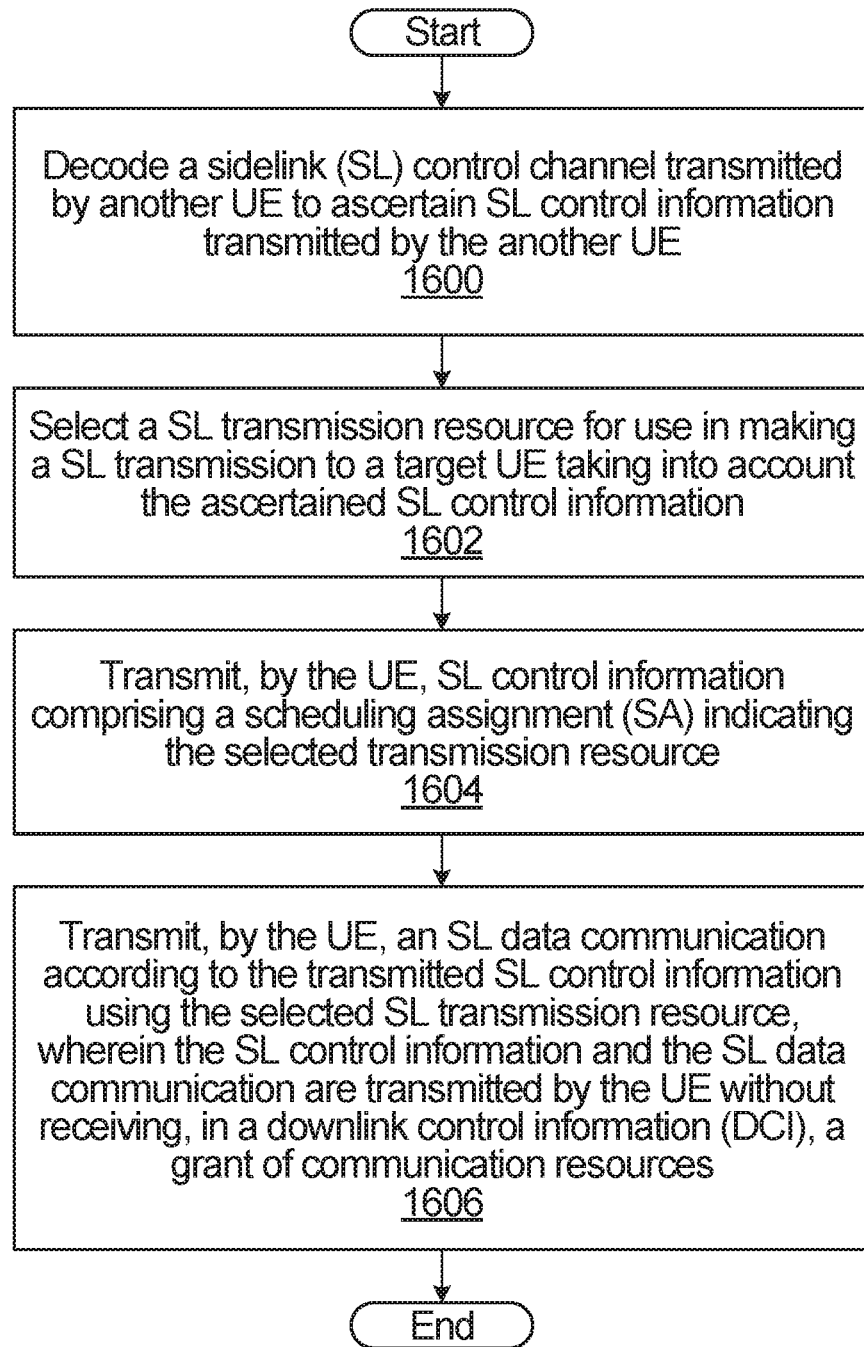
FIG. 16 is a flowchart of a method of SL transmission based on decoded SL control information.

FIG. 16 is a flowchart of a method provided by an embodiment of the disclosure. The method is performed by a UE, and begins in block 1600 with decoding a sidelink (SL) control channel transmitted by another UE to ascertain SL control information transmitted by the another UE. The method continues in block 1602 with selecting a SL transmission resource for use in making a SL transmission to a target UE taking into account the ascertained SL control information. The method continues in block 1604 with transmitting, by the UE, SL control information comprising a scheduling assignment (SA) indicating the selected transmission resource. The method continues in block 1606 with transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

Optionally, the UE may also perform this SCI decoding procedure in order to independently and dynamically select between different grant-free SL configurations.

Figure 17:
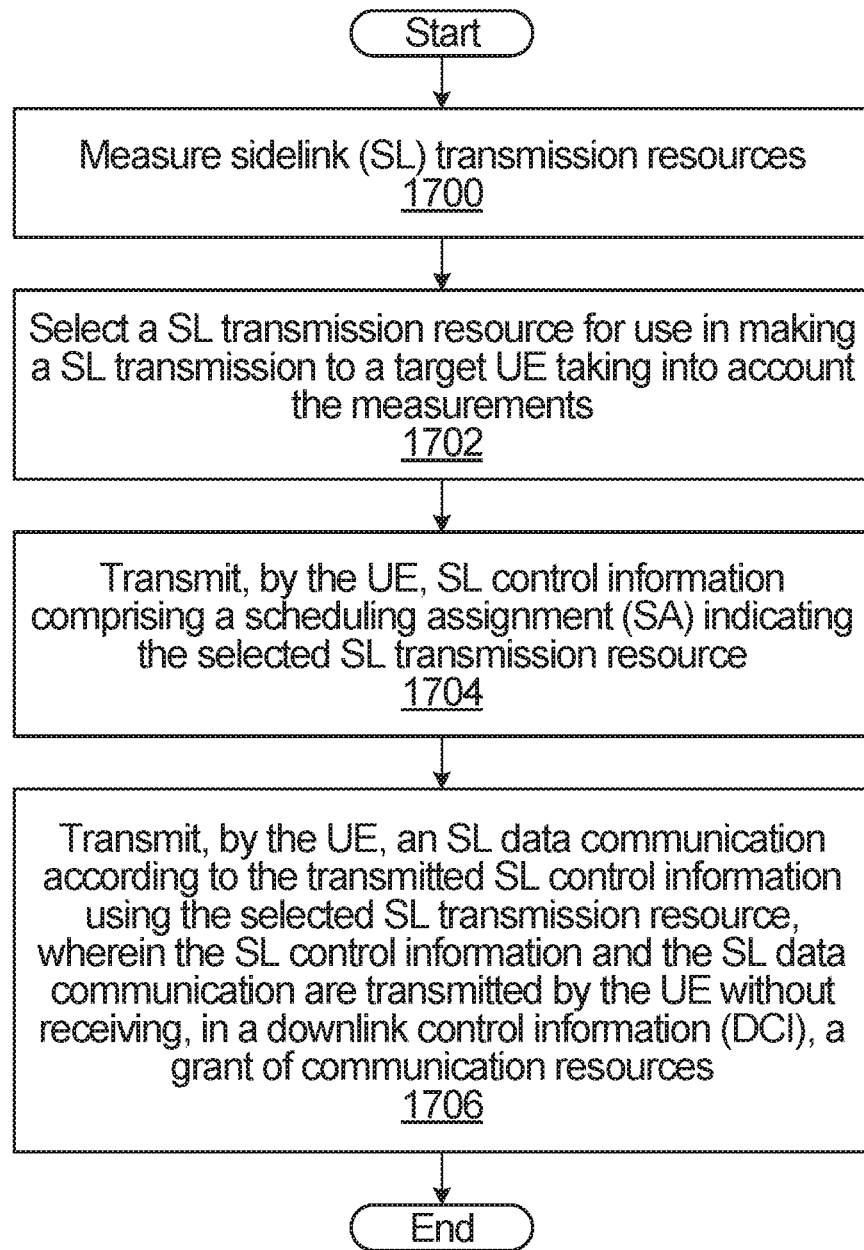
FIG. 17 is a flowchart of a method of SL transmission based on SL measurement.

Selection of Grant-Free Transmission Resource Based on Long-Term Sidelink Measurement FIG. 17 is a flowchart of a method provided by another embodiment of the disclosure. The method is performed by a UE, and begins in block 1700 with the UE measuring sidelink (SL) transmission resources in order to ascertain sidelink resource occupancy or load. The method continues in block 1702 with selecting a SL transmission resource for use in making a SL transmission to a target UE taking into account the measurements. The method continues in block 1704 transmitting, by the UE, SL control information comprising a scheduling assignment (SA) indicating the selected SL transmission resource. The method continues in block 1706 with transmitting, by the UE, an SL data communication according to the transmitted SL control information using the selected SL transmission resource, wherein the SL control information and the SL data communication are transmitted by the UE without receiving, in a downlink control information (DCI), a grant of communication resources.

In specific embodiments, the measuring sidelink transmissions resources is performed on a long-term basis or a short-term basis. Detailed examples are provided below.

Selection of Grant-Free Transmission Resource Based on Long-Term Sidelink Measurement In an embodiment of the invention, a transmitting UE makes a selection of a transmission resource for the purpose of a sidelink transmission, based on additional information obtained from long-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor sidelink transmission resources on an ongoing basis. This can involve monitoring a pool of possible transmission resources or a pool of transmission patterns, for example. For example, the UE may measure reference signal receive power (RSRP) or reference signal receive quality (RSRQ) or some other characteristic of signals that might be present on the resources. The measurements may be averaged over a defined period of time to generate a metric for each transmission resource. A higher metric for a given resource is an indication that the given resource is more heavily loaded on average. Then, the UE takes this information into account in making a selection for transmission.

In a specific example, the UE ranks the possible resources according to the calculated metric, and selects the resource with the most favourable metric (which can be the lowest or the highest depending on the nature of the metric). If the metric reflects some measure of average power, the UE would select the lowest metric, as this would reflect the least loaded resource. In another embodiment, the UE can select, for example randomly, from any resource that has a metric below/above a predefined threshold. In another embodiment, the UE can select, for example randomly, from the top X percent of resources that has a metric below/above a predefined threshold where X can be a number less than 100, typically 10 or 20.

A specific example will be described with reference to FIG. 1K. Here, on an ongoing basis, the UE monitors each of the four frequencies F1,F2,F3 and F4, over the five time periods (which are assumed to repeat cyclicly in this example). A metric for each pattern is determined based on this monitoring. For example, for the UE1 pattern, the transmitting UE measures on F1 during T0, and F3 during T1, and produces a metric for the UE1 pattern by combining these measurements. Such measurements are done for each of the patterns. The patterns are then ordered by metric and a pattern is selected based on the ordering. The decision may be based on the metric determined for measurements over a specified window of time, for example over a configured number of time slots, or more generally a configured period of time (which can be configured in terms of a number of time slots or some other basis).

Optionally, the UE may also perform this long-term sensing procedure in order to independently and dynamically select between different grant-free SL configurations.

Selection of Grant-Free Transmission Resource Based on Short-Term Sidelink Measurement In an embodiment of the invention, a transmitting UE makes a selection of a transmission resource, for the purpose of a sidelink transmission, based on additional information obtained from short-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor SL transmission resources on a short-term basis, just before making a selection of a resource for a sidelink transmission. This can involve making a short-term measurement of a pool of possible transmission resources or pool of transmission patterns, for example. For example, the UE may measure energy levels across a specified frequency band(s). The UE may then perform a clear channel assessment (CCA) by comparing the measured energy levels to a specified threshold. The short term measurement allows the UE to assess whether a given resource is being used during a current transmission period. Then, the UE takes this information into account in making a selection for a current transmission.

The measurements can, for example, be similar to those taken with listen before talk (LBT) protocols, which typically include a CCA procedure. In some embodiments, the UE makes the short-term measurements for multiple resources, possibly all, and makes a selection based on the measurements. This can involve determining which of the resources are not being used for a current transmission period, and selecting between those resources. In another embodiment, the UE makes an initial selection of a resource for transmission (possibly based on sidelink control information and/or long-term sidelink measurements) and then makes the short term measurement for the selected resource. If the resource is occupied as indicated by the short-term measurement, the UE makes another selection, or waits a backoff time, for example a random backoff time, before measuring the same resource again. Once the UE identifies a resource not being used, the UE goes ahead with the transmission using that resource.

A specific example will be described with reference to FIG. 1K. Assume the UE has made an initial selection of pattern UE1. The UE makes a short term measurement of the resources for UE1. If such measurement indicates the pattern is not being used, the UE can go ahead with the sidelink transmission using that pattern. If the short term measurement indicates that pattern is being used, the UE selects a different pattern or waits a random backoff time before performing another short term measurement of the resources for UE1.

In some embodiments, the selection of a transmission resource for sidelink transmission is based on a combination of sidelink control information and long-term sidelink measurement.

In some embodiments, the selection of a transmission resource for sidelink transmission is based on a combination of sidelink control information and short-term sidelink measurement.

In some embodiments, the selection of a transmission resource for sidelink transmission is based on a combination of short-term sidelink measurement and long-term sidelink measurement.

In some embodiments, the selection of a transmission resource for sidelink transmission is based on a combination of sidelink control information, long-term sidelink measurement, and short-term sidelink measurement.

Identification of occupied sidelink resources may be accomplished by monitoring of transmission resources as described above, which can also be referred to as sensing. Sensing can include short-term measurements and/or long-term measurements, as well as decoding sidelink control channel transmissions and detecting any other sidelink transmissions.

Optionally, the UE may also perform this short-term sensing procedure in order to independently and dynamically select between different grant-free SL configurations. Adaptive Adjustment of Grant-Free Resources Based on Sensing and/or Decoding of Sidelink Control Channel In some embodiments, the resources available for SL transmission are adaptively adjusted in some manner based on the sensing and/or decoding of sidelink control channel. Note this is a distinct step compared to selecting the resource for sidelink transmission. In some embodiments, this approach is performed only when the UE is out of network coverage. Alternatively, the approach can be employed at any time irrespective of whether the UE is in or out of network coverage.

The adjustment may encompass adjusting one or a combination of:
the number of repetitions;
the size of a transmission pattern;
the location of a transmission pattern;
some other parameter or combination of parameters.

For example, a UE may be configured with a set of patterns that includes a first subset that have a first number of repetitions, and a second subset that have a second number of repetitions. Based on the sensing and/or decoding of sidelink control channel, the UE can change the number of repetitions, by changing from selecting among the first subset to selecting among the second subset.

Alternatively, the set of patterns may initially only include patterns with two repetitions, but the UE can extend each of those patterns to include three repetitions. Once the transmission resources are adjusted, the UE makes a selection for a given SL transmission based on the adjusted transmission resources.

Figure 18A:
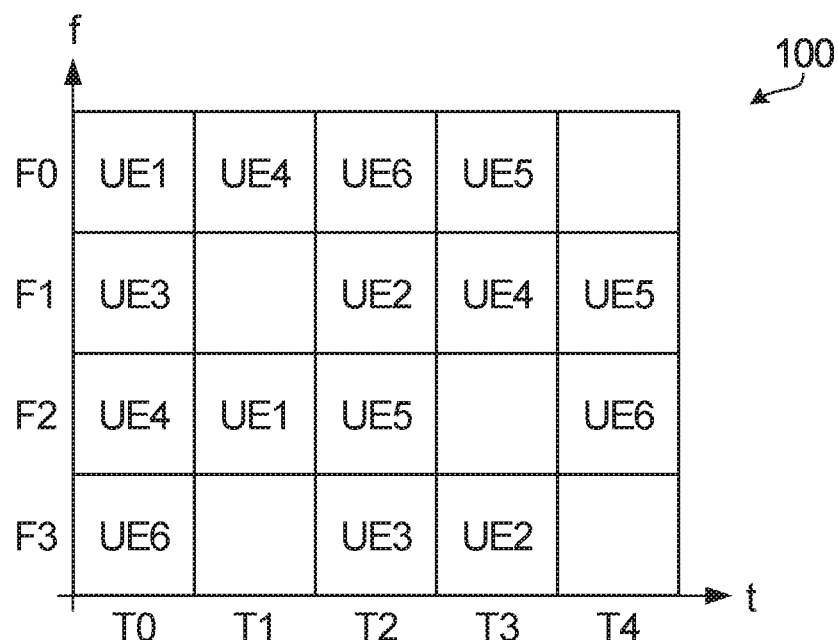

A specific example is shown in FIG. 18A, where a first subset of patterns UE1, UE2, UE3 contain 2 repetitions, and a second subset of patterns UE4, UE5, UE6 contain 3 repetitions. Depending on sensing and/or decoding of sidelink control channel, the UE can select between the first subset of the second subset.

Similarly, subsets of patterns can be defined which differ in size or location or some other parameter. An adjustment can be made by selecting from the appropriate subset of patterns.

Alternatively, starting with a pattern, or a pool of patterns, the UE can make adjustments to the pattern or the pool of patterns to produce an adjusted pool of patterns. Again this can, for example, involve adjusting the number of repetitions, size, location, or some other parameter or combination of parameters of the selected pattern.

Figure 19:
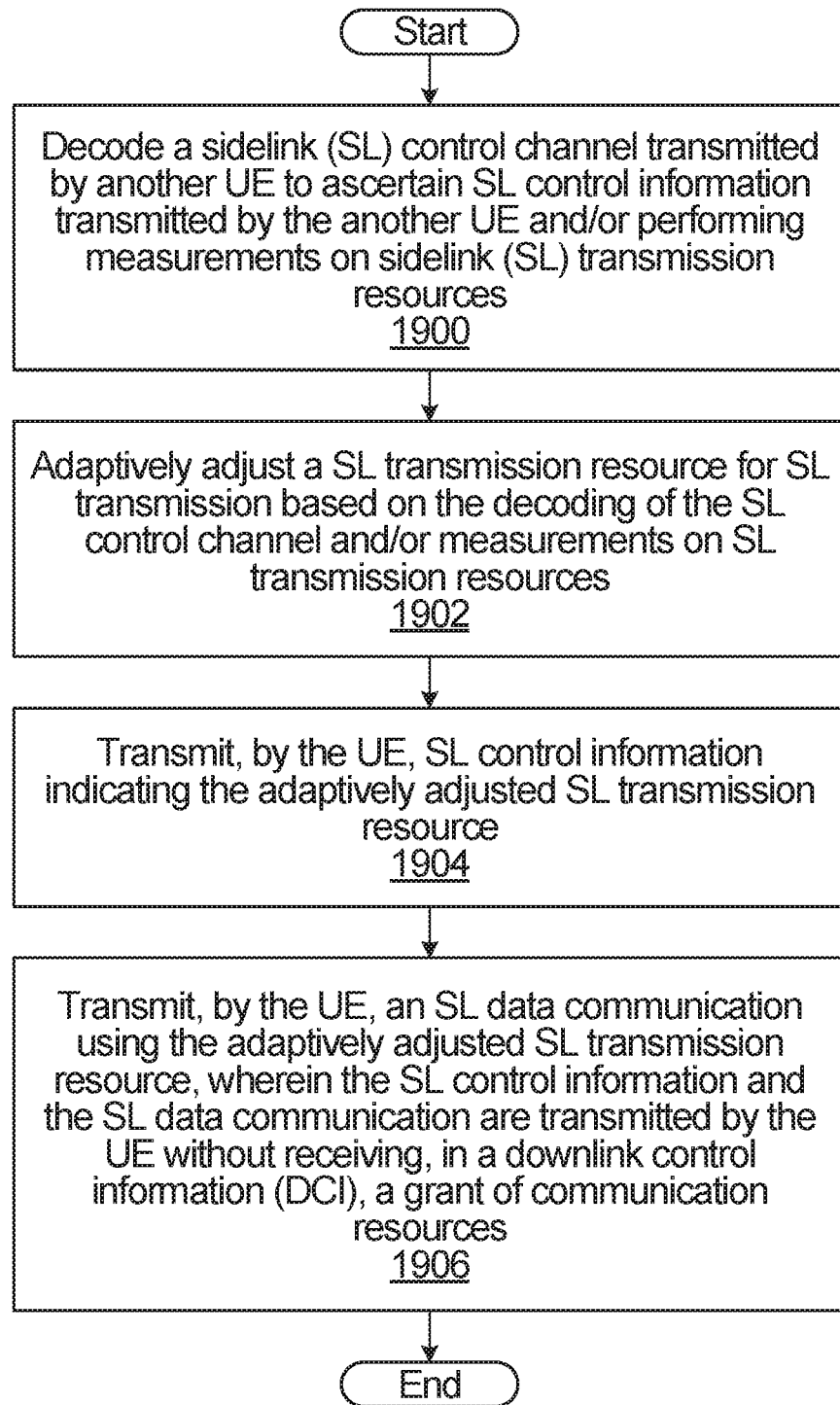
FIG. 19 is a flowchart of a method of SL transmission in which resources for SL transmission are adaptively adjusted based on decoding of SL control channel and/or measurements of SL transmission resources.

FIG. 19 is a flowchart of a method provided by an embodiment of the disclosure. The method is performed by a UE, and begins in block 1900 with decoding a sidelink (SL) control channel transmitted by another UE to ascertain SL control information transmitted by the another UE and/or performing measurements on sidelink (SL) transmission resources. The method continues in block 1802 with adaptively adjusting a SL transmission resource for SL transmission based on the decoding of the SL control channel and/or measurements on SL transmission resources. The method continues in block 1804 with transmitting, by the UE, SL control information indicating the adaptively adjusted SL transmission resource. The method continues in block 1906 with transmitting, by the UE, an SL data communication using the adaptively adjusted SL transmission resource, wherein the SL control information and the SL data communication are transmitted by the UE without receiving, in a downlink control information (DCI), a grant of communication resources.

Information Contained in Sidelink Control Channel

For any of the embodiments described herein, the sidelink control channel may transmit a scheduling assignment which may include a resource allocation, such as a pattern indicator for a sidelink transmission. In some embodiments, the sidelink control information also includes: a power level for the sidelink transmission, an interference measurement, and/or a spatial beam direction. This is included so that other UEs (other than the target UE for that sidelink control information) can observe the power level, and factor this in when selecting a transmission resource for their own SL transmissions. For example, where the sidelink control information indicates a sidelink transmission on a transmission resource with high power, this would weigh against selecting that transmission resource, possibly disqualifying it from selection, in which case that resource is excluded.

Flexibility in Starting Transmission

Figure 22:
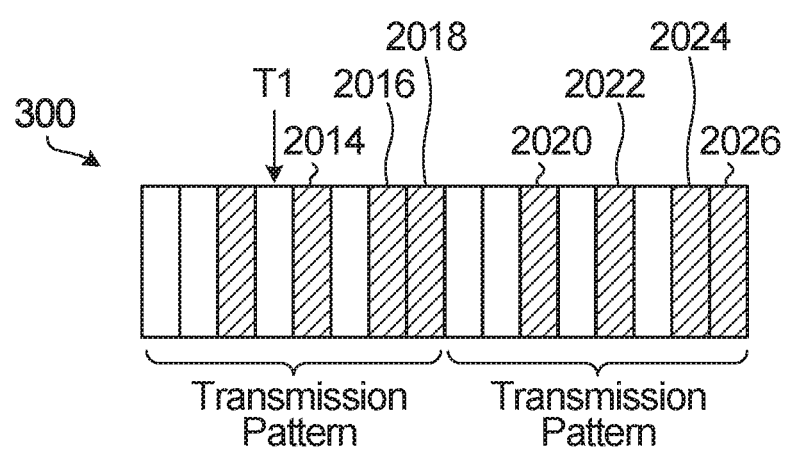
FIG. 22 shows an example of flexible start time within a repetition/transmission pattern.
Figure 23:
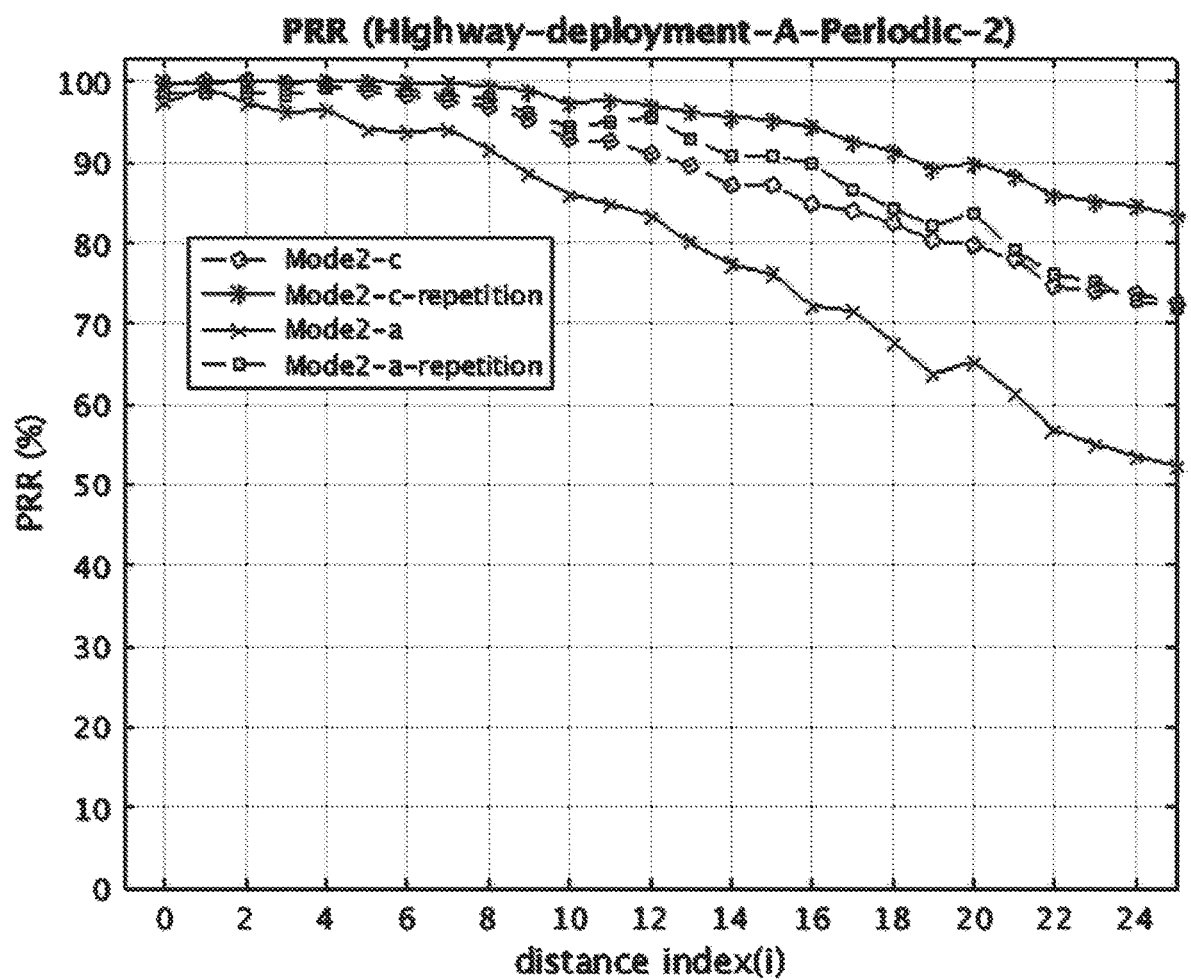
FIGS. 23 to 26 show example simulation results.
Figure 24:
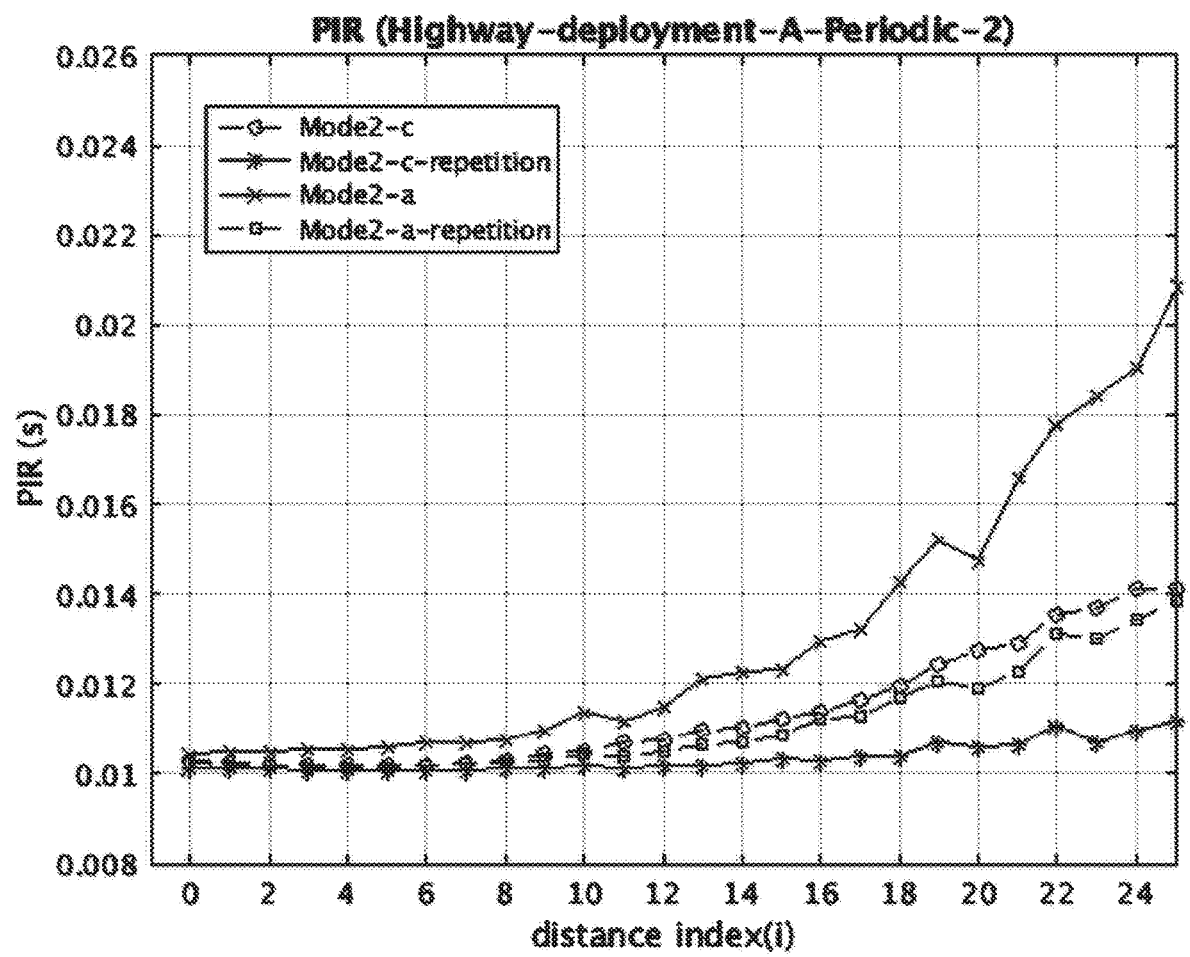
Figure 25:
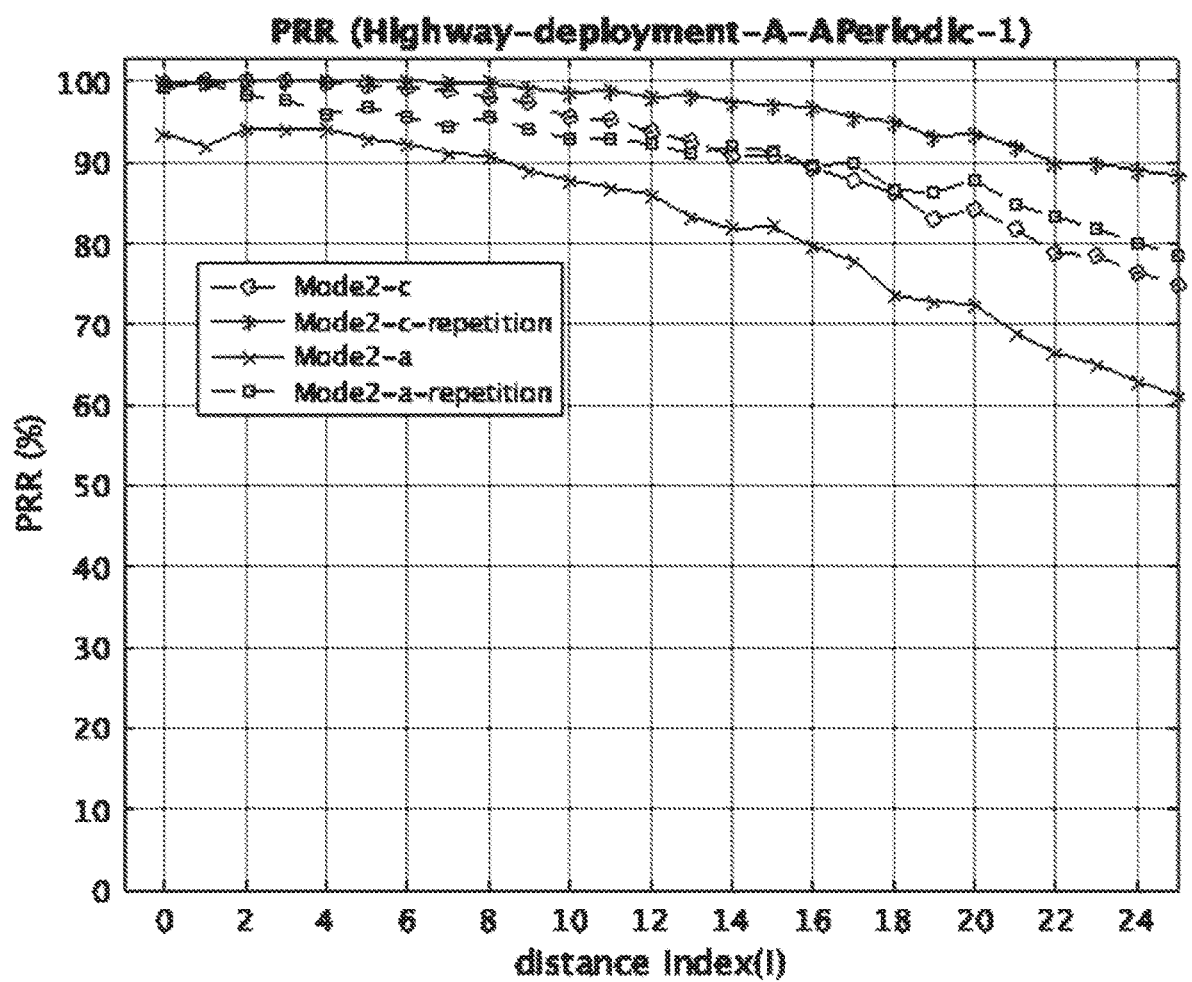
Figure 26:
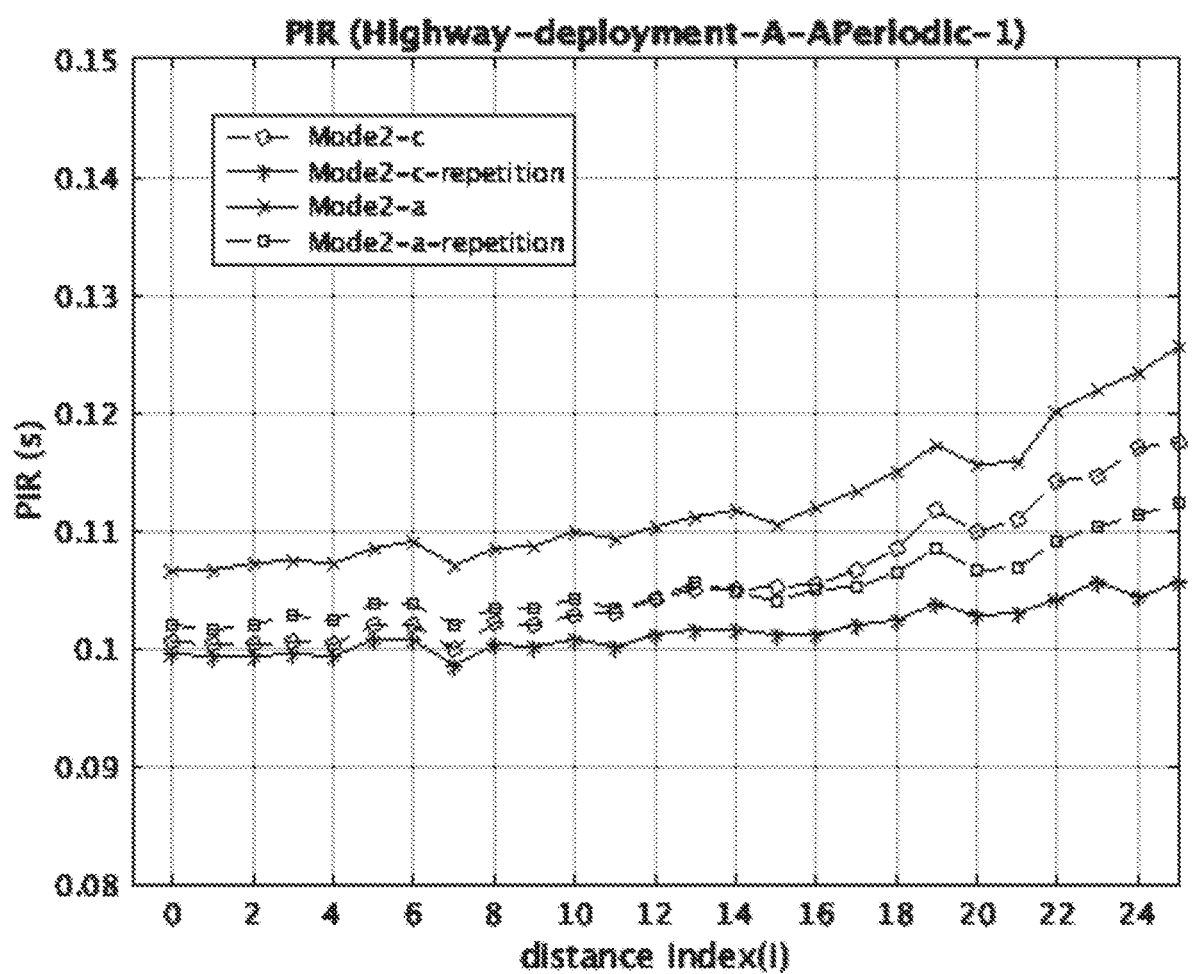

In some embodiments, a UE is constrained to start a transmission at the start of a pattern. Irrespective of when a packet arrives for transmission, the UE must wait for the beginning of the next pattern before it can transmit. This approach can be applied to any of the embodiments described herein. For example, referring to FIG. 22, the transmission pattern occurs within a block of 8 consecutive resources. The UE makes four repetitions for a given transmission within one instance of the transmission pattern. FIG. 8 shows two repetitions of the pattern 2010, 2012. If a packet is ready for transmission at T1 2014, the UE must wait until transmission pattern 2012 to transmit, and the UE transmits using resources 2020, 2022, 2024, 2026.

In some embodiments, the UE is not constrained to start a transmission at the start of a pattern. Rather, the UE can start transmission as soon as it is ready. The UE must still use the resources of the pattern, but can start midway through the pattern. Referring again to FIG. 22, if a packet is ready for transmission at T1, the UE can transmit using resources 2014,2016,2018,2020 instead of waiting to begin with resource 2020 at the start of the next transmission pattern.

In some embodiments, no change to the SA is required to indicate exactly when, within a transmission pattern, the transmission begins. For example, where the resources defined in the SA are periodic/recurring, a receiving UE can monitor the resources and detect when the resources are being used for the transmission.

Alternatively, SA can include an indication of where the transmission begins. This can be an indication of the repetition number within a set of repetitions, an indication of the actual resource used for the first transmission, or an indication of a different pattern that reflects the different start time.

This approach can be combined with any one or more of the other embodiments described herein.

Resources for SL Transmission

Figure 18B:
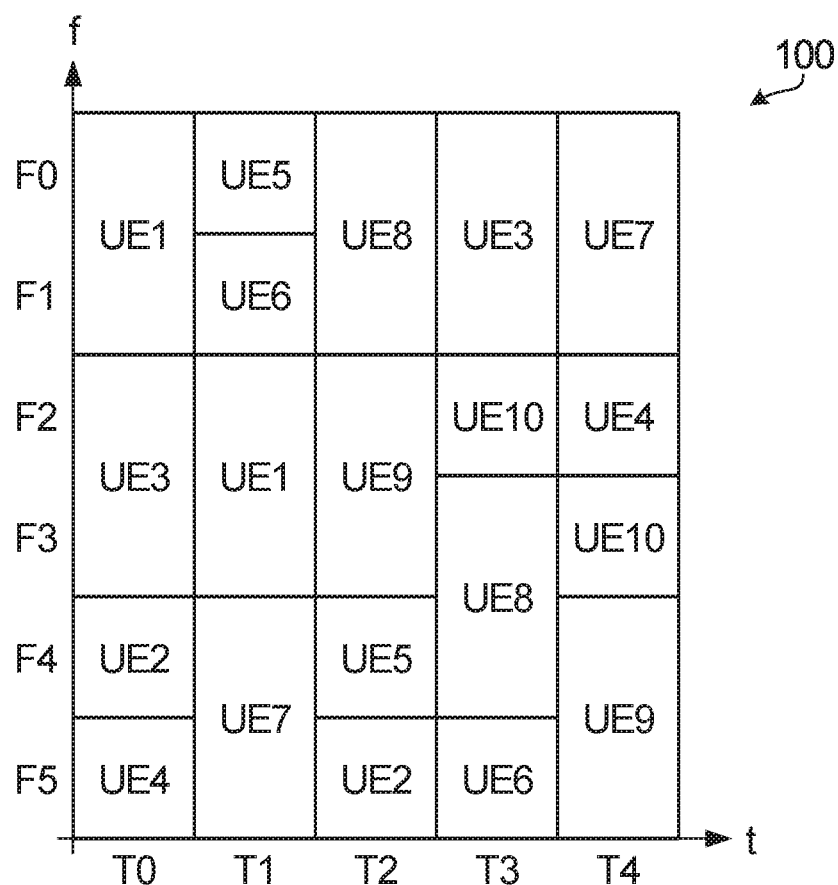

In some embodiments, all the transmission patterns are composed of time frequency regions for respective repetitions that have the same size in time and/or frequency. For example, in FIG. 18A, the different patterns are made up of time/frequency units that have the same dimension in time and frequency. In another embodiment, one or more patterns within a pool can be composed of time frequency regions that differ in the time dimension and or the frequency dimension, as shown in the FIG. 18B. In some embodiments, a given pattern of a pool of patterns may be are composed of time frequency units of different sizes. These variations are applicable to any of the embodiments described herein.

Resource Pools

A resource pool (RP) is a set of time and frequency resources that can be used for SL transmission and/or reception. The time and frequency resources in an RP can be contiguous or non-contiguous in either time or frequency, or both. In a further example, an RP corresponds to a given bandwidth part (BWP) such that the resources in the RP are confined to the frequency range of the BWP. In yet a further example, the given BWP is associated with a given numerology (e.g., a numerology having a subcarrier spacing of 15 kHz, 30, kHz, etc.) such that the resources of the RP are defined by the given numerology.

A UE may be configured to use one or more specified resource pools. Then, the SL resource configuration takes place within the resource pool(s) configured for the UE. These variations are applicable to any of the embodiments described herein.

In addition to providing new modes for grant-free SL transmission, other embodiments of the present disclosure may also further enhance other known modes of SL transmission.

For example, in a first conventional mode of SL transmission, such as LTE-V2X mode 3 or NR-V2X mode 1, a base station schedules SL resource(s) to be used by a UE for SL transmission(s). Aspects of the present disclosure can be used to enhance this first conventional SL transmission mode in order to add grant-free capabilities.

In this first conventional SL transmission mode, a DCI indicates a time domain transmission pattern bitmap for UEs to determine resources to use for an SL transmission. These SL transmission resources may be scheduled dynamically or semi-persistently; however, scheduling of the SL transmission resources by the BS results in latency. Before the UE can transmit on the SL, it must wait for the DCI from the BS. Furthermore, the dynamic nature of the resource scheduling increases the signaling overhead associated with an SL transmission. Embodiments of the present disclosure may be used to allow SL transmission resource(s) and/or SL transmission configuration(s) to be indicated via RRC, in order to overcome at least some of the disadvantages of fully dynamic or semi-persistent scheduling via DCI.

More particularly, embodiments of the present disclosure provide methods and apparatuses for a UE to independently select and/or adjust SL transmission resources that have been previously preconfigured or configured via RRC.

In yet a further embodiment of the present disclosure used to enhance the first conventional SL transmission mode, the UE can also independently and dynamically select between different grant-free SL configurations. For example, a first grant-free SL configuration may comprise configuration parameters that are advantageous in one type of scenario or environment (traffic type, packet size, service type, QoS, etc.), yet disadvantageous in another. Whereas a second grant-free SL configuration may comprise configuration parameters that advantageous in the another type of scenario or environment. Accordingly, enabling the UE to independently and dynamically select between different grant-free SL configurations will improve SL transmission performance.

In a further embodiment, DCI may be used to update the SL transmission resources that were previously configured in any of the above embodiments.

For another example, in second conventional mode of SL transmission, such as LTE-V2X mode 4 or NR-V2X mode 2, the UE autonomously determines, or otherwise determines without base station scheduling, SL transmission resource(s) within SL resources that have been pre-configured or previously configured by the base station.

However, in the second conventional mode, while autonomously selecting resources within an RP improves latency, it also increases chances of a message collision caused by UEs independently selecting the same resource. When this happens, the collision may cause reliability issues for the message, which may not be successfully decoded by the intended receivers. Therefore, embodiments of the present disclosure provide methods and apparatuses to overcome at least some of the disadvantages associated with this second conventional mode of SL transmission.

More particularly, in some embodiments according to methods for selecting grant-free transmission resources based on decoding of SCI described above, a first UE assists sidelink resource selection for one or more second UEs. The first UE may transmit some information to the second UE in order to assist sidelink resource allocation. Such information can correspond to sensing or interference measurements. In some embodiments, a transmitting UE may assist a receiving UE by indicating resources for feedback in unicast or groupcast operation. In some embodiments a UE can assist other UEs in the selection of repetition patterns in order to avoid resource collisions. For example, an indication message on grant free resource reservation or transmission pattern selection can be transmitted to other UEs to improve the reliability for sidelink grant free transmission mode.

In further embodiments for enhancing the second conventional SL transmission mode, a UE is configured/preconfigured with one or more SL transmission configurations.

In particular, this can be achieved in a grant-free transmission mode, by configuring/preconfiguring a pool of two-dimensional time/frequency repetition patterns (e.g., as described above). The transmission patterns indicate the time and frequency location of each repetition of a TB. The configuration/preconfiguration takes into account the UE needs and the radio conditions. The pattern selection is performed at least once within the periodicity of the configured/preconfigured grant resources.

In a further embodiment, DCI may be used to update the SL transmission resources that were previously configured in any of the above embodiments.

In order to alleviate the half-duplex constraint, the pool of configured/preconfigured transmission patterns should be such that any two distinct patterns should not collide in at least one time unit which achieves the following benefits:

Due to near-far effects and in-band emissions, simultaneous PSSCH transmissions from multiple UEs may interfere with each other even though those transmissions take place on different resources in the frequency domain. Such detrimental impacts are avoided as long as those devices select different patterns.

A UE is not able to transmit and receive PSSCH simultaneously. Grant-free transmissions using the pattern pool allows UEs to transmit PSSCH and receive PSSCH from multiple UEs as long as those transmissions are carried out using distinct patterns.

Out-Of-Coverage Operation

In some embodiments, an out-of-coverage UE can be pre-configured with a time-frequency repetition pattern and use this pattern to transmit a PSSCH in a grant-free manner. More generally, a UE may be configured or pre-configured with a pattern pool, autonomously select a pattern from the pool and use it to transmit a non-scheduled PSSCH. In this way, if two UEs share the same resources and transmit data simultaneously, then their transmission can still be resolved by virtue of using different patterns. The pattern pool solution could be applied for both in-coverage and out-of-coverage scenarios.

Figure 18C:
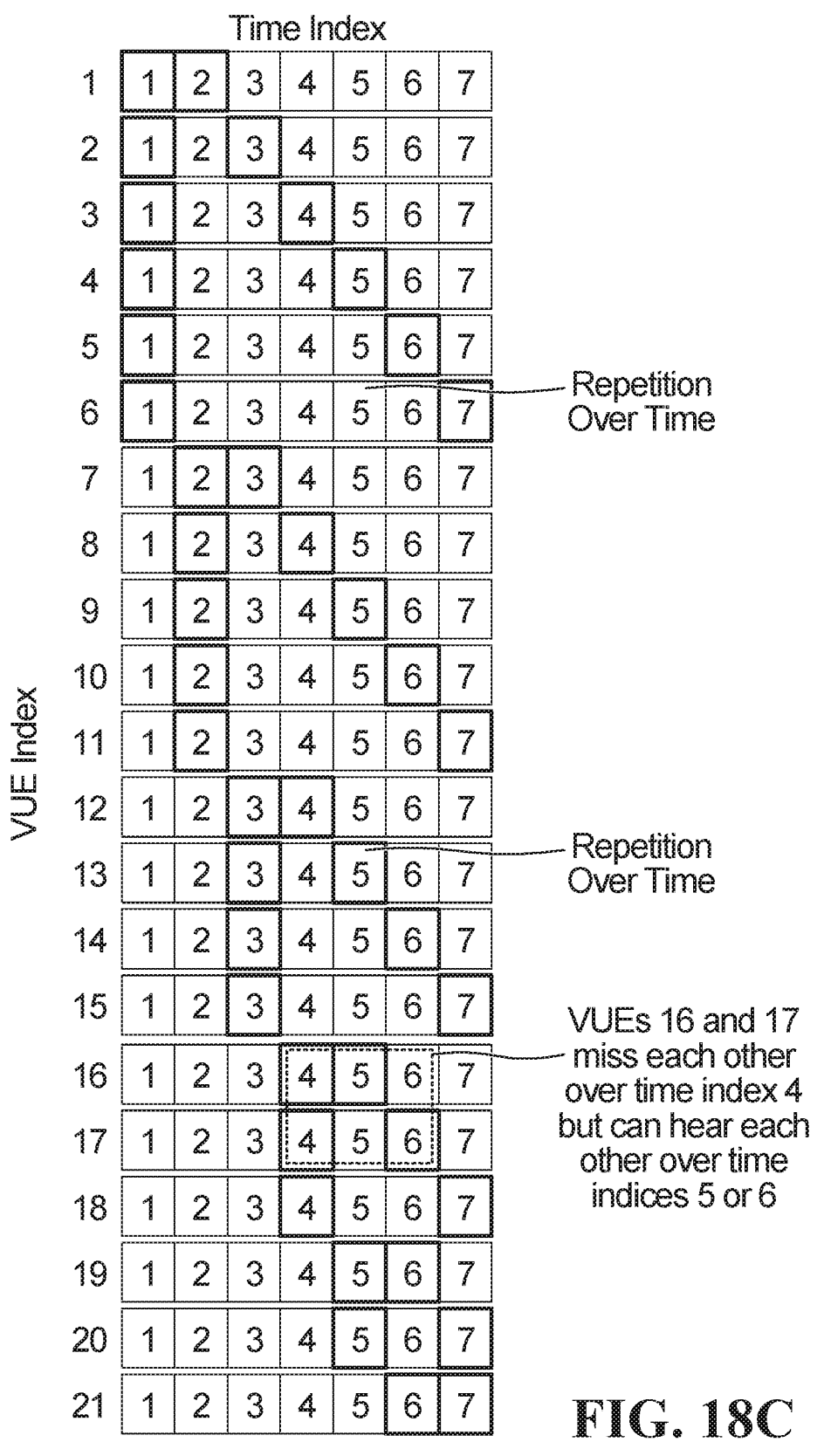

FIG. 18C shows another example of a pattern pool. This pattern focuses on the time-domain multiplexing aspect in order to illustrate how patterns can help overcome the half-duplex constraint which is especially useful in multicast scenarios where several UEs need to transmit and receive data from each other simultaneously. In the example at hand, it can be seen that all 21 UEs can transmit and receive data to/from each other which allows for mutual broadcast within the group while overcoming the half-duplex constraint. As can be seen, fast retransmission of a TB is enabled by the proposed grant-free transmission scheme which should be beneficial in terms of both latency and reliability.

How many repetitions are allowed per patterns may depend on the time-domain length of these patterns as well as the number of UEs. On the other hand, the length of the pattern in time-domain along with the subcarrier spacing should fit within the periodicity of the configured grant resources which will dictate the overall latency of the scheme. Therefore, there is a tradeoff to be achieved in terms of latency and reliability, which depends on the subcarrier spacing and time-domain length of the patterns. In general, with large subcarrier spacing such as 60 kHz, there is more opportunity for long enough transmission patterns within a given latency constraint.

In-Coverage Operation

For a first method of grant-free in-coverage operation, the network may assign patterns to the UEs so as to avoid collisions between VUEs and achieve the best latency/reliability tradeoff. For another method of grant-free in-coverage operation, the grant-free operation mechanism can be similar to the out-of-coverage operation described in the above subsection with the caveat that the network can reconfigure common pattern pool via SIB or dedicated pattern pool or pattern via RRC.

In some embodiments for out-of-coverage UEs, the UE pattern pool is pre-configured and/or the UE pattern pool is UE-specific.

Sensing and Resource Selection

If the UE is configured/preconfigured with a UE-specific pattern, no sensing or resource selection may be needed.

If the UE is configured/preconfigured with pattern pools, a pattern selection is needed. As discussed earlier, sensing may enhance the performance of pattern selection for UEs that are configured/preconfigured with pattern pools.

In some embodiments, sharing of the configured/preconfigured SL transmission resources with UEs not configured or pre-configured with grat free SL transmission resources is not precluded. For example, when under network coverage, it is up to gNB implementation whether to schedule users on the configured resources for SL grant free transmissions. Similarly, the configured resources SL grant free resources can also be shared with other UEs not scheduled that autonomously determine resources for SL transmission without network involvement. In some embodiments, a UE configured/preconfigured with a grant free SL transmission resource(s), such as a transmission pattern, may have to share some of the resources with another UE that is operating under a non-grant-free mode of operation. In this case, some embodiments will prioritize the UE configured/preconfigured with the grant free SL transmission resource(s) over the non-grant-free UE because this grant-free SL transmission targets to achieve low latency and high reliability QoS of advanced NR-V2X use cases.

In an embodiment of the present disclosure where a NR-V2X mode-2 UE is enhanced to provide grant-free SL transmissions, if the UE is pre-configured with a UE-specific pattern and then is reconfigured by the network with a dedicated pattern when it is in-coverage, then the UE behaves essentially as a NR-V2X mode-1 UE configured with the same pattern.

On the other hand, if a NR-V2X mode-2 UE is pre-configured with a pattern pool and is then reconfigured by the network with a common or dedicated pattern pool, it will essentially behave as a NR-V2X mode-2 UE in coverage with respect to pattern selection from the pattern pool.

According to yet another embodiment of the present disclosure, a first UE may schedule sidelink transmissions of other UEs. For example, the first UE may implement any of the above methods described above, in place of a base station. This embodiment can be useful for an out-of-coverage scenario where a UE, perhaps having more capability than other UEs around it, can perform scheduling functions on behalf of the base station. In some embodiments, the base station designates the scheduling UEs within a group of users that are out-of-coverage. In some embodiments, the type of UE scheduling may be dynamic or through configured grant (e.g., grant-free). In some embodiments, an in-coverage UE can receive a configuration signaling (e.g. RRC signaling) from the base station and forward the configuration signaling through unicast, multicast or broadcast to one or more UEs in its proximity. The configuration signaling can correspond to a specific SL resource transmission pattern or a pool of transmission patterns. The configuration signaling may also correspond to one or multiple SL grant free configuration or pre-configurations. In some other embodiment, a UE can coordinate the transmission patterns among a group of UEs that are out of network coverage. Coordinating may involve assigning a specific transmission pattern to each UE in the group in a way that minimizes collisions between SL transmissions of different UEs in the group.

Pattern and Pattern Pool Design

Figure 18D:
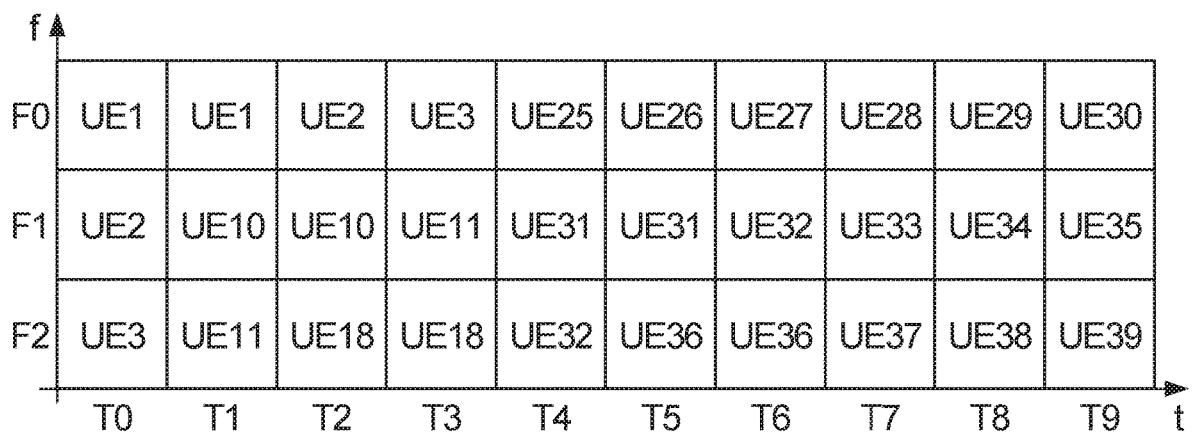
Figure 18D:
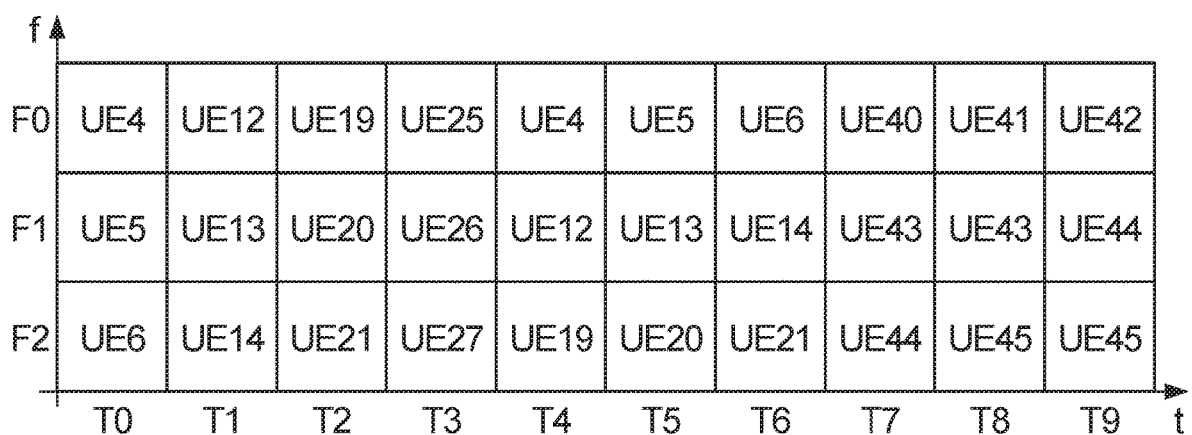
Figure 18D:
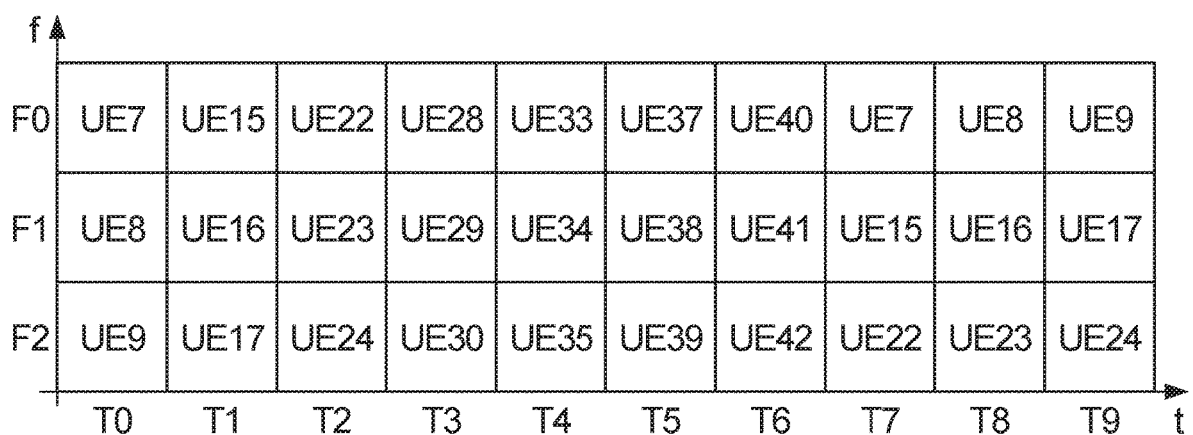

UE can be configured with a pattern or select a pattern among a pattern pool for SL transmissions as discussed throughout this disclosure. The pattern pool can follow a design as described in FIG. 1K where for a resource grid with n frequency resource and n+1 time resources, a K=n*(n+1)/2, where n=4, pattern can be created such that if K users are transmitting each other, they can at least receive one transmission of every other users and no collision on the signal happens. However, in some cases, the number of frequency resources may be not enough to create such pattern without collision. In this case, some frequency overlap between different UEs may be allowed for designing the pattern. However, different UEs can still have at least one transmission occupying a different time resource than any other UEs that select or assigned one pattern. An example is show in FIG. 18D, where we have 3 frequency resources and 10 time resources, 10*(10−1)/2=45 patterns can be created. Three UEs may occupy one time-frequency resource in one transmission among their corresponding patterns, but no two UEs will collide on both transmissions as at least one transmission will occupy different time resource.

Selection of Resources Based on UE ID

When UE autonomously select a transmission resource or a transmission pattern or a time frequency resource pattern (TFRP) among a resource pool or transmission pattern pool. A UE may select a resource based on some form of UE ID.

The UE ID can be a higher layer UE ID, a MAC ID, a radio network temper identifier (RNTI), a connection ID or any ID that may differentiate the UE with another UE. The ID may be preconfigured or configured by the gNB or the network. UE may select the pattern based on a function of their UE ID. As an example in FIG. 1K, UE may derive their pattern based on pattern ID=(UE ID) mod(total number of patterns in the pool), where mod is a modulo operation and the total number of patterns is 10. And use the pattern ID to map the UE number shown in the figure for the selected pattern.

System Level Simulation of Different Resource Allocation Schemes

Simulations comparing an embodiment of the present disclosure (Mode 2-c) with a conventional sensing and reservation based UE autonomous selection scheme (Mode 2-a) are presented in FIGS. 23-26. Packet reception rate (PRR) and packet inter-reception (PIR) performance are used for performance evaluation. The simulation assumptions and parameters are described in Table 1 below.

TABLE 1

Simulation Assumptions

| Parameter | Assumption |
|---|---|
| Layout | Highway scenario |
| UE distribution | UE drop A |
| Frequency | 6 GHz |
| Simulation bandwidth | 100 MHz |
| In-band emission | According to TR 36.885 evaluation assumptions, with {W, X, Y, Z} = {3, 6, 3, 3} |
| Link type | Direct vehicle-to-vehicle link |
| VUE antenna model | TR 37.885 Option 1 |
| Traffic Model | TR 37.885 Periodic Model 2 or Aperiodic Model 1 |

Significant gains in terms of PRR for both single transmission and repetition are evident. The PIR results follow the same trend as PRR in all cases.

Numerous modifications and variations of the present disclosure are possible in light of the above teachings. It is therefore to be understood that within the scope of the appended claims, the disclosure may be practiced otherwise than as specifically described herein.

What is claimed is:

1. A method, comprising:
transmitting, by a user equipment (UE) to a target UE, sidelink (SL) control information comprising a scheduling assignment (SA) indicating SL transmission resources for a SL data transmission, the SL transmission resources based on one or more occupied SL resources sensed by the UE, and the SL transmission resources including a first resource in a resource pool for an initial transmission and multiple different resources in the resource pool for one or more retransmissions,
wherein the first resource includes a first time resource, a first frequency resource, or a first time-frequency resource, and
wherein the multiple different resources include multiple time resources, multiple frequency resources, or multiple time-frequency resources; and
transmitting, by the UE, the SL data transmission using the SL transmission resources according to the SL control information transmitted by the UE, wherein the SL control information and the SL data transmission are transmitted by the UE without receiving, in a downlink control information (DCI), a grant of communication resources.

2. The method of claim 1, further comprising:
sensing a SL transmission involving another UE to identify the one or more occupied SL resources.

3. The method of claim 2, wherein the sensing the SL transmission involving the another UE comprises at least one of:
decoding an SL control channel transmitted by the another UE to identify a transmission resource scheduled or reserved for the another UE; or
measuring the SL transmission resources, wherein the measuring the SL transmission resources comprises:
measuring physical sidelink shared channel (PSSCH) resources indicated or reserved for transmission by a sidelink control information transmitted by the another UE.

4. The method of claim 3, further comprising:
selecting the SL transmission resources by avoiding selecting the transmission resource scheduled for the another UE or wherein a measurement result of the measuring is above a threshold.

5. A user equipment (UE), comprising:
at least one processor; and
a non-transitory computer readable storage medium storing programming for execution by the at least one processor, the programming including instructions for:
transmitting, to a target UE, sidelink (SL) control information comprising a scheduling assignment (SA) indicating SL transmission resources for a SL data transmission, the SL transmission resources based on one or more occupied SL resources sensed by the UE, and the SL transmission resources including a first resource in a resource pool for an initial transmission and multiple different resources in the resource pool for one or more retransmissions,
wherein the first resource includes a first time resource, a first frequency resource, or a first time-frequency resource, and
wherein the multiple different resources include multiple time resources, multiple frequency resources, or multiple time-frequency resources; and
transmitting the SL data transmission using the SL transmission resources according to the SL control information transmitted by the UE, wherein the SL control information and the SL data transmission are transmitted by the UE without receiving, in a downlink control information (DCI), a grant of communication resources.

6. The UE of claim 5, wherein the programming further includes instructions for:
sensing a SL transmission involving another UE to identify the one or more occupied SL resources.

7. The UE of claim 6, wherein the sensing the SL transmission involving the another UE comprises at least one of:
decoding an SL control channel transmitted by the another UE to identify a transmission resource scheduled or reserved for the another UE; or
measuring the SL transmission resources, wherein the measuring the SL transmission resources comprises:
measuring physical sidelink shared channel (PSSCH) resources indicated or reserved for transmission by a sidelink control information transmitted by the another UE.

8. The UE of claim 7, wherein the programming further includes instructions for:
selecting the SL transmission resources by avoiding selecting the transmission resource scheduled for the another UE or wherein a measurement result of the measuring is above a threshold.

9. A method, comprising:
receiving, by a user equipment (UE) from a base station, a message indicating multiple sidelink (SL) communication resource configurations to be used by the UE for communicating SL control information and SL data between the UE and another UE;
transmitting, by the UE, the SL control information to the another UE using a communication resource indicated by a SL communication resource configuration of the multiple SL communication resource configurations; and
transmitting, by the UE, the SL data to the another UE using the communication resource indicated by the SL communication resource configuration,
wherein the SL control information and the SL data are transmitted by the UE without the UE receiving, in a downlink control information (DCI), a grant of the communication resource.

10. The method of claim 9, further comprising:
selecting, by the UE, the SL communication resource configuration from the multiple SL communication resource configurations indicated to the UE.

11. The method of claim 9, wherein the message indicating the multiple SL communication resource configurations indicates a resource pool configuration including the multiple SL communication resource configurations.

12. The method of claim 9, wherein the communication resource comprises a time slot and a frequency sub-channel, and wherein the SL communication resource configuration indicates the time slot and the frequency sub-channel for transmitting the SL data and the SL control information.

13. The method of claim 9, wherein the SL communication resource configuration comprises an indication of a tune domain offset of the communication resource with respect to a first system frame number (SFN o).

14. The method of claim 9, wherein the SL communication resource configuration comprises an indication of a periodicity of the communication resource.

15. The method of claim 14, wherein the SL communication resource configuration indicates a plurality of communication resources within a time window, each of the plurality of communication resources comprising a combination of one time slot and one or more frequency sub-channels, and wherein the periodicity is a periodicity of the plurality of communication resources.

16. The method of claim 15, wherein the SL communication resource configuration further indicates the time slot of the communication resource in the time window.

17. The method of claim 15, wherein the transmitting the SL data to the another UE using the communication resource indicated by the SL communication resource configuration comprises:
transmitting the SL data in a first transmission according to a first communication resource of the plurality of communication resources and transmitting the SL data in a second transmission according to a second communication resource of the plurality of communication resources.

18. The method of claim 9, wherein the message indicating the multiple SL communication resource configurations is a radio resource control (RRC) message.

19. The method of claim 9, wherein the SL control information further indicates a redundancy version, a source ID, and a destination ID of transmission of the SL data.

20. The method of claim 9, wherein the SL control information indicates the communication resource used for transmitting the SL data.

21. The method of claim 20, wherein the SL communication resource configuration comprises an indication of a number of symbols, an indication of a starting resource block (RB), and an indication of a number of RBs, for defining the communication resource for transmitting the SL control information to the another UE.

22. A user equipment (UE), comprising:
at least one processor; and
a non-transitory computer readable storage medium storing programming for execution by the at least one processor, the programming including instructions to:
receive, from a base station, a message indicating multiple sidelink (SL) communication resource configurations to be used by the UE for communicating SL control information and SL data between the UE and another UE;
transmit the SL control information to the another apparatus LIE using a communication resource indicated by a SL communication resource configuration of the multiple SL communication resource configurations; and
transmit the SL data to the another UE using the communication resource indicated by the SL communication resource configuration,
wherein the SL control information and the SL data are transmitted by the UE without the UE receiving, in a downlink control information (DCI), a grant of the communication resource.

23. The UE of claim 22, the programming further including instructions to:
select the SL communication resource configuration from the multiple SL communication resource configurations indicated to the UE.

24. The UE of claim 22, wherein the message indicating the multiple SL communication resource configurations indicates a resource pool configuration including the multiple SL communication resource configurations.

25. The UE of claim 22, wherein the communication resource comprises a time slot and a frequency sub-channel, and wherein the SL communication resource configuration indicates the time slot and the frequency sub-channel for transmitting the SL data and the SL control information.

26. The UE of claim 22, wherein the SL communication resource configuration comprises an indication of a time domain offset of the communication resource with respect to a first system frame number (SIN o).

27. The UE of claim 22, wherein the SL communication resource configuration comprises an indication of a periodicity of the communication resource.

28. The UE of claim 27, wherein the SL communication resource configuration indicates a plurality of communication resources within a time window, each of the plurality of communication resources comprising a combination of one time slot and one or more frequency sub-channels, and wherein the periodicity is a periodicity of the plurality of communication resources.

29. The UE of claim 28, wherein the SL communication resource configuration further indicates the time slot of the communication resource in the time window.

30. The UE of claim 28, wherein the instructions to transmit the SL data to the another UE using the communication resource indicated by the SL communication resource configuration comprise instructions to:
transmit the SL data in a first transmission according to a first communication resource of the plurality of communication resources and transmitting the SL data in a second transmission according to a second communication resource of the plurality of communication resources.

31. The UE of claim 22, wherein the message indicating the multiple SL communication resource configurations is a radio resource control (RRC) message.

32. The UE of claim 22, wherein the SL control information further indicates a redundancy version, a source ID, and a destination ID of transmission of the SL data.

33. The UE of claim 22, wherein the SL control information indicates the communication resource used for transmitting the SL data.

34. The UE of claim 33, wherein the SL communication resource configuration comprises an indication of a number of symbols, an indication of a starting resource block (RB), and an indication of a number of RBs, for defining the communication resource for transmitting the SL control information to the another UE.

* * * * *

UNITED STATES PATENT AND TRADEMARK OFFICE
CERTIFICATE OF CORRECTION

PATENT NO. : 11,310,822 B2
APPLICATION NO. : 16/669715
DATED : April 19, 2022
INVENTOR(S) : Amine Maaref et al.

It is certified that error appears in the above-identified patent and that said Letters Patent is hereby corrected as shown below:

In the Claims

Claim 13, Column 54, Line 38; delete "tune" and insert --time--.

Claim 13, Column 54, Line 41; delete "(SFN o)" and insert --(SFN 0)--.

Claim 22, Column 55, Line 24; delete "another apparatus LIE" and insert --another UE--.

Claim 26, Column 56, Line 6; delete "(SIN o)" and insert --(SIN 0)--.

Signed and Sealed this
Thirty-first Day of May, 2022

*Katherine Kelly Vidal*

Katherine Kelly Vidal
*Director of the United States Patent and Trademark Office*